United States Patent [19]
Taga et al.

[11] Patent Number: 5,204,755
[45] Date of Patent: Apr. 20, 1993

[54] RADIATOR SYSTEM IN IMAGE RECORDING APPARATUS

[75] Inventors: Shinichiro Taga; Izumi Takashima; Mitsuo Shimizu; Toshiaki Kuraoka, all of Kanagawa, Japan

[73] Assignee: Fuji Xerox Co., Ltd., Tokyo, Japan

[21] Appl. No.: 428,495

[22] Filed: Oct. 27, 1989

[30] Foreign Application Priority Data

Oct. 31, 1988 [JP] Japan .................... 63-277148

[51] Int. Cl.⁵ .................... H04N 1/00; G03G 15/00
[52] U.S. Cl. .................... 358/400; 358/471; 165/80.3; 355/30; 355/200
[58] Field of Search .................... 361/382, 383; 357/81; 355/30, 215, 200, 210; 165/400, 401, 471

[56] References Cited

U.S. PATENT DOCUMENTS

| | | | |
|---|---|---|---|
| 4,442,459 | 4/1984 | Fukui et al. | 358/476 |
| 4,602,678 | 7/1986 | Fick | 165/80.3 |
| 4,849,856 | 7/1988 | Funari et al. | 165/80.3 |
| 5,051,866 | 9/1991 | Osaka | 355/200 |

Primary Examiner—Edward L. Coles, Sr.
Assistant Examiner—Thomas D. Lee
Attorney, Agent, or Firm—Finnegan, Henderson, Farabow, Garrett & Dunner

[57] ABSTRACT

An image recording apparatus comprising a line sensor for reading image data, a driver for outputting the image data read by the line sensor wherein the driver comprises an integrated circuit mounted on a circuit board, and a radiator system for dissipating heat generated by the driver, wherein the radiator system physically contacts the driver.

9 Claims, 59 Drawing Sheets

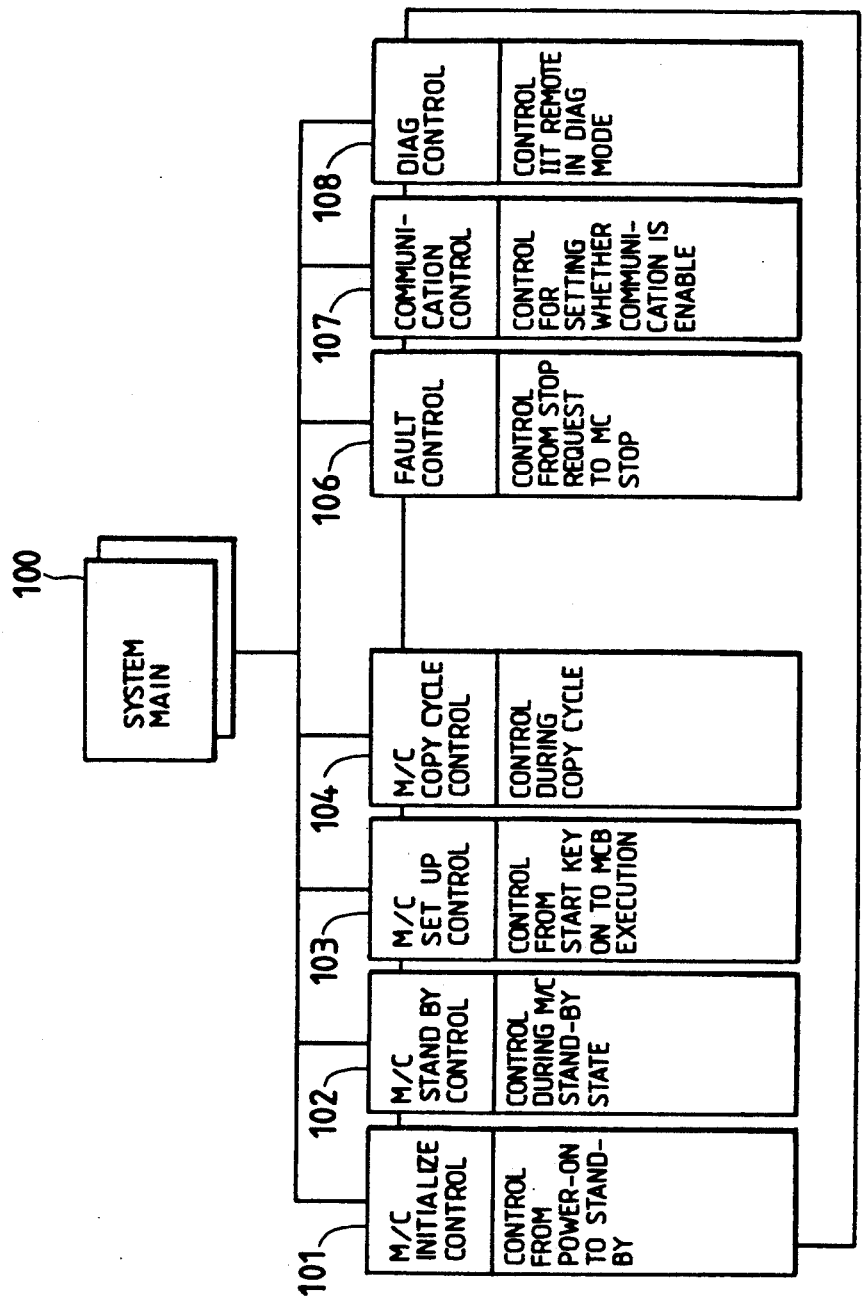

(REDUCTION)  (ENLARGEMENT)

CURRENT FEED BACK

RADIATOR SYSTEM IN IMAGE RECORDING APPARATUS

BACKGROUND OF THE INVENTION

1. Field of the Invention

The present invention relates to a radiator system for use with an image recording apparatus such as a digital copying machine, facsimile, and printer.

2. Description of the Related Art

Methods for improving image quality and increasing data read speed have been significant matters in the design of an image recording apparatus which optically reads, by a CCD line sensor, a distribution of optical densities of an image on an original and outputs the data containing the density information. The CCD line sensor comprises a photodiode array which reads the original image, senses and converts the light contained in the original image into electrical data signals, and stores it in the form of a charge signal. Then, a CCD analog shift register successively shifts the charge signal. To increase the data read speed, it is necessary to increase the frequency of the transfer clock pulse signal which drives the analog shift register. An increase in the pulse signal frequency, however, leads to an increase in the number of charge/discharge operations of the MOS capacitors in the shift register and, consequently, leads to an increase in the amount of heat generated by the integrated circuit (IC) device comprising the analog shift register drive circuit.

There are various methods for solving the above described heat generation problem. One solution involves increasing the power dissipation capacity of the IC. A second involves cooling the driver circuit by using a fan (Japanese Patent Application Unexamined Publication No. 60-264160). A third solution involves a self-cooling effect which results from movement of the imaging unit (Japanese Patent Application Unexamined Publication No. 61-18265).

However, increasing the power dissipation capacity of the IC is not a satisfactory solution because it leads to an increase in the circuit board size, power dissipation, and cost. Similarly, the forced air cooling solution is also not satisfactory because it tends to make the optical system, e.g., mirror, dusty. A possible alternative solution would involve mounting the fan on the imaging unit; however, this would increase the weight of the imaging unit, and hence, the load of the drive motor.

SUMMARY OF THE INVENTION

Accordingly, it is an object of the present invention to provide a solution to the foregoing problems associated with the related art by effectively radiating the heat generated by a line sensor driver circuit.

Another object of the present invention is to mount a radiating plate onto an IC of the driver circuit.

Still another object of the present invention is to mount a radiating plate onto the bottom surface of an IC of a driver circuit.

These and other objects are attained by providing a radiator system which is in physical contact with the IC comprising the driver circuit.

To further improve the radiating effect, the radiating plate comprises a radiating plate and a radiating piece that protrudes from the radiating plate, wherein the radiating piece is physically connected between the bottom surface of the driver IC and the circuit board on which the driver IC is mounted. Further, the radiating plate comprises a convex region physically disconnected from the circuit board on which the driver IC is mounted such that most of its area is in contact with the surrounding air.

Further, during scanning operation, the radiator system moves such that the convex region of the radiating plate more efficiently comes into contact with the surrounding air thus providing an effective means for radiating the heat generated by the driver IC.

BRIEF DESCRIPTION OF THE DRAWINGS

The manner by which the above objects and other objects, features and advantages of the present invention are attained will be fully apparent from the following detailed description when it is considered in view of the drawings, wherein:

FIGS. 1(a) through 1(c) show the structure of a radiator system according to an embodiment of the present invention in which FIG. 1(a) is a plan view of the circuit board 227 and the radiating plate 250 as viewed from the bottom, FIG. 1(b) is a plan view of a major portion of the structure of FIG. 1(a), and FIG. 1(c) is a sectional view of a major portion of FIG. 1(b);

FIG. 11 is a diagram showing a module configuration of the system;

DETAILED DESCRIPTION

Figure 1A:
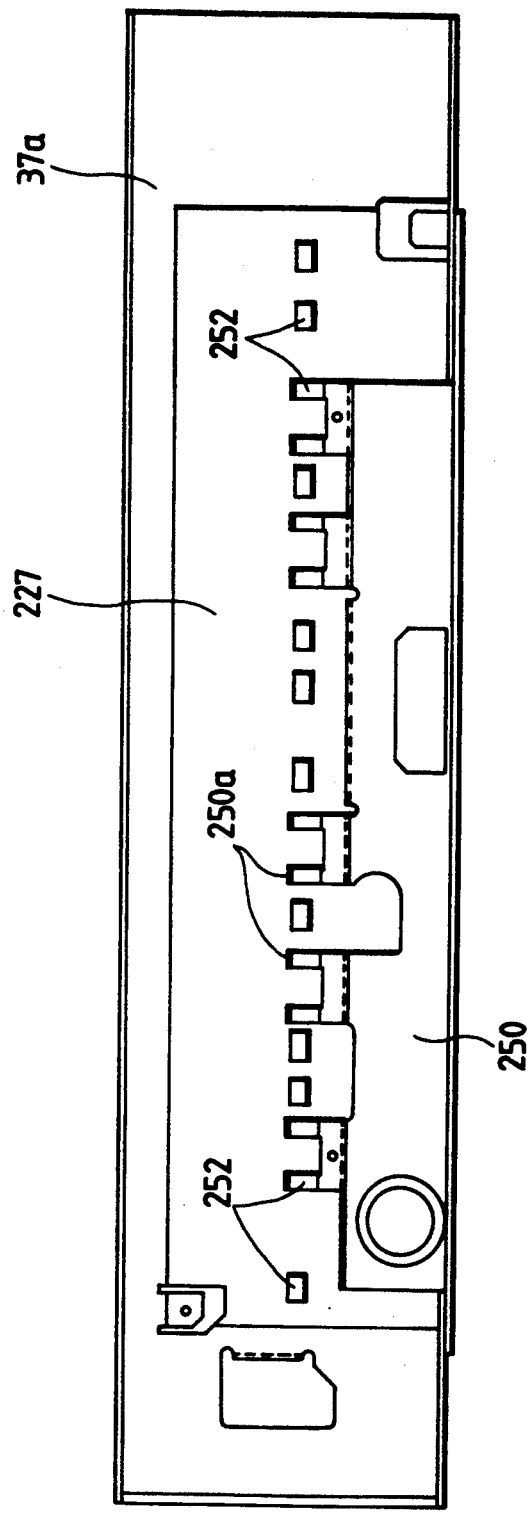

Reference will now be made in detail to the method of the present invention as illustrated in the accompanying drawings, in which like reference characters designate like or corresponding parts throughout the several drawings.

In the description to follow, a color copying machine will be used as an example of the image recording apparatus. It should be understood, however, that the present invention is not limited to use with a color copying machine, but may be applied to other types of image recording apparatuses such as printers and facsimile machines.

The embodiments described in this specification are divided into sections and subsections. Sections I and II describe an overall system of a color copying machine incorporating the present invention. Section III describes in detail the embodiments of the present invention which are realized in the color copying machine. An outline of the sections and subsections is as follows:

(I) INTRODUCTION (I-1) System Configuration (I-2) Functions and Features (I-2-A) Functions
(I-2-B) Features
(I-2-C) Use Distinction (I-3) Electrical Control System (I-3-A) Hardware Architecture and Software
(I-3-B) State Division (II) SYSTEM DETAILS (II-1) System Configuration (II-2) Image Processing System (IPS)

(II-2-A) IPS Modules
(II-2-B) IPS Hardware (II-3) Image Output Terminal (IOT)

(II-3-A) Outline
(II-3-B) Transfer Loop (II-4) User Interface (U/I)

(II-4-A) Use of Color Display
(II-4-B) System Configuration
(II-4-C) Effective Use of Display Screen
(II-4-D) Hand Control Panel (II-5) Film Image Reader (II-5-A) Outline
(II-5-B) Major Functions
(II-5-C) Image Processing
(II-5-D) Operation Procedure and Signal Timing (III) IMAGE INPUT TERMINAL (IIT)

Figure 2:
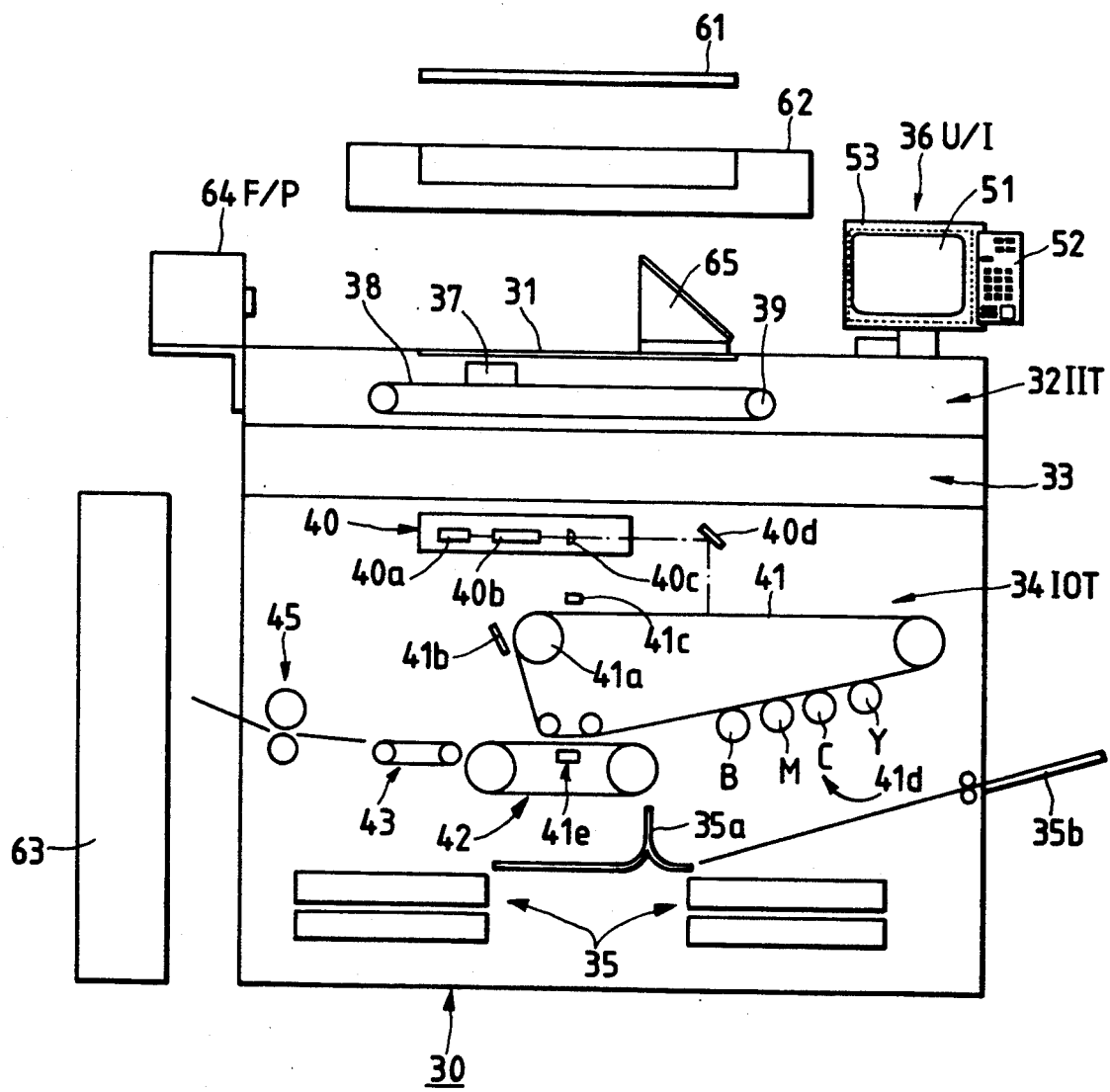
FIG. 2 is a longitudinal sectional view of the overall structure of a color copying machine incorporating the present invention.

(III-1) Imaging Unit Drive Mechanism
(III-2) Control System for Stepping Motor
(III-3) IIT Control System
(III-4) Imaging Unit
(III-5) Video Signal Processing Unit
(III-6) Radiation Means for Line Sensor Driver (I) INTRODUCTION (I-1) System Configuration FIG. 2 shows a configuration of a color copying machine as a specific embodiment of the present invention.

In the color copying machine incorporating the present invention, a base machine 30 is made up of a platen glass 31, image input terminal (IIT) 32, electric control housing 33, image output terminal (IOT) 34, tray 35, and user interface (U/I) 36. The base machine 30 optionally includes an edit pad 61, auto document feeder (ADF) 62, sorter 63, and film projector (F/P) 64.

Electrical hardware is required for controlling the IIT, IOT, U/I, etc. The electrical hardware is divided into a plurality of circuit sections with different signal/data processing functions, such as IIT, IPS for processing the output image signals of the IIT, U/I, and F/P. These circuit sections are assembled into circuit boards, respectively. Together with a SYS board for controlling the above circuit boards, and an MCB (machine control board) for controlling the IOT, ADF, sorter, etc., these circuit boards are housed in the electrical control housing 33.

The IIT 32 is made up of an imaging unit 37, and the combination of a wire 38 and a drive pulley 39, which is for driving the imaging unit 37. The imaging unit 37 reads a color image on an original in terms of image signals of the primary colors, blue (B), green (G) and red (R), by using a CCD sensor and color filters, and converts them into digital image signals, and sends the separated color image signals to an image processing system (IPS).

In the IPS, the B, G and R signals from the IIT 32 are converted into toner primary colors yellow (Y), cyan (C), magenta (M), and black (K). The Y, C, M and K signals are subjected to various processings for improving the reproducibility of color, gradation, definition, and the like. Further, the gradation toner signal of each process color is converted into an on/off or two-level toner signal, and the two-level signals are transferred to the IOT 34.

In the IOT 34 containing a scanner 40 and a photosensitive belt 41, a laser output unit 40a converts the image signals from the IPS into light signals. The light signals travel an optical path including a polygon mirror 40b, F/8 lens 40c and reflecting mirror 40d, and reach the photosensitive belt 41, and form a latent image corresponding to the original image on the surface of the belt. The photosensitive belt 41 is driven by a drive pulley 41a. A cleaner 41b, charger 41c, developing units 41d for the primary colors Y, M, C and K, and a transfer unit 41e are disposed around the belt 41. A tow roll transfer loop 42 is disposed close to the transfer unit 41e, as shown. The tow roll transfer loop 42 picks up a sheet of paper as it is transported along a paper transfer path 35a from a tray 35, and in cooperation with the transfer unit transfers color toners to the paper. In the case of the full color copy of the 4 pass color type, the tow roll loop is turned four times, and the color toners are transferred on the paper in the order of Y, M, C and K. The paper bearing the transferred color toner image is transported through a vacuum transfer belt 43 to a fixing or fusing unit 45, and is then ejected outside the base machine. If necessary, a single sheet inserter (SSI) 35b may feed a sheet of paper to the paper transfer path 35a.

The U/I 36 is used by a user when selecting a desired function and sets up the conditions to exercise the function. The U/I 36 is provided with a color display 51, and a hard control panel 52 located by the display. In combination with an infrared-ray touch board 53, it enables the user to directly designate necessary functions by soft buttons on the display screen.

Optional units available for the base machine are as follows. The first optional unit is an edit pad 61 as a coordinate input device, which is placed on the platen glass 31. The edit pad enables a user to variously edit images with the aid of a pen or a memory card. Further, the ADF62 and the sorter 63 may optionally be used.

A mirror unit (M/U) 65 may further be installed. In this instance, it is placed on the platen glass 31. In association with this, the F/P 64 is installed. A color image of a color film, for example, that is projected by the F/P 64, is read by the imaging unit 37 of the IIT 32. With the combination of the M/U 65 and F/P 64, the images of a color film can be copied directly from the color film. The object to be imaged may contain negative and positive films, and slides. Additionally, an auto focusing device and a correction-filter auto exchanging device are installed into the copying machine under discussion.

(I-2) FUNCTIONS AND FEATURES (I-2-A) Functions

The color copying machine according to the present invention has various types of functions to meet the user's needs, and is operable in a completely automated manner throughout the copying process. A display unit, for example a CRT, may be used in the user interface to visually present the selection of various functions, the conditions to exercise the selected functions, as well as other necessary menus. Because of the function of the user interface, both highly skilled persons and beginners alike will find it easy to access and use the copying machine.

One of the major functions of the color copying machine concerns the selection of hard control panel operations of items that are out of operation flow such as start, stop, all clear, ten keys, interrupt, information, and languages, and selective operations of the respective functions by touching soft buttons in a basic display. By touching a pathway tab of a pathway as a function select area, an operator may select any of various types of edit functions, such as marker edit, business edit, and creative edit. By using such functions, any operator can operate the color copying machine to make both monochromatic and full color copies as simply and easily as operating a conventional copying machine.

The copying machine of the present invention features the full color or 4-pass color copying function, and is also operable in the 3-pass color or black copy mode, if necessary.

With respect to paper feed, automatic paper size select and paper size designation are possible.

Reduction/enlargement is possible in a broad range of 50% to 400% with steps of 1%. Additionally, horizontal and vertical magnification of an image may be independently and automatically selected.

Optimum copy density can be automatically set for a mono color original, and when a color original is copied, an auto color balance mode may be used, in which a user may designate a subtractive color.

A memory card storing job programs is used for accessing the job programs. A maximum of eight jobs can be stored in the memory card. The memory card has a memory capacity of 32K bytes. Jobs other than that of the film projector mode can be programed.

Additional functions relate to copy output, copy sharpness, copy contrast, copy position, film projector, page programming, and margin selection.

In the case of the copying machine or copier coupled to an optional sorter, when an uncollated mode is selected, the copy output function operates and hence a maximum adjusting function operates to set up to a number of copies that the bin of the sorter can accommodate.

Copy sharpness to effect the edge emphasis, a manual sharpness adjustment mode of seven steps and a photo sharpness adjustment mode of photo, character, print, and photo/character are optionally provided. Copy position is for selecting a position on a sheet of paper where an image is to be copied. An auto centering function to set the center of a copied image at the center of the sheet is optionally used. The default is the auto centering.

The film projector enables images of various types of films to be copied. Any of the following modes can be selected: projections of 35 mm negative and positive films, 35 mm negative film platen placement, 6 cm×6 cm slide platen placement, and 4 in×4 in slide platen placement. In the film projector mode, paper of A4 size is automatically selected unless another paper size is designated. The film projector pop-up has a color balancer. When the color balancer is set to "Reddish", the projected image is tinged with red. When it is set to "Bluish", the image is tinged with blue. Particular auto and manual density controls are used.

The page programming function comes in four varieties; a covering function to attach a front/back cover or a front cover to the copies, an insert function to insert a white sheet or a color sheet into a stack of copies, a color mode in which a color mode is set up for every page, and a paper size select function in which a desired paper tray, together with the color mode, is selected for every page. The margin function sets the margin of the copy in steps of 1 mm and in the range of 0 mm to 30 mm. The margin can be set for only one side for one original.

The marker edit edits the image within an area enclosed by a marker. This function is directed to the editing of documents and treats the documents as black and white. In a black mode, a designated area on the document is painted the color of the palette on the CRT, while all areas other than the designated area are painted black. In a reddish black mode, an image on the document is painted red, while the remaining area is painted reddish black. The marker edit comprises the functions of trim, mask, color mesh, and black-to-color. The specific area may be designated by depicting a closed loop on the document, or by using the ten key keyboard or the edit pad. This same procedure is also applied to area designation in the editing functions discussed later.

The trim function allows the image within a marked area to be copied in mono color, but prevents the image outside the marked area from being copied, i.e., to erase the image outside the marked area.

The mask function causes the image within a marked area to be used and allows the image outside the marked area to be reproduced in mono color.

When the color mesh mode is exercised, a designated color mesh pattern is placed on a marked area and an image is copied in mono color. The color of the color mesh may be selected from among eight (8) standard colors (predetermined colors) and eight (8) registered colors (registered by a user). Up to eight different colors can be selected from 16,700,000 colors and simultaneously registered. A mesh pattern can be selected from among four patterns.

In the black-to-color mode, the image within the marked area can be copied with a color selected from the 8 standard colors and the 8 registered colors.

Business edit is mainly applied for business documents for quickly editing high quality originals. In this mode, the originals are treated as full color originals. The area or point designation is required for all the functions. A plurality of different functions can be simultaneously set for a single original. In a black/mono color mode, the image outside the specified area is black or mono color, while the black image within the specified area is changed to the palette color on the CRT display. In a reddish black mode, the image outside the specified area is colored in reddish black, while the image within that area is colored in red. The business edit, like the marker edit, is exercised in a variety of modes, such as trim, mask, color mesh, black-to-color, and further logotype, line, paint 1, correction, and function clear.

The logotype mode is used to insert a logotype such as a symbol mark at a specified point on an image. Two types of logotypes may be vertically or horizontally inserted. In this case, one logotype is allowed to be used for one original. The logo patterns are prepared in accordance with the client's request and stored into a ROM.

The line mode is provided to depict lines in two-dot expression vertically and horizontally with respect to an x-distance. The color of the line may be selected from the 8 standard colors and the 8 registered colors. An unlimited number of lines can be designated, and up to seven colors can be used simultaneously.

In the paint 1 mode, one point within an area defined by a closed loop is designated, and that area is entirely painted with one color selected from among the 8 standard colors and the 8 registered colors. When a plurality of loops are used, the painting is carried out for each area.

The mesh can be selected from four patterns for each area. The number of loops that can be designated is unlimited. Up to seven color mesh patterns can be used.

The correction function confirms, corrects, changes, and erases the matters concerning an area as specified, and executes these functions by using three operation modes, an area/point change mode, area/point correction, and area/point cancel mode. The area/point change mode confirms and changes the set functions for each area. The area/point correction mode changes the area size, and changes the point position in steps of 1 mm. The area/point cancel mode erases the specified area.

The creative edit is exercised by using many functions including image composition, copy-on-copy, color composition, partial display change, multi-page enlargement, paint 1, color mesh, color change, negative/positive inversion, repeat, paint 2, density control, color balance, copy contrast, copy sharpness, color mode, trim, mask, mirror image, margin, line, shift, logotype, split scan, correction, function clear, and add function. In the creative edit mode, the original is treated as a color original. A plurality of functions can be set for one document. Different functions may be used for one area. The area may be specified by a rectangle via a two-point designation and by a point via a one-point designation.

In the image composition mode, a base original is color copied through the 4-cycle color copying operation. The resultant copied paper is left on the transfer belt. Then, a trimmed original is superimposed and copied on the copied paper through the 4-cycle copying operation. Finally, the paper thus copied is outputted.

In the copy-on-copy mode, a first original is copied through the 4-cycle color copying operation. The resultant copied paper is left on the transfer belt. Then, a second original is superimposed and copied on the copied paper through the 4-cycle copying operation. Finally, the paper thus copied is outputted.

In the color composition mode, a first original is copied using magenta toner, and the copied paper is left on the transfer belt. A second original is superimposed and copied on the first copied paper, using cyan, and the copied paper is fixedly placed there. Finally, a third original is superimposed and copied on the second copied paper, using yellow. In a 4-color composition mode, a fourth original is superimposed and copied on the third copied paper, using black.

In the partial display shift, after a color copy is obtained through the 4-cycle color copying operation, the color copied paper is left on the transfer belt. Subsequently, another copy is superimposed on the first paper through the 4-cycle copying operation. Finally, the paper thus copied is outputted.

Of those color modes, the full color mode is based on the 4-cycle copying operation. The 3-pass color mode is based on the 3-cycle copying operation in modes other than the editing mode. The black mode is based on the 1-cycle copying operation in modes other than the editing mode. The plus-one mode is based on the 1- to 3-cycle copying operations.

The tool pathway mode is exercised by using many functions including an auditron, machine setup, default selection, color registration, film type registration, color correction, preset, film projector scan area correction, audio tone, timer set, billing meter, diagnosis mode, max. adjustment, and a memory card formatting. In this pathway mode, a password is needed for making settings and changes. Accordingly, only key operators and customer engineers are permitted to make the settings/changes in this mode. Use of the diagnosis mode is permitted for customer engineers alone.

Color registration is used for registering colors in the register color button in the color palette. The CCD sensor reads the color to be registered from the color original.

Color correction is used for fine correction of the colors registered in the register color button.

The film type registration is for registering a register film type used in a film projector mode. When it is not registered, a register button cannot be selected on the film projector mode display.

The preset mode is for presetting reduction/enlargement values, 7 steps of copy density, 7 steps of copy sharpness, and 7 steps of copy contrast.

Film projector scan area correction is for adjusting a scan area in the film projector mode. Audio tone is for adjusting the volume of a select sound, for example. Timer is for setting a timer releasable to key operators.

Some additional functions are provided for a trouble diagnosis system. A first function is used when the subsystem is placed in a clashing state. In such a situation, this function operates and re-drives the subsystem to recover it from the clashing state. A second function is used when the subsystem is still in the clashing state even if the clash recovery is applied two times. In such a situation, this function operates to set up a fault mode in the subsystem. A third function operates when jamming occurs in the copying machine. In this case, the third function operates to stop the machine operation.

It is evident that the color copying machine of the present invention is operable with the basic copying function and a combination of additional functions, and the combination of the basic copying function/additional functions and marker edit, business edit, creative edit, and the like.

A copying system including the color copying machine with the above functions offers advantageous and convenient features as described hereinafter.

(I-2-B) FEATURES

(a) High Quality Full Color

A high quality, clear and distinctive full color image of a color document is attained, with improvements of black image reproduction, light color reproduction, generation copy quality, OHP image quality, thin line reproduction, image quality reproduction of film copies, and copied image sustaining.

(b) Cost Reduction

The cost of image forming materials and expendables such as a photosensitive drum, developing unit and toner is reduced. Service costs, including UMR and parts costs, are also reduced. In addition, because the color copying machine is operable as a mono color copying machine and the copying speed for mono color copies is about three times faster than that of a conventional copying machine (30 copies/A4), running costs are reduced.

(c) Improved Reproducibility

Input/output devices such as an ADF and a sorter are optionally available, enabling a large number of documents to be copied. Magnification may be set within a broad range of 50% to 400% and the maximum document size that can be copied is A3. Three stages of paper trays are used, the upper tray accommodating B5 to B4 size paper, the medium tray accommodating B5 to B4, and the lower tray accommodating B5 to A3 and SSIB5 to A3. The copy speed for the full color (4-pass color) copy is 4.5 CPM for A4, 4.8 CPM for B4, and 2.4 CPM for A3. The copy speed for the mono color copy is 19.2 CPM for A4, 19.2 CPM for B4, and 9.6 CPM for A3. The warmup time is within 8 minutes. FCOT is 28 seconds or less for the 4-color full color copy, and 7 seconds or less for the mono color copy. A continuous copy speed is 7.5 copies/A4 for the full color copy and 30 copies/A4 for the mono color copy.

(d) Improved Operability

Two types of operation buttons are used, hard buttons on the hard control panel and soft buttons on the soft panel of the CRT display screen. Use of these buttons provides for easy operation for beginners and simple operation for experts and further enables operators to directly select desired functions. As for the layout of controls including these buttons, the controls are concentrated at one location for ease of operation. Effective use of colors correctly sends necessary information to operators.

A high fidelity copy can be obtained by using the operations on the hard control panel and the basic display. The hard button is used for the operations out of an operation flow, such as start, stop, all clear, and interrupt. The operations on the soft panel of the basic display are used for paper size select, reduction/enlargement, copy density, picture quality adjustment, color mode, color balance adjustment, and the like. The soft panel operations are easily accepted by users accustomed to mono color copying machines. To access the various edit functions, a pathway is opened by merely touching a pathway tab in a pathway area on the soft panel, and an operator may readily access the edit modes. Storage of copy modes and conditions for exercising them in a memory card allows for an automation of relation manual operations.

(e) Variety of Functions

A variety of editing functions can be accessed by touching a pathway tab in the pathway area on the soft panel to open the pathway. In the marker edit mode, mono color documents can be edited by using a marker tool. In the business edit mode, high quality business documents can be prepared quickly. In the creative edit mode, various editing functions are available. In the full color, black, and mono color copy modes, many choices are available to meet the needs of a variety of expert operators, such as designers, copy service businesses, and professional key operators. The area specified when the editing functions are used is displayed in the form of a bit map area, thus providing visual confirmation of the specified area.

(f) Power Saving

A high performance color copying machine of the full color type (4-pass color) realized by the present invention can operate at 1.5 kVA. A control system realizing this 1.5 kVA specification in the respective operation modes in addition to a power distribution to the circuit systems for different functions are used. In addition, an energy transmission system table for confirming energy transmission systems is prepared so that the management and verification of power consumption can be carried out by using the energy transmission system table.

(I-2-C) Use Distinction

The color copy machine of the present invention is operable as a full color copying machine and a mono color copying machines and is useful not only as a mere copying machine, but also as an aid to creative work. Accordingly, the copying machine satisfies the requirements of both professional operators and artists. The copying machine has many distinctive uses, as shown by the following examples.

Posters, calendars, cards or invitation cards, and New Year's cards with photographs can be made with the color copy machine of the present invention at a much lower cost than if they were made by a conventional printing machine, assuming the number of items to be printed is not large. If the editing functions are utilized correctly, original calendars, for example, may be made. Further, the calendars may be prepared for each division of a company.

Recent marketing analysis has shown that the coloring of industrial products, e.g., electric appliances, and interiors greatly influences their marketing success. The color copying machine of the present invention can be used for coloring at the manufacturing stage of a product. Accordingly, a plurality of persons including designers and persons relating to the manufacturing and selling of a product can satisfactorily study and discuss the product design by creating colored design copies. For example, in the apparel business, the color copying machine of the present invention is very useful in that the designs, complete with selected colors, can be sent to the garment maker. Accordingly, the garment order is understood exactly, enabling the manufacturing of the garment to be smoothly and effectively carried out.

The ability to produce both color copies and mono color copies of an original is convenient for college and university students who are studying chromatics. When studying a graphic design, they can copy the design in both color and mono color copies, and thus comparatively study the design. With a comparative study, the fact that in the color red, gray is present in almost uniform amounts can be clearly seen. Further, it can be seen how gray level and saturation affect the visual sensation.

(I-3) ELECTRICAL CONTROL SYSTEM

This section will discuss hardware architecture, software, and state division in an electrical control system of the color copying machine according to the present invention.

(I-3-A) Hardware Architecture and Software

A color CRT used as the U/I in the color copying machine of the present invention requires a larger amount of data for color display than a monochromatic CRT. In addition, attempts to build a more user-friendly UI by creating a display screen layout and display change also results in an increase in the amount of required data.

Use of a CPU with large amounts of memory requires a large circuit board which creates additional problems because it is difficult to house a large board in the base machine. Thus, the large board makes it difficult to alter the design of the copying machine. Further, the large board increases the manufacturing cost.

Figure 3:
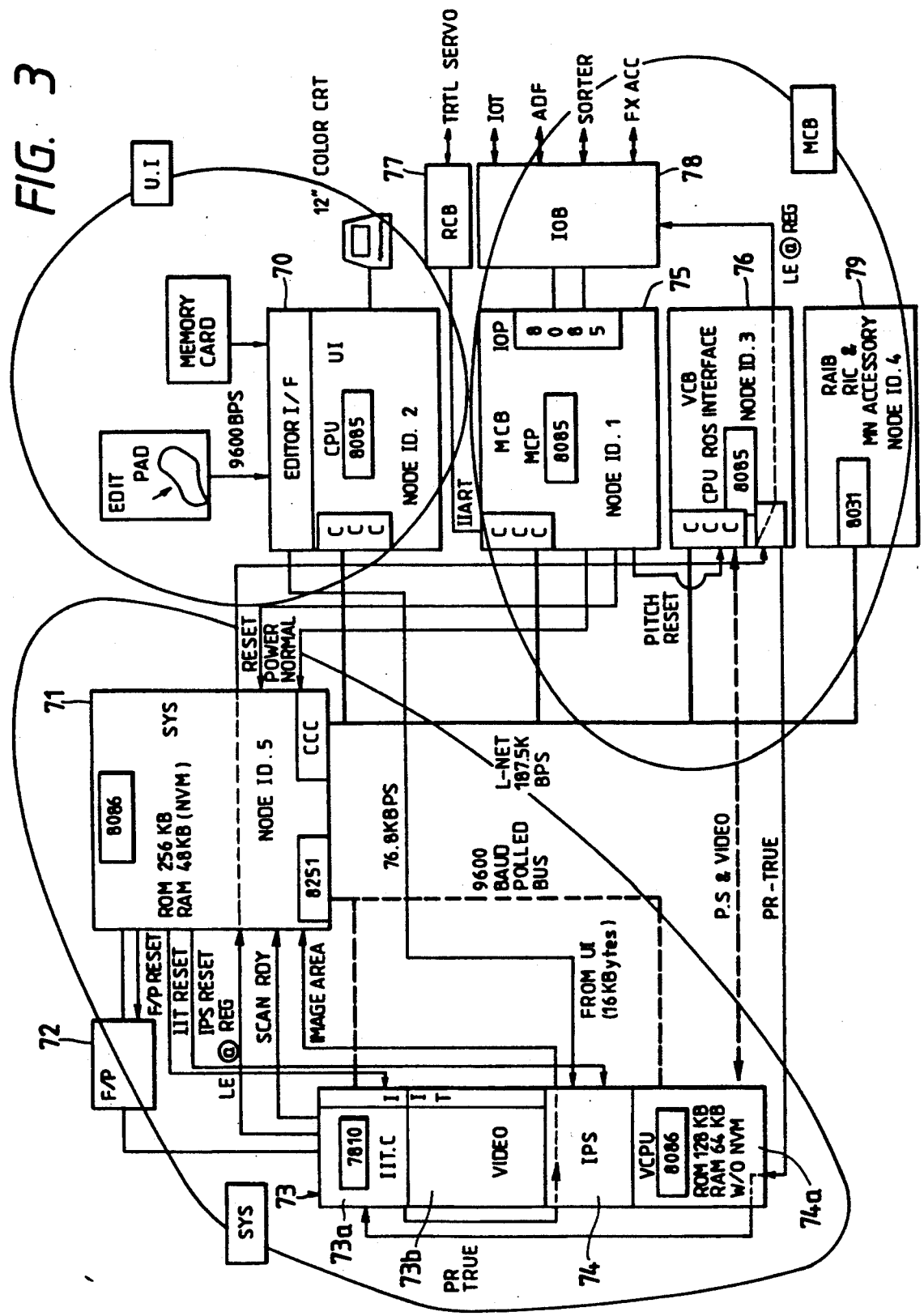
FIG. 3 shows a hardware architecture of the present invention.

To cope with the increased amount of data, the color copying machine of the present invention is arranged such that the data processing function (CPU) is decentralized. The hardware of the electrical system, as shown in FIG. 3, is composed of a UI system, SYS system, and MCB system. The UI system contains a UI remote 70. In the SYS system, an F/P remote 72 controls the F/P, an IIT remote 73 reads an image of an original, and an IPS remote 74 for executing various image processing routines are self-contained and independently execute their own data processing routines. The IIT remote 73 includes an IIT controller 73a for controlling the imaging unit, and a VIDEO circuit 73b for digitizing the read image signals and sending the digitized image signals to the IPS remote 73b. The IIT remote 73 and the IPS remote 74, is controlled by a VCCPU 74a. An SYS (system) remote 71 is provided as a control unit for controlling the remotes as mentioned and will be discussed later.

The SYS remote 71 requires a large memory capacity in order to store a program to control the display changes of the UI as well as other programs. An 8086 16-bit microprocessor is used to control the SYS remote 71 and, if required, a 68000 microprocessor may be used.

The MCB system is comprised of a VCB (video control board) remote 76, RCB remote 77, IOB remote 78, and an MCB (master control board) remote 75. The VCB remote 76, serving as a raster output scan (ROS) interface, receives a video signal from the IPS remote 74 to form a latent image on the photosensitive drum by a laser beam, and sends the video signal to the IOT. The RCB remote 77 is for the servo system of the transfer belt (turtle). The IOB remote 78 serves as an I/O port for the IOT, ADF, sorter, and accessory. The MCB remote 75 synthetically manages the decentralized accessory remote 79.

Each remote in the drawing of FIG. 3 is constructed with a single board. In the figure, a bold continuous line indicates a high speed communication network LNET running at 187.5 kbps, a bold broken line indicates a master slave type serial communication network running at 9600 bps, and thin continuous lines indicate hot lines as transmission lines for control signals. A 76.8 kbps line indicates a dedicated line for transmitting graphic data depicted on the edit pad, copy mode data entered from the memory card, and graphic data in the edit area from the UI remote 70 to the IPS remote 74. CCC (communication control chip) indicates an IC for supporting a protocol of the high speed communication line LNET.

As described above, the hardware architecture is composed of the UI system, SYS system, and MCB system. The processings shared by those systems will be described with reference to the software architecture of FIG. 4. Arrowheads indicate the direction of data transmission through the LNET high speed communication network and the master/slave type serial communication network, as well as the direction of control signal flow through the hot lines.

Figure 4:
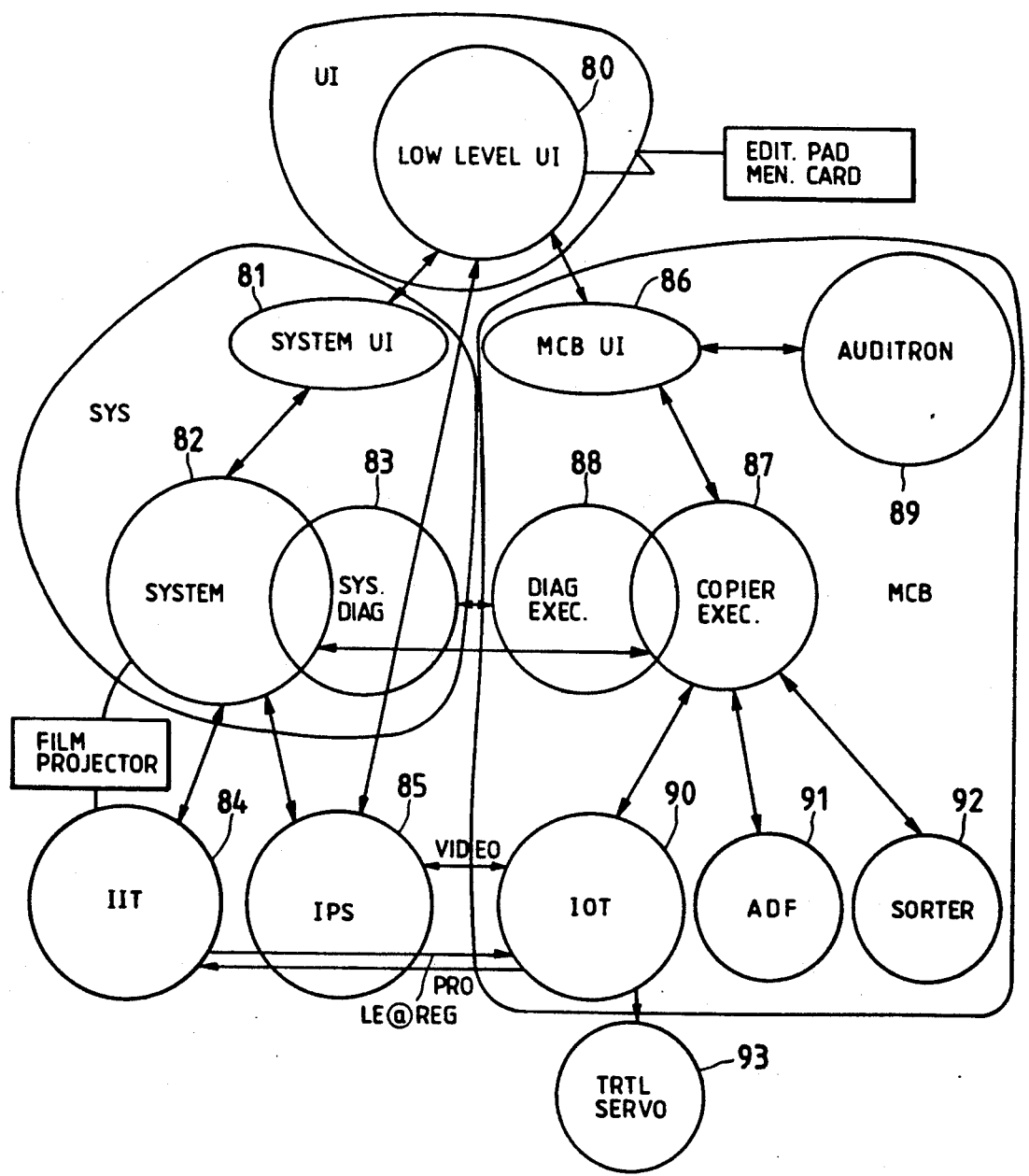
FIG. 4 shows a software architecture of the present invention.

As seen in FIG. 4, the UI remote 70 is made up of an LLUI (low level UI) module 80 and a module for processing edit pad and memory card data. The LLUI module 80, which is similar to a CRT controller, is a software module for displaying an image on a color CRT screen. The displaying of images on the display screen is controlled by an SYSUI module 81 and an MCBUIT module 86. Therefore, the UI remote may be commonly made with another apparatus or device. The reason for this is that the display screen layout and display change depend on the type of apparatus used, while the CRT controller is used in combination with the CRT.

The SYS remote 71 comprises a SYSUI module 81, SYSTEM module 82, and a SYS.DIAG module 83.

The SYSUI module 81 is a software module for controlling the display change. The SYSTEM module 82 contains software for recognizing what coordinates are selected on the software panel and what display represents the selected coordinates, i.e., what job is selected, software for finally checking the job as to whether or not a contradiction exists in the copy exercising conditions, and software for controlling the transfer of various types of data, such as F/F select, job recovery, and machine state, to other modules.

The SYS.DIAG module 83 operates in a customer simulation mode in which a copying operation is performed in a self-test diagnostic state. In the customer simulation mode, the color copying machine operates as if it were operating in a normal copying operation mode. Accordingly, the DIAG module 83 is substantially the same as the SYS.DIAG module 82, only it is used in a special diagnostic state. For this reason, the DIAG module 83 is depicted separately from the SYSTEM module 82, even though their structures partially overlap.

An IIT module 84 for controlling a stepping motor used in the imaging unit is stored in the IIT remote 73. An IPS module 85 for executing various processing routines is stored in the IPS remote 74. These modules are controlled by the SYSTEM module 82.

The MCB remote 75 stores software modules, such as an MCBUI software module 86 for controlling the display change when the color copying machine or color copier is placed in a fault state by diagnostic, auditron, or jamming, an IOT module 90 for executing the processing necessary for the copying operation such as photosensitive belt control, developing unit control, and fuser control, ADF module 91 for controlling the ADF, and SORTER module 92, and a copier executive module 87 for managing the software modules, dia. executive module 88 for executing a variety of diagnostic routines, and an auditron module 89 for processing charge calculation by accessing an electronic counter with a password.

Figure 5A:
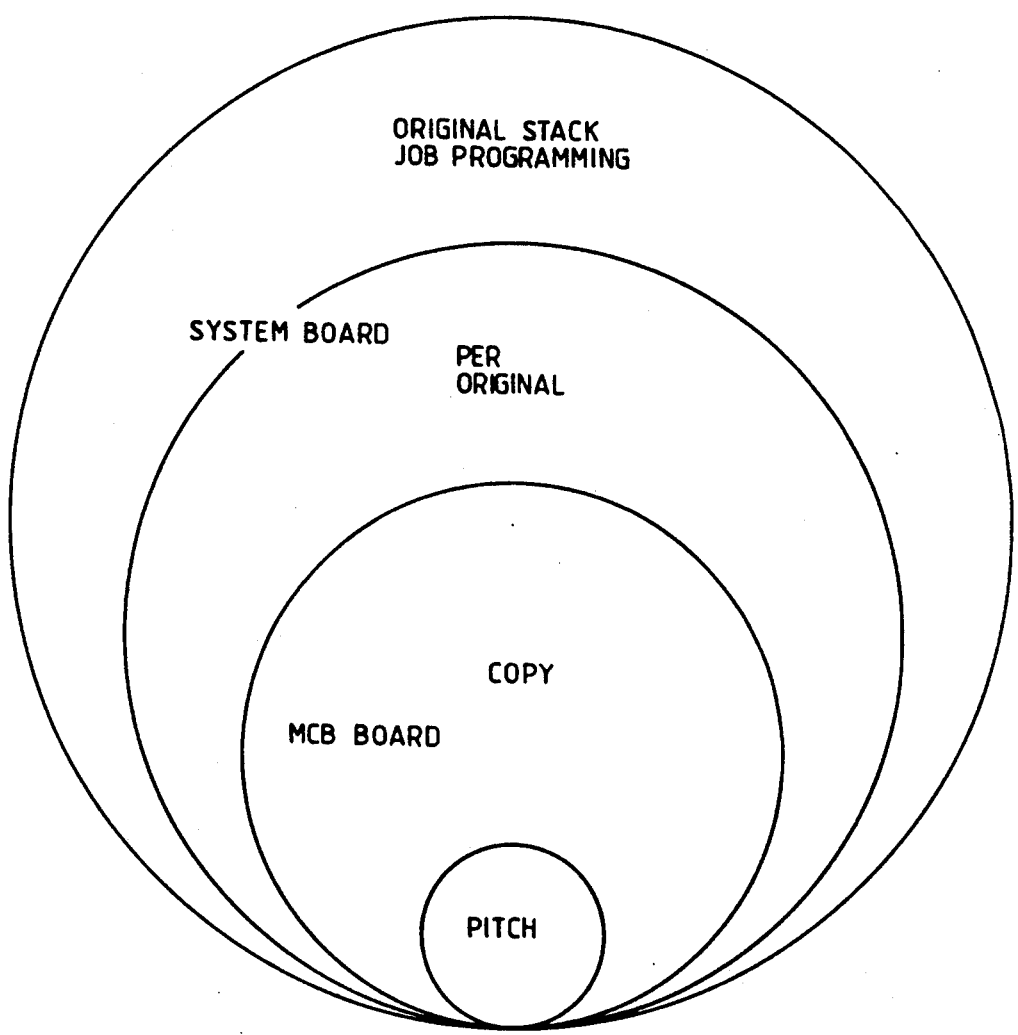
FIG. 5(a) shows copy layers.

The RCB remote 77 stores a turtle servo module 93 for controlling the operation of the turtle. The module 93 is controlled by the IOT module 90 in order to control the transfer process of the zerography cycle. In FIG. 4, the copier executive module 87 and the dia. executive module 88 are depicted partially overlapping with each other to indicate shared processing. The shared processing will be described by tracing a flow sequence of the copying operation. The copying operation, except the difference of colors, consists of a repetition of similar operations, and hence, it may be divided into layers, as shown in FIG. 5(a).

An operation unit, called pitch, is repeated to make a sheet of color copy. The operation for copying a mono color copy may consist of processings describing how to operate the developing unit, transfer unit, and the like, and how to detect jamming. The repetitive applications of a sequence of the pitch processings to three colors Y, M and C makes a three-pass color copy. When it is applied to four colors Y, M, C and K, a four-pass color copy is made. This sequence of copying operations forms a copy layer In the copy layer, the toners of three colors are transferred to the paper, the transferred color toner image is fused, and the copy paper or the paper bearing the fused color image is delivered outside the base machine. The processing up to this point is managed by the copier executive module 87.

The IIT module 84 and the IPS module 85 in the SYS system are also used for pitch processing. To this end, the IOT module 90 communicates with the IIT module 84 by using two types of signals, a PR-TRUE signal and a LE-REG signal. More specifically, a PR (pitch reset) signal which provides reference timing for the control of the IOT is recursively generated by the MCB every time the photosensitive belt rotates ½ or ⅓ of a turn. To effectively use and increase its copy speed, the motion pitch of the photosensitive belt is divided in accordance with the size of paper used. For example, it is driven at the rate of 2 pitches for A3 paper, and at the rate of 3 pitches for A4 paper. The period of the PR signal generated every pitch is long, i.e. 3 seconds for the 2-pitch rate, and is short, 2 sec. for the 3-pitch rate.

The PR signal generated by the MCB is distributed to the necessary portions within the IOT, such as a VB remote for handling the VIDEO signal, by way of the hot lines.

The VCB, containing gate circuitry, selects only the pitch signal to allow imaging within the IOT, i.e., allow the photosensitive belt to be exposed to an image light, and sends it to the IPS remote. This signal is a PR-TRUE signal. The data to generate the PR-TRUE signal on the basis of the PR signal that is received through the hot line from the MCB, is applied from the MCB through the LNET.

During the period of time when the image cannot be projected onto the photosensitive belt, an idle pitch of 1 pitch is involved in the photosensitive belt. No PR-TRUE signal is outputted for such an idle pitch. No PR-TRUE signal is generated during the period from the instant that the transfer unit has eliminated the transferred copy paper until the next paper reaches the transfer unit. In the case of a long paper (A3 size), for example, if it is eliminated from the transfer unit immediately after the toner image transfer onto the paper is completed, the leading end of the paper hits the entrance of the fuser. At this time, the paper is shocked and the transferred toner image may be damaged. To avoid this problem, following completion of the image transfer onto large paper, the paper is rotated by one turn at a constant speed while being held by a grip bar, and is then transferred to the next stage. It is for this reason that the skip of 1 pitch is required for the photosensitive belt motion.

A PR-TRUE signal is also not generated during a period from the copy start by a start key until a cycle-up sequence is completed, because during this period, the reading of an original image is not yet completed and hence the photosensitive belt cannot be exposed to an image light.

The PR-TRUE signal outputted from the VCB remote is received by the IPS remote, and is also applied to the IIT remote. In the IIT remote, it is used as a trigger signal for scan start of the IIT.

The pitch processing in the IIT remote and the IPS remote may be synchronized with the operation of the IOT. At this time, a video signal which modulates a laser beam used for forming a latent image on the photosensitive drum is transferred between the IPS remote and the VCB remote 76. The video signal received by the VCB remote 76, which is a parallel signal, is converted into a serial signal. Then, the serial signal is directly applied, as a VIDEO modulation signal, to the laser output section 40a through the ROS interface.

The above sequence of pitch operations is repeated four times, to form a 4-pass color copy, and thus completing one cycle of a copying operation.

Figure 5B:
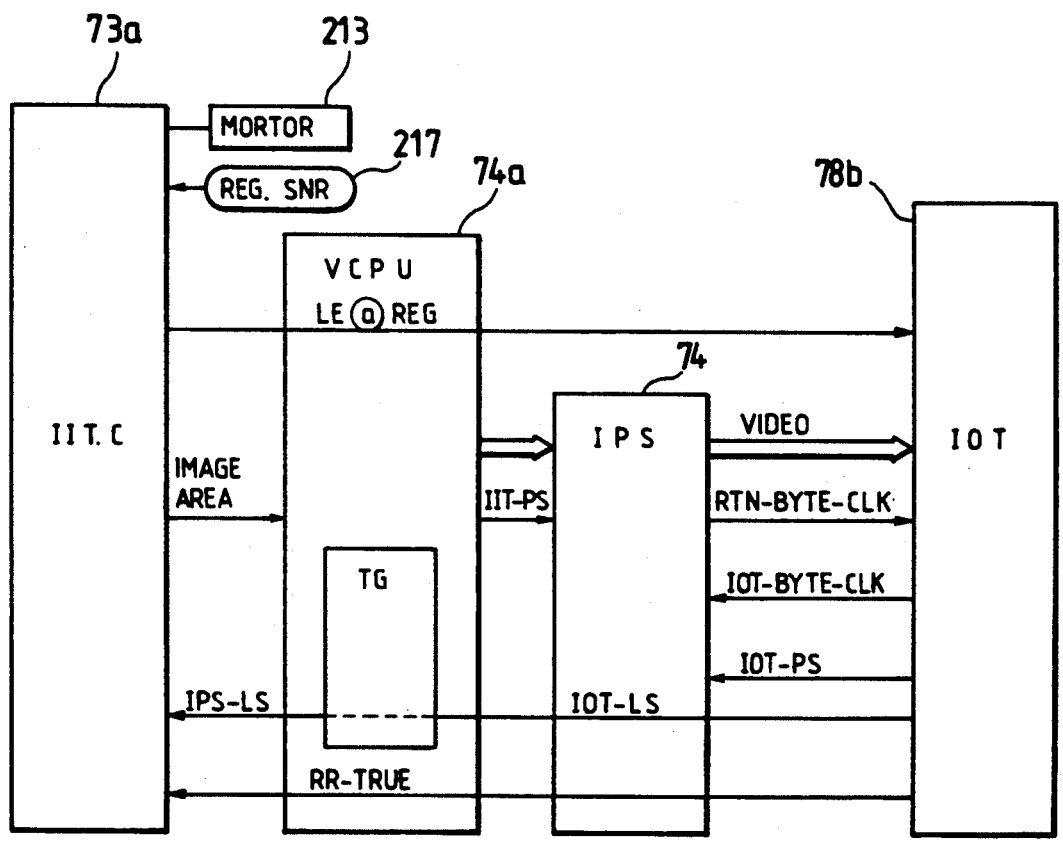
FIGS. 5(b) through 5(e) show signal transmissions and timings in the copying process.

The signal transmissions and timings in a copying process between the outputting of image signals read by the IIT to the IOT and the image transfer on a sheet of paper at the transfer point will be described with reference to FIGS. 5(b) to 5(c).

When receiving a start job command from the SYS remote 71, the operation of the IOT 78b enters a cycle-up sequence, comprising, for example, the drive of a main motor and the power on of a high voltage power supply, as shown in FIGS. 5(b) to 5(e). The IOT 78b produces a PR (pitch reset) signal, in order to form a latent image, with a length corresponding to a paper length, on the photosensitive belt. For example, a 3-pitch PR signal is generated for an A4 size paper, and a 2-pitch PR signal, for a A3 size paper. Upon completion of the cycle-up sequence in the IOT 78b, a PR-TRUE signal is synchronously applied to the IIT controller 73a with the PR signal in connection with only the pitch requiring the imaging.

From the IOT 78b, an IOT-LS (line sink) signal, which is outputted during every one-line rotation of the ROS (raster output scan), is sent to a timing generator (TG) in the VCPU 74a. An IPS-LS, whose phase is advanced by a delay corresponding to the total number of pipe lines of the IPS with respect to the IOT-LS signal, is transferred to the IIT controller 73a.

When receiving the PR-TRUE signal, the IIT controller 73a enables a counter, and counts the IOT-LS signal. When the count reaches a predetermined value, a stepping motor 213 for driving the imaging unit 37 is started up, and the imaging unit starts to scan an original. The counter continues to count and, after T2 seconds, an LE-REG signal is outputted to the IOT 78b at the start position of reading the original.

With respect to the read start position, a position of a reginsor 217 (near the reg. position, more exactly located at a position separated by about 10 mm from the reg. position toward the scan side) is detected, and a true reg. position is calculated using the detected position of the reginsor 217. At the same time, a normal stop position (home position) can also be calculated.

The reg. positions of different copying machines differ from one another due to mechanical dispersion. To cope with this, corrected values are stored in NVM (nonvolatile memory). When the true reg. position and the home position are calculated, the stored values are used to obtain a correct original start position. The corrected value may be altered by electrically reprogramming at the factory or by a serviceman. The position of the reginsor 217 is separated by about 10 mm from the true reg. position toward the scan side because of adjustment and the software. A minus value can be always used for the correction.

The IIT controller 73a outputs an IMAGE-AREA signal in synchronism with the signal LE-REG. The duration of the IMAGE AREA signal is proportional to the scan length defined by a start command which has been transferred from the SYSTEM module 82 to the IIT module 84. More specifically, when a document size is detected for the copying operation, the scan length is equal to the document length. When a magnification is designated for the copying operation, the scan length is determined by a divisor of the copy paper length and a magnification (100% is set at 1). The IMAGE-AREA signal is applied to the VCPU 74a. The VCPU 74a outputs the signal as an IIT-PS (page sink) for transmission to the IPS 74. The IIT-PS signal indicates the time to execute image processing.

When the LE-REG signal is outputted, data of one line of the line sensor is read in synchronism with the IOT-LS signal. The data thus read is transferred to the VIDEO circuit (FIG. 3) where it is subjected to various correction processings and A/D conversion. The output data signal of the VIDEO circuit is then transferred to the IPS 74. The IPS 74 transfers the video data of one line to the IOT 78b in synchronism with the IOT-LS signal. At this time, a signal RTN-BYTE-CLK, together with the data, is returned to the IOT, and the data and clock are also delayed to secure reliable synchronicity.

When the signal LE-REG is inputted to the IOT7 8b, the video data is transferred to the ROS in synchronism with the IOT-LS signal, so that a latent image is formed on the photosensitive belt. When receiving the signal LE-REG, the IOT 78b starts to count by the signal IOT-CLK with reference to the timing of the signal LEREG. The servo motor of the transfer unit is controlled so that the leading edge of a paper is positioned at the transfer point defined by a predetermined count. As seen from FIG. 5(d), the PR-TRUE signal generated by the rotation of the photosensitive belt is not inherently synchronized with the IOT-LS signal outputted by the rotation of the ROS. Therefore, when the signal PR-TRUE is received, the count starts at the next IOT-LS, the imaging unit 37 is driven at a count "m," and the signal LE-REG is outputted at a count "n", the signal LE-REG is delayed by time $T_1$ behind the signal PR-REG. A maximum delay is one line sink. In the case of the full color copy, the delay is accumulated and the accumulation results in a color displacement.

Figure 5C:
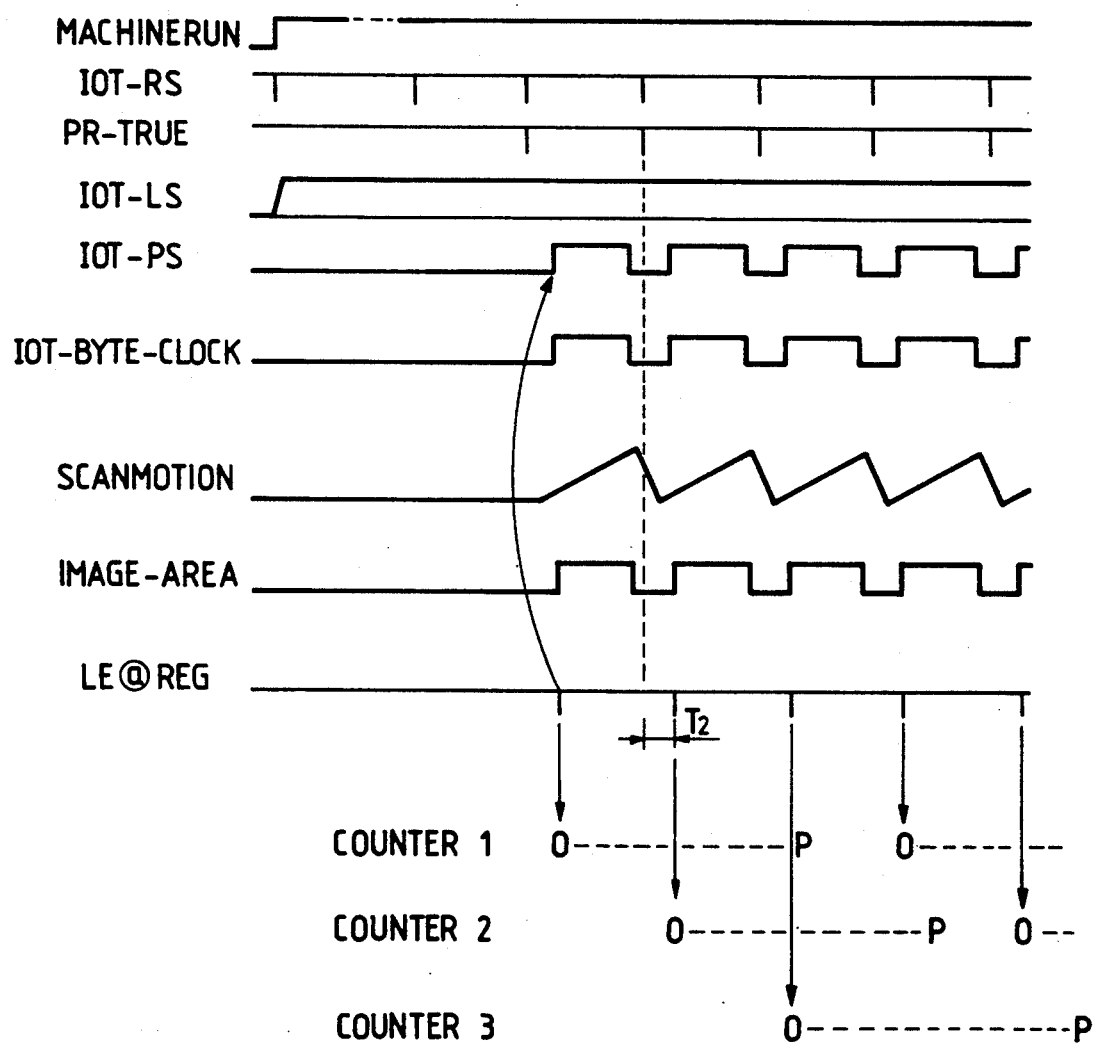
Figure 5D:
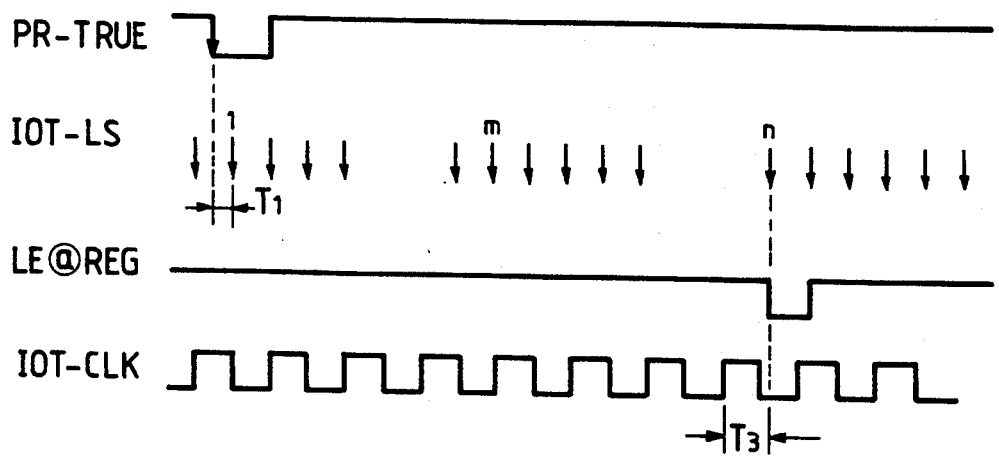
Figure 5E:
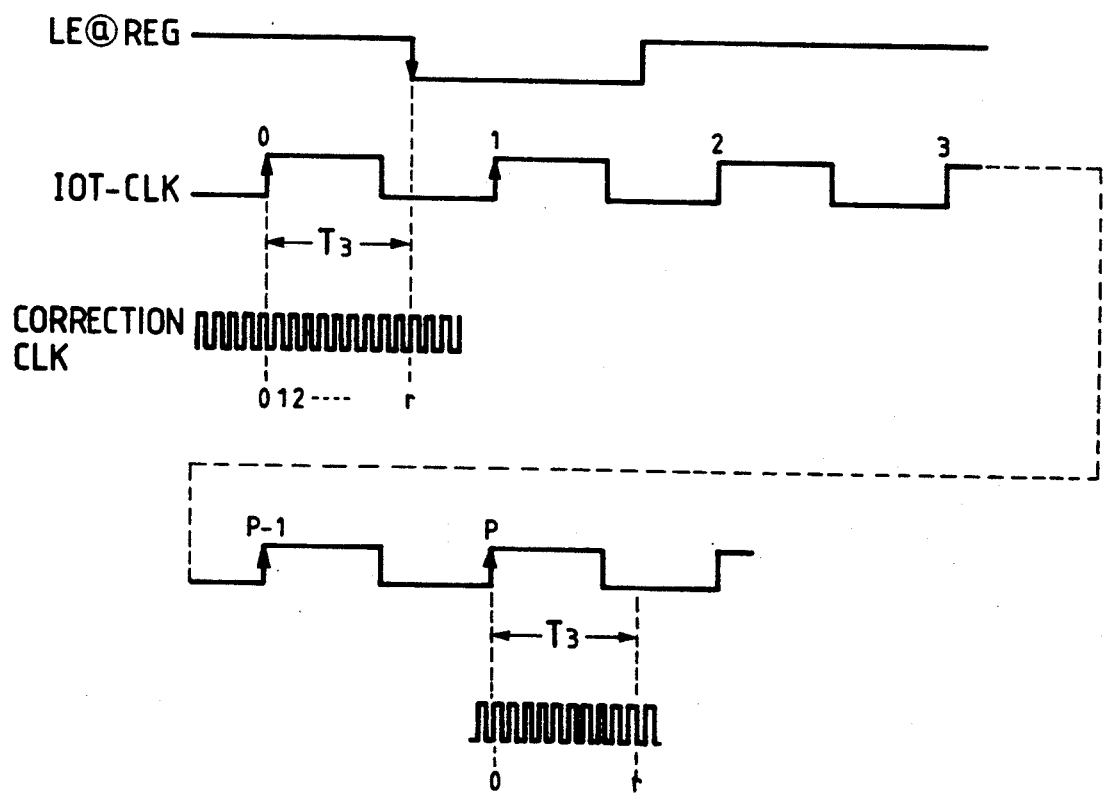

As a measure for the above, as shown in FIG. 5(c), when the first signal LE-REG occurs, the counter 1 starts to count, and when the second and third signals LE-REG occur, the counters 2 and 3 start to count. When the counters reach a count "p" corresponding to the transfer point, the counters are cleared. For the fourth and subsequent count, the counters start to count in a similar way. As shown in FIG. 5(e), when the signal LE-REG occurs, time $T_3$, lasting from the pulse of the IOT-CLK immediately before the signal LE-REG is counted in accordance with a correction clock. A latent image formed on the photosensitive drum approaches the transfer point and the counter based on the signal IOT-CLK reaches the count "p". At the instant that the count "p" is reached, the counting based on the correction clock starts. The sum of the correction clock and a count "r" corresponding to the time $T_3$ indicates a correct transfer point. This is introduced into the control of the counter that is exclusively used for controlling a transfer point (timing) of the transfer unit. In this way, the servo motor of the transfer unit is controlled so that the leading edge of the paper is exactly synchronized with the signal LE-REG.

Following the above described processings that are categorized into the copy layer, another processing step which sets the number of jobs as copy units executed for an original, i.e., to set the number of copies, is executed. This is executed in a per original (see FIG. 5(a)). An additional layer following the per original is a job programming layer to change parameters in jobs. More exactly, the job programming layer checks whether or not the ADF is used, a color of a part of an original is changed, and the one-side magnification function is operated. These layers of the per original and the job programming are managed by the SYS module 83 in the SYS system. Accordingly, the SYSTEM module 82 checks and confirms the jobs transferred from the LLUI module 80, generates the necessary data, and informs the IIT module 84 and the IPS module 85 of the job through the 9600 bps serial communication network, and also informs the MCB system of the same through the LNET.

As seen from the foregoing description, the controls that can be independently processed and made common with another apparatus or device are decentralized into the UI system, SYS system, and the MCB system. The modules for managing the copying machine are determined in accordance with the layers of the copying processes. This approach brings about many advantageous features. The design work of the electrical control system of the copying machine may be classified and itemized The developing techniques, such as software, can be standardized The time of delivery and the manufacturing costs can be exactly predicted. Finally, when some specifications are changed, it is only necessary to replace the respective modules.

(I-3-B) State Division

In the previous subsection, the shared controls of the UI system, SYS system and MCB system were described. In this subsection, the controls by these systems during the respective stages of machine operation will be described by tracing the machine operation flow.

Figure 6:
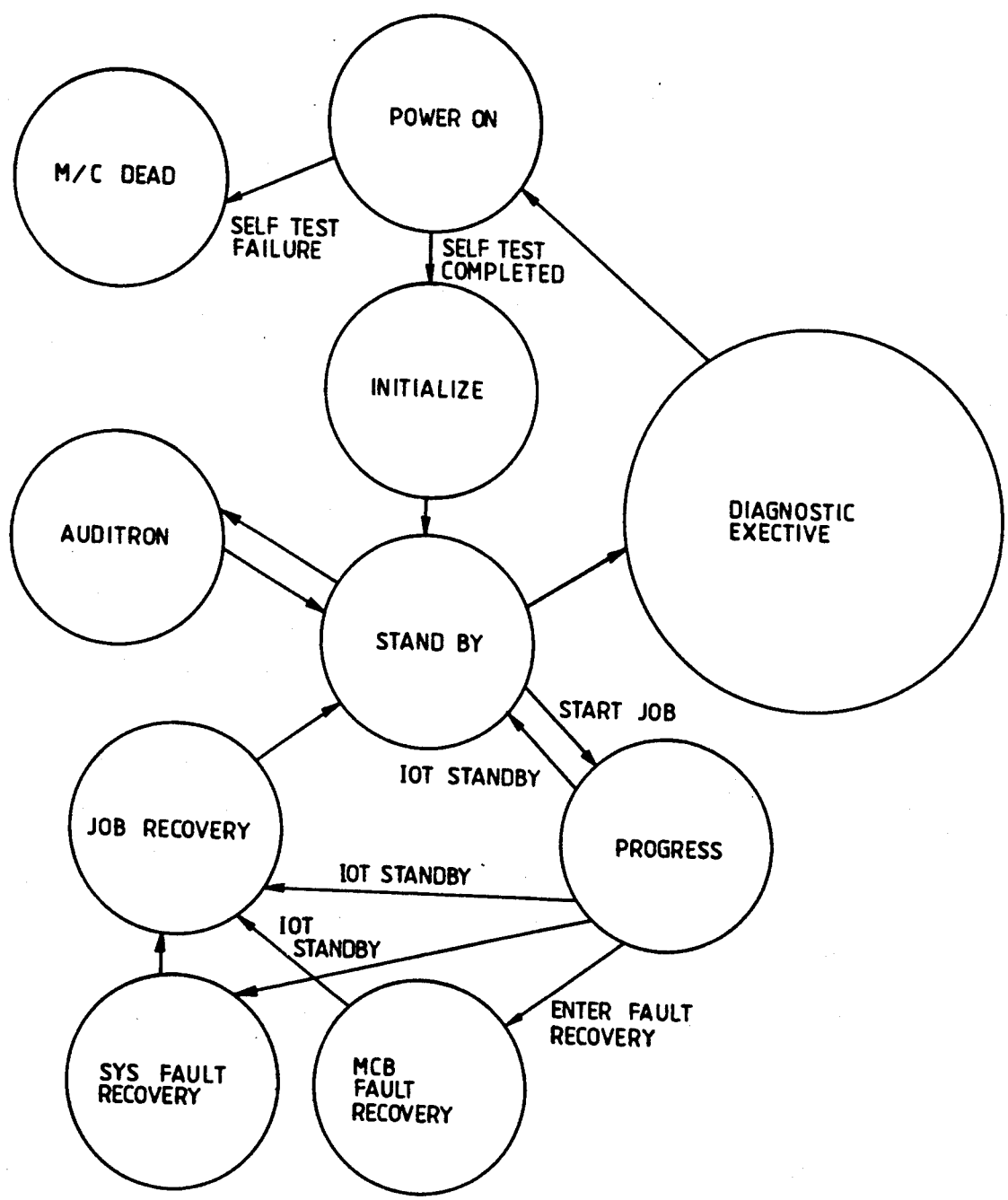
FIG. 6 is an explanatory diagram for explaining state divisions.

In the present color copying machine, the flow of machine operations including power-on, copying, end of copying, and machine state posterior to the copying operation, can be divided into a plurality of states wherein each state is assigned a respective job. Control cannot proceed to the next state until the job in the preceeding state is completed. This ensures efficiency and exactness of the control progression. The above method of controling the machine operation is called state division. In this instance, the machine operation is divided into states, as shown in FIG. 6.

The state division is structured such that in some operation modes, the SYS remote 71 possesses a control right to control all of the states and a UI master right to use the UI in a state, and in other control modes, the MCB remote possesses these rights. With the decentralization of control, the LLUI module 80 of the UI remote 70 is controlled not only by the SYSUI module but also by the MCBUI module 86. The processings are shared such that the pitch and copy processings are under control of the copier executive module 87 in the MCB system, and the per original processings and job programming processings are controlled by the SYS module 82. Accordingly, in some states, the SYS module 82 has the control right and the UI master right, and in other states, the copier executive module 87 has them. As shown in FIG. 6, in those states indicated by circles filled with vertical thin lines, the UI master right is possessed by the copier executive module 87 in the MCB system. In those states indicated by circles painted black, the UI master right is possessed by the SYS module 82.

Figure 7:
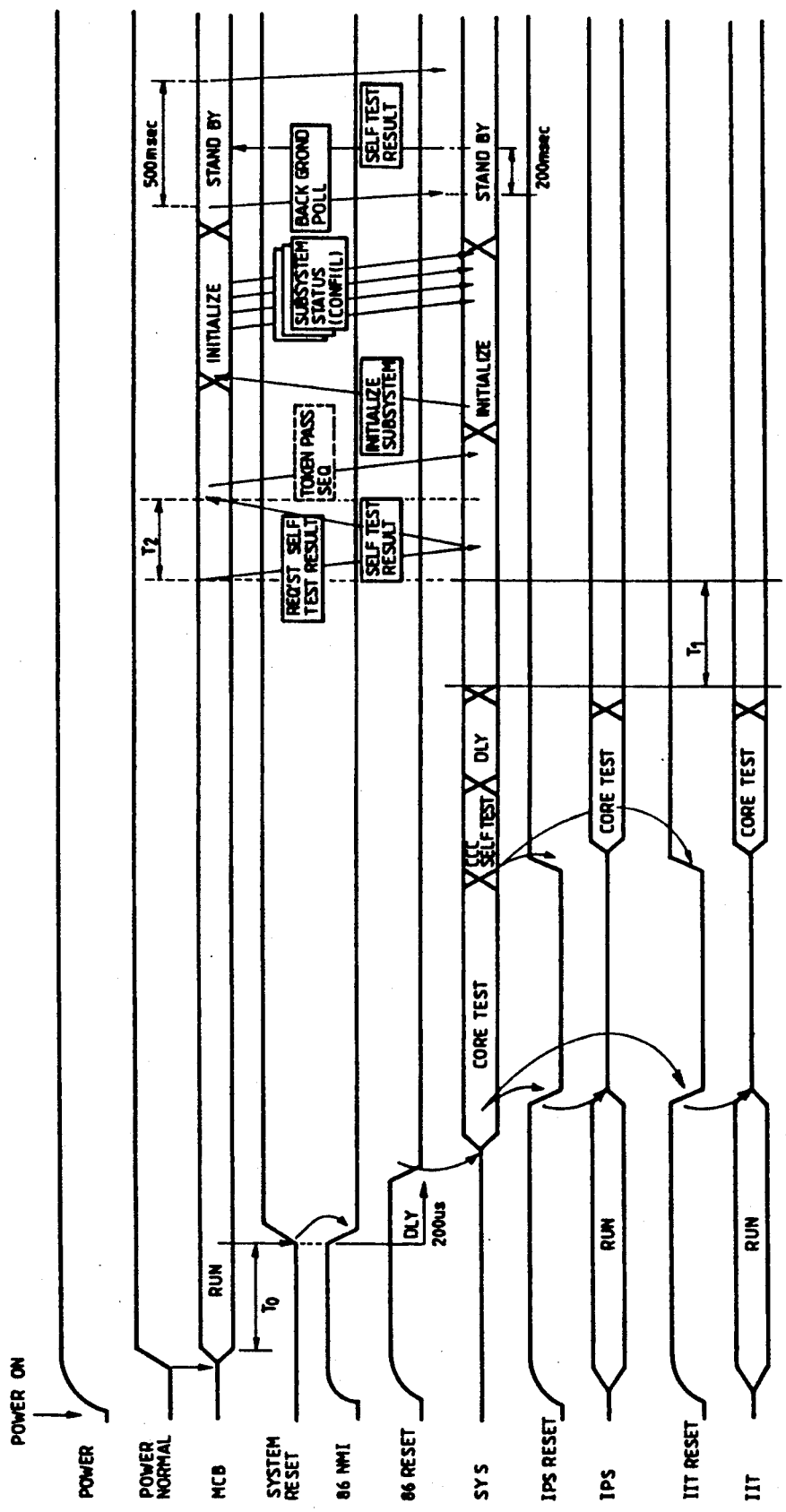
FIG. 7 is a timing chart for explaining the operation of the copier from the power on state to the standby state.

Of the states shown in FIG. 6, the machine operation from the power-on state to the standby state will be described with reference to FIG. 7. First, a power switch is turned on, and the machine is in a power-on state. Next, an IPS reset signal and an IIT reset signal that are supplied from the SYS remote 71 to the IIT remote 74 and the IPS remote 74 (FIG. 3) become (high) (H) in logic state. Upon receipt of these signals, the IPS remote 74 and the IIT remote 73 are released from the reset status and start to operate. The settle-down of the power voltage is detected and a power normal signal rises. The MCB remote 75 starts to operate and to establish the control and UI master rights. At the same time, it tests the high speed communication network LNET. The power normal signal is transferred from the MCB remote 75 to the SYS remote 71, by way of the hot line.

When time $T_0$ elapses from the start of the MCB remote 75 operation, start of the MCB remote 75, a system reset signal supplied by the MCB remote 75 through the hot line and to the SYS remote 71 goes high. Then, the SYS remote 71 is released from the reset status and starts to operate. The start of the SYS remote 71 operation is delayed by time $T_0$ plus 200 $\mu$sec by two internal signals of the SYS remote 71 signals, 86NMI and 86 reset. The 200 $\mu$sec is provided for storing the present state of the copying machine into nonvolatile memory when the copying machine stops or runs away due to clash, i.e., temporary trouble, power interrupt, software runaway, and software bug.

When the SYS remote 71 starts to operate, a core test is conducted for a period of approximately 3.8 sec. The test checks the contents of the ROM and RAM, and the hardware. At this time, if undesired data is mistakenly entered, it is possible that the machine will run away. To avoid this, the SYS remote 71, on its decision, renders the IPS reset signal and the IIT reset signal low (L) at the start of the core test. By the L signals, the IPS remote 74 and the IIT remote 73 are reset and come to a standstill.

Upon completion of the core test, the SYS remote 71 conducts a CCC self test for a period of 10 to 3100 msec, and at the same time renders high the IPS reset signal and the IIT reset signal to cause the IPS remote 74 and the IIT remote 73 to operate again, and conduct the core tests. During the CCC self test, the SYS remote 71 sends predetermined data to the LNET, receives the return data, and checks to determine whether or not the transmitted data is coincident with the received data. The self tests of the CCCs are staggered with one another to prevent the different self tests from being conducted concurrently.

The LNET employs a contention system. In this system, the nodes such as the SYS remote 71 and the MCB remote 75 transmit data when they desire. If data collides, the same data is retransmitted after predetermined time lapses. The contention system is used so that when the SYS remote 71 is conducting the CCC self test, if another node uses the LNET, the data collision occurs and it cannot conduct the CCC self test. Accordingly, before the SYS remote 71 starts the CCC self test, the LNET test conducted by the MCB remote must be completed.

When the CCC self test ends, the SYS remote waits on till the core tests by the IPS remote 74 and the IIT remote 73 are completed. It conducts a communication test of the SYSTEM node during a period $T_1$. This communication test is for testing the 9600 bps serial communication network. In the test, data is transferred in a predetermined sequence. Upon completion of the communication test, during a period $T_2$ the LNET communication test is conducted between the SYS remote 71 and the MCB remote 75. In the communication test, the MCB remote 75 requests the SYS remote 71 to return the results of the self test. In response to the request, the SYS remote 71 returns the results of the tests thus far conducted to the MCB remote 75.

When receiving the self test results, the MCB remote 75 sends a token pass to the SYS remote 71. The token pass is used to transfer the UI master right. For example, when the token pass is transferred to the SYS remote 71, the UI master right is transferred from the MSB remote 75 to the SYS remote 71. The operations up to this point belong to a power-on sequence. In this sequence, the UI remote 70 displays a message of "Please wait a minute," for example, and executes various tests, such as a core test of the remote 70 and communication test.

In the self test sequence, when the return of the self test result is requested, but no return is made, or the returned self test result contains an error, the MCB remote 75 makes the copying machine dead, exercises the UI control right to control the UI remote 70, and visually presents the faulty state of the machine.

An initialize state for setting up the respective remotes follows the power-on state. In the initialize state, the SYS remote 71 possesses the control right to control all of the states, and the UI master right. The SYS remote 71 initializes the SYS system and issues a command INITIALIZE SUBSYSTEM to the MCB remote 75 to initialize the MCB system. The result of the initialization is returned as subsystem status from the MCB remote 75. Through the initializing state, in the IOT, the fuse is heated, and the elevator of the tray is set at a predetermined position. The operations up to this point constitute the initialize state.

Upon completion of the initialize state, the respective remotes enter a stand-by state in which the they are ready to begin the copying operation. In this state, the SYS remote 71 possesses the UI master right. Accordingly, it exercises the UI master right to display the F/F on the UI display screen, and is ready for accepting the conditions for executing the copying operations. At this time, the MOCB remote 75 monitors the IOT. In the standby state, to check for a fault in the copier, the MCB remote 75 issues a background poll to the SYS remote 71 every 500 msec. In response to this, the SYS remote 71 returns the self test result to the MCB remote 75 within 200 msec. When no return of the self test result is made, or the returned self test result contains an error, the MCB remote 75 informs the UI remote 70 of the occurrence of a fault state, and causes it to display a fault state of the machine.

When the auditron is used in the stand-by state, the copier enters an auditron state. In this state, the MCB remote 75 exercises the auditron control, and at the same time controls the UI remote 70 to cause it to present an auditron display. When the F/F is set up and the start key is operated in the stand-by state, the copier enters a progress state. The progress state is further divided into six substates: set-up, cycle-up, skip pitch, normal cycledown, and cycledown shutdown. These substates will be described with reference to FIG. 8.

Figure 8:
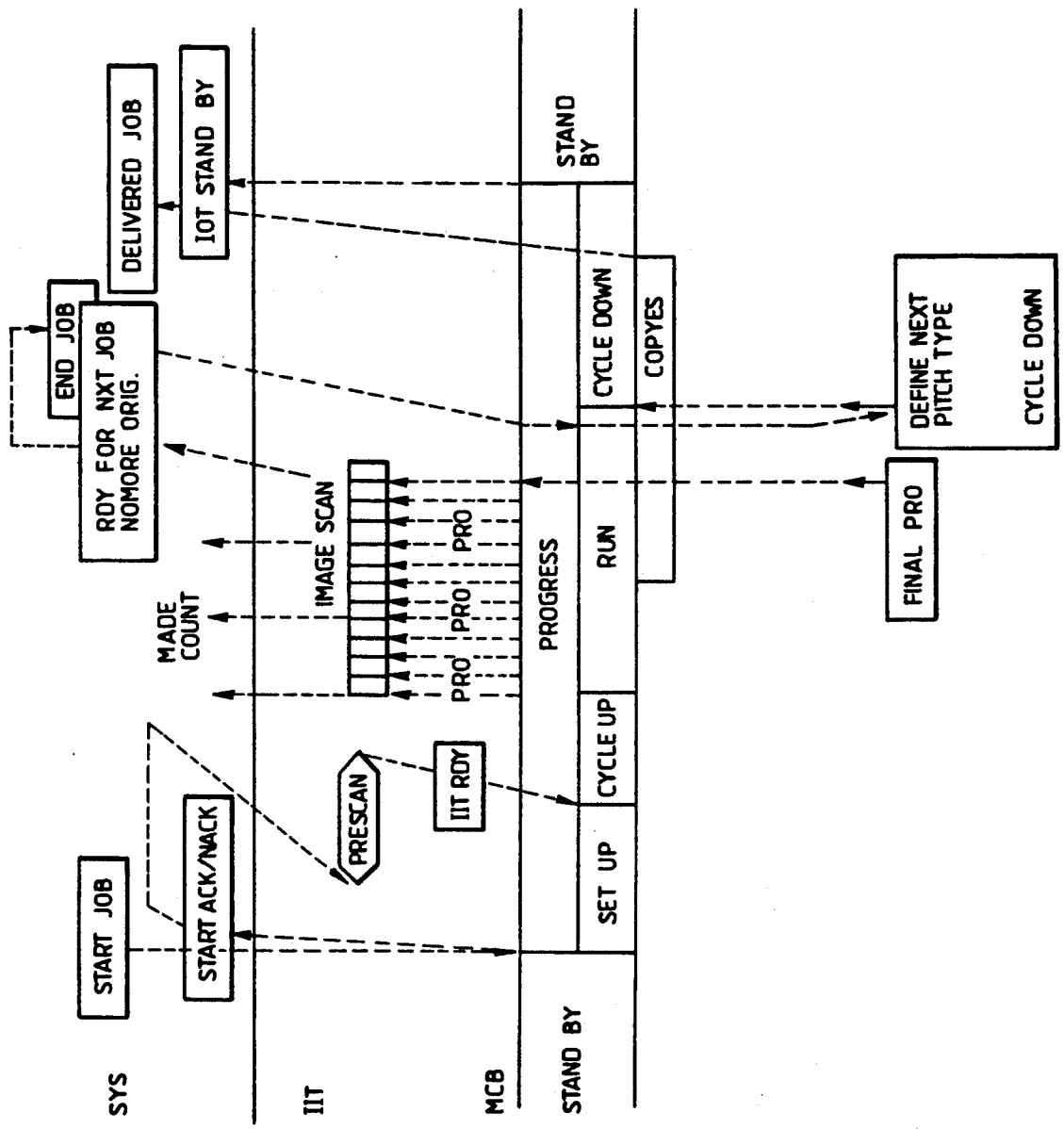
FIG. 8 is a diagram showing a sequence of a progress state.

A timing chart illustrated in FIG. 8 was plotted under conditions that the copier is set in a platen mode and full color mode, and where the number of copies is set at three.

When detecting the depression of the start key, the SYS remote 71 sends the contents of a job to the IIT remote 73 and the IPS remote 74 through the serial communication network. The SYS remote 71 also issues a command "start job" and sends the job contents and the start job command to the copier executive module 87 in the MCB remote 75. As a result, the copier enters the set-up substate, and the respective remotes prepare for executing the designated job. In the IOT module 90, a main motor is driven, and parameters for the photosensitive belt are set to correct values. The SYS remote 71 confirms that an (acknowledge) (ACK) signal, as a response to the MCB remote 75 to the start job, reaches and causes the IIT remote 73 to prescan. In this instance, four types of prescans are used; a prescan to detect size of an original, a prescan to detect a color in a specified portion on the document, a prescan to detect a closed loop for an outline drawing for coloring, and a prescan for reading a marker in the marker edit mode. A maximum of three prescans is repeated in accordance with the selected F/F. At this time, the UI displays a message, for example, "Please wait a minute".

When the prescan operation ends, a command "IIT ready" is issued to the copier executive module 87. From this point, the copying machine, enters the cycle-up substate. In the cycle-up state, the copier waits for the respective remote to start up and settle down. The MCB remote 75 starts up the IOT and the transfer unit. The SYS remote initializes the IPS remote 74. At this time, the UI displays the progress state being exercised and the contents of the selected job.

Upon completion of the cycle-up substate, the run substate is executed and the copying operation starts. When the first PR0 signed is produced from the IOT module 90 of the MCB remote 75, the IIT performs a first time scan, and the IOT performs the development of a first color. Here, the processing of one pitch is completed. Then, when the second PR0 signed is produced, the processing of the second pitch is completed. The above processing sequence is repeated four times to complete the processing of 4 pitches. Then, the IOT fuses the toner image and delivers the paper with the fused image outside the base machine. At this point, the first copy is completed. The above processing sequence is repeated to produce three copies as is preset.

The processing of the pitch layer and the copy layer are under control of the MCB remote 75. The setting of the number of copies in the per original as the upper layer of the above two layers is carried out by the SYS remote 71. Accordingly, in order for the SYS remote 71 to recognize the number of copies currently made, the MCB remote 75 produces a "copies made count" signal for transfer to the SYS remote 71 when the first PR0 signed for each copy is produced. When the final PR0 signed is produced, the MCB remote 75 requests the SYS remote 71 to send the next job by issuing a "RDY FOR NXT JOB" command to the SYS remote 71. At this time, if the start job is issued, the job can be continued. When a user does not set the next job, the job ends. In this case, the SYS remote 71 issues a command "END JOB" to the MCB remote 75. When the MCB remote 75 receives the "END JOB" and confirms that the job has ended, the copier enters the normal cycledown substate. In this state, the MCB remote 75 stops the operation of the IOT.

During the cycledown substate, when the copy papers have been delivered out of the base machine and the MCB remote 75 confirms delivery of the copy papers, the remote 75 signals the SYS remote 71 by issuing a "DELIVERED JOB" command. Also, when the normal cycledown substate ends and the machine comes to a stop, the MCB remote 75 signals the SYS remote 71 by issuing a "IOT STAND BY command." At this time, the progress state ends and control returns to the standby state.

The substates skip pitch and cycledown shutdown which have not yet been described will be referred to below. In the skip pitch state, the SYS remote 71 initializes the SYS system for the next job, and the MCB remote 75 is ready for the next copy. In the cycledown shutdown state which is used when a fault occurs, the SYS remote 71 and the MCB remote 75 both execute fault processing.

As seen from the foregoing description, in the progress state, the MCB remote 75 controls the pitch processing and copy processing, and the SYS remote 71 controls the per original and job programming. Accordingly, the MCB remote 75 or the SYS system 71 possesses the control right in accordance with the currently performed shared processing. The UI master right, however, is exclusively possessed by the SYS remote 71. The reason for this is that the UI must display the number of copies set as well as the selected edit processings. These jobs belong to the per original layer and the job programming layer, and are hence under control of the SYS remote 71.

When a fault occurs in the progress state, control goes to a fault recovery state. For the purposes of this specification, the word "fault" refers to an abnormal state of the copier such as no paper, jamming, abnormal and damaged parts, and the like. There are two categories of faults. Although a user can remove the first fault by resetting the F/F, the second fault requires some action by a serviceman, such as parts replacement. As described above, the fault display function is shared by the MCBUI module 86, and the F/F is controlled by the SYS module 82. Machine recovery work from the first fault that can be cured by the resetting of the F/F is shared by the SYS module 82. Machine recovery work from other faults is shared by the copier executive module 87.

The SYS system and the MCB system are used for detecting faults. Faults occurring in the IIT, IPS, and F/P are detected by the SYS remote 71 because they are controlled by the remote 71 and faults occurring in the IOT, ADF, and sorter are detected by the MCB remote 75 because they are controlled by the remote 75. Accordingly, there are four types of faults that can possibly occur in the copying machine as described below.

1. Fault Detected and Cured by SYS Node

This type of fault occurs when the start key is depressed before the F/P is set and can be removed by resetting the F/P.

2. Fault Detected by SYS node, but Cured by SYS node

This type of fault includes trouble of the reginsor, abnormal speed of the imaging unit, overrun of the imaging unit, abnormal PR0 signal, abnormal CCC, trouble in the serial communication network, check error of the ROM or RAM, and the like. When any of the above fault states occur, the UI displays the contents of the fault and a message "Call a serviceman."

3. Fault Detected by MCB Node and Cured by SYS Node

If the F/F sets the sorter when the sorter is actually set, the MCB node detects a fault which can be removed by a user by resetting the F/F. The same holds true for the ADF. A fault is detected when an inadequate amount of toner is left, no tray is set, and no paper is present. These faults can be removed by merely supplying additional toner and paper, and by setting a tray. In addition, if all the papers in a tray are used up, the machine can recover from the fault state by setting another tray. When toner of a certain color is used up, designation of toner of another color can cause a recovery from the fault machine. Thus, since the F/F selection can cause recovery from the fault state, the recovery work is shared by the SYS node.

4. Fault Detected and Cured by MCB node

When the developing unit is abnormal, the toner supply is abnormal, the motor clutch is abnormal, or the fuser is abnormal, the MCB node detects such a fault and the UI displays a fault location and a message "Call a serviceman." When jamming occurs, the UI displays the jam location and a method of clearing the jam thus placing the machine recovery work into the hands of the user.

As described above, in the fault recovery state, the control right and the UI master right are possessed by the SYS node or the MOCB node depending on the fault location and recovery method used.

After fault recovery, when the MCB node issues an IOT standby command, control goes to the job recovery state and executes the remaining jobs. If the number of copies is set at 3, for example, and a jam occurs during the copying operation of the second copy, after the jam is cleared, the remaining two copies must be made. Accordingly, the SYS node and the MCB node execute their processes, to recover the job. Also, in the job recovery state, the control right is possessed by the SYS node or the MCB node depending on their sharing of process functions, but the UI master right remains in the possession of the SYS node. The reason for this is as follows. To exercise the job recovery state, a display for job recovery must be made, such as "Push a start key" or "Set the remaining document." Such display processing belongs to the per original layer or the job programming layer which are both under control by the SYS node.

Also, when an IOT stand-by command is issued in the progress state, the job recovery state is exercised. When completion of the job execution is confirmed, control goes to the stand-by state, and waits for the next job. In the stand-by state, control is allowed to proceed to the diagnostic (diag.) state by a pregiven key operation.

Figure 9:
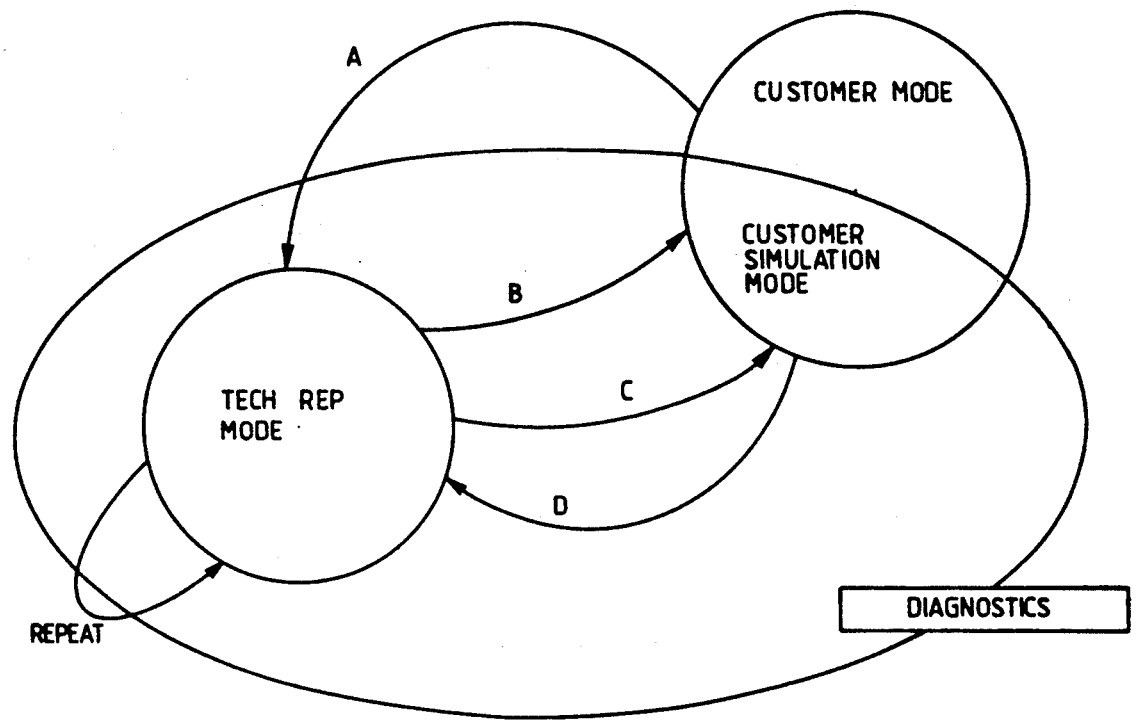
FIG. 9 is a diagram showing an outline of a diagnostic process.

The diag. state consists of self test processing such as input/output check of parts, setting of various parameters, setting of various modes, and initializing of the NVM (nonvolatile memory). The schematic illustration of the diag. state is given in FIG. 9. As seen from the figure, two modes are used, a TECH REP mode and a customer simulation mode.

The TECH REP mode is used for machine diagnosis, such as inputs and output checks, by a serviceman. The customer simulation mode simulate customer copying operations in the diag. state. If control proceeds from the stand-by state of the customer mode to the TECH REP mode by way of route A, various checks and parameter settings in the TECH REP made are mode and control returns to the customer mode (by way of a route B), a mere operation of a pregiven key allows control to go to the power-on state (FIG. 6) and to return to the stand-by state through the sequence shown in FIG. 7. Because the copying machine of the present invention makes color copies and has various edit functions, after parameters are set in the TECH REP mode, checks must be made by the customer simulation mode to determine whether the desired colors are produced and whether the edit functions are normal by actually making copies. The customer simulation mode is different from the customer mode in that no billing is made and the UI displays the diag. state being exercised.

The shift of control from the TECH REP mode to the customer simulation mode (via route C) and the reverse shift of control from the customer simulation mode to the TECH REP mode (via route D) may be made by pregiven operations. The TECH REP mode progresses under control of the diag. executive module 88 (FIG. 4). In this case, the MCB node has both the control right and the MCB master right. In the customer simulation mode, the actual copying operation is performed under control of the diag. module 83 (FIG. 4). In this case, the SYS node has both the control right and the UI master right.

(II) SYSTEM DETAILS (II-1) System Configuration

Figure 10:
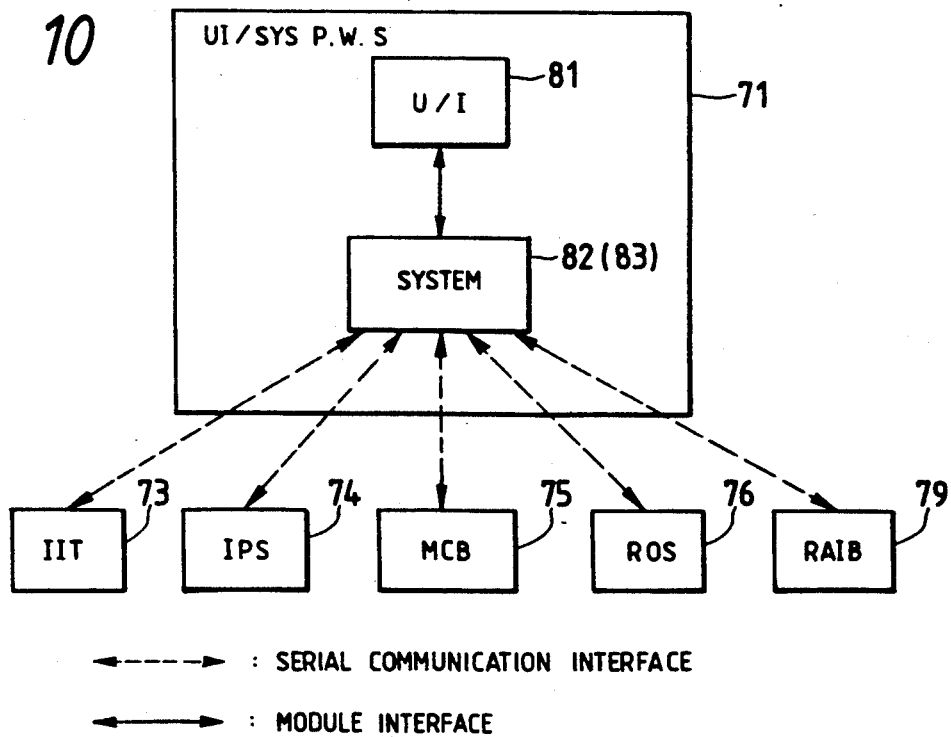
FIG. 10 is a diagram showing relationships between the system and remotes.

FIG. 10 shows the relationships between the system and other remotes. As described, the SYS remote 71 uses the SYSUI module 81 and the SYSTEM module 82. Data is transferred between these modules 81 and 82 through a module interface. A serial communication interface intervenes between the SYSTEM module 82, and the IIT 73 and IPS 74. An LNET communication network couples the SYSTEM module 82 with the MCB 75, ROS 76, and RAIB 79.

A module configuration of the system will be described with reference to FIG. 11. In the color copying machine of the present invention, the modules such as IIT, IPS and IOT function like passive parts, and the modules in the system for controlling the above modules function like active parts. The copying machine employs a decentralized CPU system. The per original layer and the job programming layer are shared by the system. The system has the control right to control the initialize state, stand-by state, set-up state, and cycle state, and the UI master right for using the UI in the above states (corresponding modules make up the system).

A system main 100 fetches the data received from the SYSUI, MCB, and the like into the internal buffer, clears the data in the internal buffer, calls the respective lower order modules in the system main 100, and transfers the job to them to execute updating processings.

An M/C initialize control module 101 controls an initialize sequence from the power-on to the setting up of the stand-by mode. This is driven when the power-on state for executing various types of tests after the power-on by the MCB.

An M/C set-up control module 103 controls a set-up sequence from the pushing of the start key until the MCB executing the copy layer is driven. Specifically, the module 103 forms job modes using FEATURE (directions given to the M/C in order to reply to the request by a user) that is specified by the SYSUI, and determines a set-up sequence in accordance with the job modes.

Figure 12A:
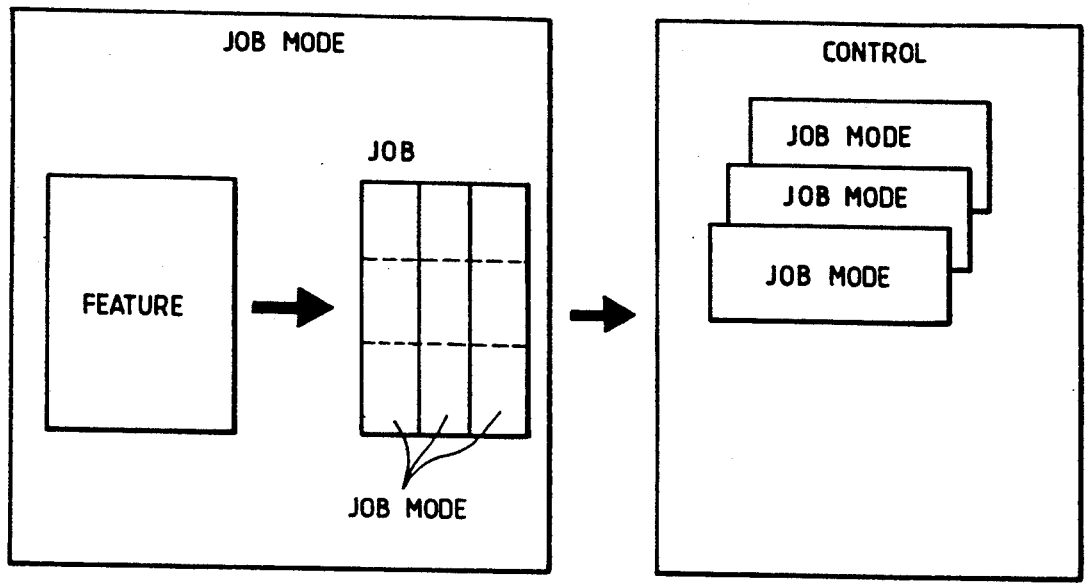
FIGS. 12(a) through 12(c) are explanatory diagrams showing how to prepare a job mode.
Figure 12B:
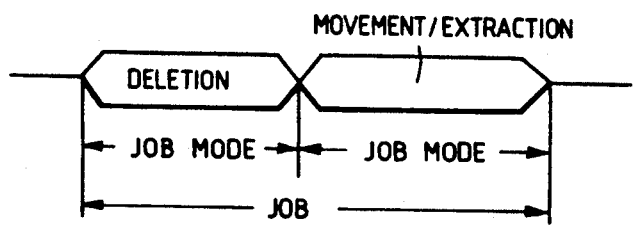
Figure 12C:
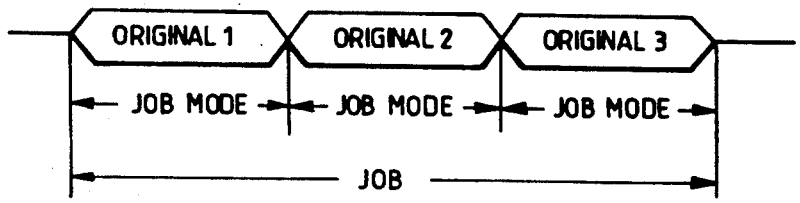

As shown in FIG. 12(a), for forming the job modes, a mode as indicated by the F/F is analyzed and divided into job modes. Here, job refers to the M/C operation from the start until the copies are all delivered as requested and operation stops. The job mode is the unit of the smallest job into which the job is allowed to be divided. The job is a collection of the job modes. For example, in the case of an inlay composition, the job modes are delete and movement/extraction as shown in FIG. 12(b). These modes constitute a job. In the case of three ADF originals, job modes are fed processings of originals 1, 2 and 3 as shown in FIG. 12(c). These job modes are collected into a job.

In an auto mode, a document scan is done. In a coloring-outline-drawing mode, a prescan is done. In a marker edit mode, a prescan is done. In a color detection mode, a sample scan is done (a maximum of three prescans are allowed). A copy mode required for the copy cycle is assigned to the IIT, IPS and MCB. At the end of the set-up sequence, the MCB is driven.

An M/C stand-by control module 102 controls a sequence during the M/C stand-by state, more exactly controls reception of the start key and color registration, and enters the diag. mode.

An M/C copy cycle control module 104 controls a copy sequence from start to stop of the MCB. Specifically, it provides information of a paper feed count, recognizes the end of a job, and requests the start of the IIT. Further, it recognizes the stop of the MCB and requests the stop of the IPS. Additionally, the module 104 sends, to a destination remote a through command that is generated during the M/C stop or the M/C operation.

A fault control module 106 monitors stop parameters from the IIT and IPS. When a stop parameter is generated, the module 106 requests the stop of the MCB. More specifically, the module 106 recognizes a fail command from the IIT or IPS, and stops it. After a stop request is generated by the MCB, the fault control module determines the recovery when the M/C has stopped, and makes the recovery in response to a jamming command from the MCB, for example.

A diag. control module 108 controls the input check mode and the output check mode contained in the diag. mode.

Figure 13:
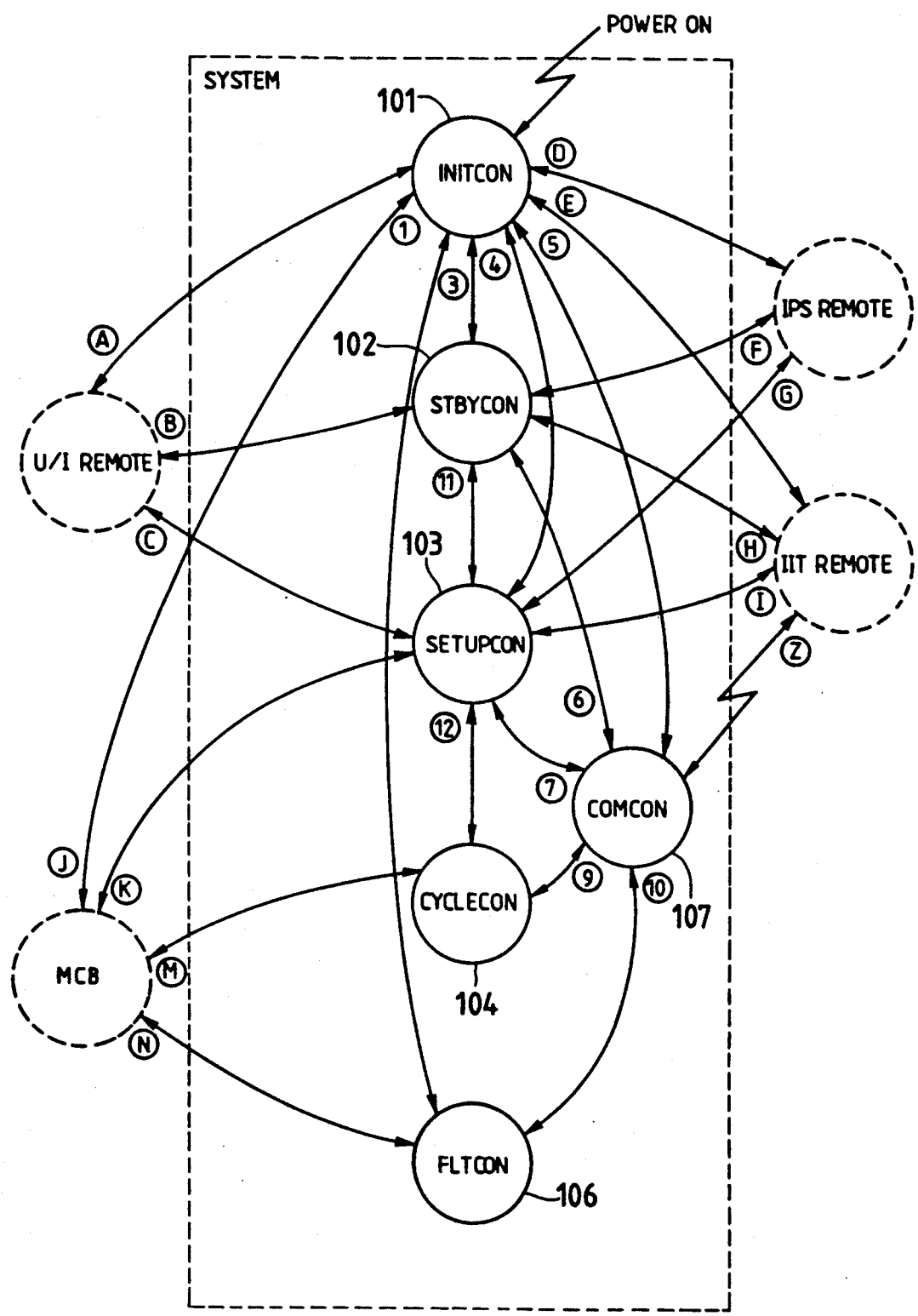
FIG. 13 shows a data flow between the system and the respective remotes.

Data transfer among the modules or between the modules and other subsystems will now be described. FIG. 13 illustrates data flows between the system and the remotes, and data flows among the modules in the system. In the figure, A to N indicate serial communications, Z a hot line, and (1) to (12) data flow among the modules.

During communication between the SYSUI remote and the initialize control module 101, the SYSUI sends a token command indicative of transfer of the control right for the CRT, to the SYSTEM node. The initialize control module sends a config. command to it.

During communication between the SYSUI remote and the standby control module 102, the SYSUI remote sends to the stand-by control module a mode change command, start copy command, job cancel command, color registration request command, and tray command. The stand-by control module 102 sends to the SYSUI remote an M/C status command, tray status command, toner status command, toner collection bottle command, color registration ans. command, and token command.

During communication between the SYSUI remote and the set-up control module 103, the set-up control module 103 sends an M/C status command (progress) and APMS status command. The SYSUI remote sends a stop request command and an interrupt command.

During communication between the IPS remote and the initialize control module 101, the IPS remote sends an initialize command to the control module 101. The control module 101 sends an NVM parameter command to the IPS remote.

During communication between the IIT remote and the initialize control module 101, the IIT remote sends an IIT ready command to the module 101. The module 101 sends an NVM parameter command and an initialize command to the IIT remote.

During communication between the IPS remote and the stand-by control module 102, the commands sent by the IPS remote to the control module 102 are an initialize free hand area command, answer command, remove area answer command, and color data command. The commands sent by the module 102 to the IPS remote are a color detect point command, initialize free hand area command, and a remove area command.

During communication between the IPS remote and the set-up control module 103, the commands sent by the IPS remote to the control module 103 are an IPS ready command and a document information command. The commands sent by the set-up control module 103 to the IPS module are a scan information command, basic copy mode command, edit mode command, and an M/C stop command.

During communication between the IIT remote and the stand-by control module 102, the IIT remote sends an IIT ready command indicative of the prescan end to the control module 102. The control module 102 sends to the IIT remote a sample scan start command and an initialize command.

During communication between the IIT remote and the set-up control module 103, the IIT sends an IIT ready command and an initialize end command to the control module 103. The control module 103 sends a document scan start command, sample scan command, and copy scan start command to the IIT remote.

During communication between the MBC remote and the stand-by control module 102, the stand-by control module 102 sends an initialize subsystem command and a stand-by selection command to the MBC remote. The MBC remote sends a subsystem status command to the stand-by control module.

During communication between the MBC remote and the set-up control module 103, the module 103 sends a start job command, IIT ready command, stop job command, and declare system fault command to the MBC remote. The MBC remote sends an IOT stand-by command and a declare MCB fault command to the module.

During communication between the MBC remote and the cycle control module 104, the module 104 sends a stop job command to the MBC remote. The MBC remote sends a made command, ready for next job command, job delivered command, and IOT stand-by command to the control module.

During communication between the MBC remote and the fault control module 106, the control module 106 sends a declare system fault command and a system down end command to the MBC remote. The MBC remote sends a declare MCB fault command and a system shutdown command to the control module 106.

During communication between the IIT remote and the communication control module 107, the IIT remote sends a scan ready signal and an image area signal to the control module 107.

The interfaces among the respective modules will be described below. The system main 100 sends reception remote numbers and reception data to the respective modules (101 to 107). Upon receipt of them, each module transfers data to and from its remote. The respective modules send nothing to the system main 100.

The initialize control module 101, when completing the initialize processing, sends a system state (stand-by) to the fault control module 106 and the stand-by control module 102. The communication control module 107 sends communication yes/no data to the initialize control module 101, stand-by control module 102, set-up control module 103, copy cycle control module 104, copy cycle control module 104, and fault control module 106.

The stand-by control module 102 sends a system state (progress) to the set-up control module 103, when the start key is depressed.

The set-up control section 103, when the set-up is completed, sends a system state (cycle) to the copy cycle control module 104.

(II-2) IMAGING PROCESSING SYSTEM (IPS)

(II-2-A) IPS Modules

Figure 14:
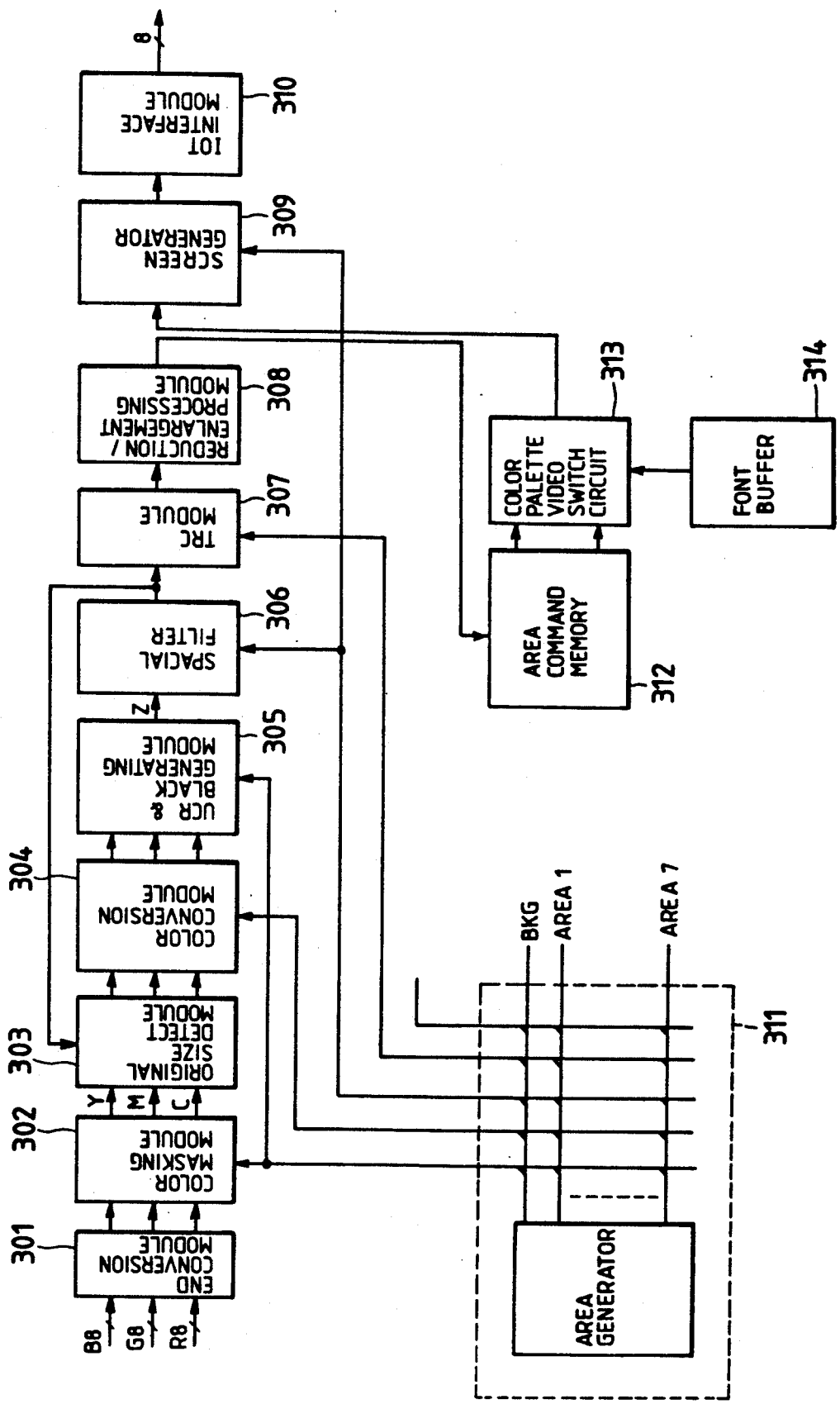
FIG. 14 shows a module configuration of the IPS.

FIG. 14 shows an arrangement of IPS modules in the image processing system (IPS). In the color image forming apparatus, the IIT (image input terminal) reads a color image on an original in the form of the primary colors B (blue), G (green), and R (red) by using the CCD image sensor, and converts these signals to primary toner colors of Y (yellow), M (magenta), C (cyan), and K (black or tusche), and the IOT (image output terminal) performs the exposure by the laser beam and development to reproduce the original color image. In this case, the four separated toner images of Y, M, C, and K are used. A copy process (pitch) is performed one time using the process color of Y. Subsequently, the copy processes will be performed for the remaining process colors M, C, and K. A total of four copy cycles are executed. These four images consist of mesh points and are superimposed to reproduce a single color image of the full color. Accordingly, when the separated color signals of B, G, and R are converted into toner signals of Y, M, C and K, problems occur of how to adjust the color balance, how to reproduce colors in accordance with the read characteristic of the IIT and the output characteristic of the IOT, how to adjust the balance of density and contrast, how to adjust the emphasis and blur of the edge, and how to adjust Moire.

The IPS receives the separated color signals of B, G, and R, processes these signals to improve their color reproducibility, tone, and definition, converts the toner signals of the developing process colors into on/off signals, and outputs them to the IOT.

As shown in FIG. 14, the IPS is made up of an END (equivalent neutral density) conversion module 301, color masking module 302, original size detect module 303, color conversion module 304, UCR (under color removal)/black generating module 305, spatial filter 306, TRC (tone reproduction control) module 307, reduction/enlargement processing module 308, screen generator 309, IOT interface module 310, area image control module 311 which includes an area generator and a switch matrix, an edit control module which includes an area command memory 312, color palette video switch circuit 313, and font buffer 314.

In the IPS, the 8-bit data (256 gray levels) on each of the separated color signals B, G and R is applied to the END conversion module 301. The module 301 converts the data into the toner signals of Y, M, C, and K. A process color toner signal X is selected and digitized. The digitized signals are transferred, as the on/off data of the process color toner signals, from the IOT interface module 310 to the IOT. Accordingly, in the case of full color copying (4 colors), the prescan is executed to detect an original size, an edit area, and other necessary information of the original. Then, a first copy cycle is executed using Y as the toner signal X of the process color. Then, a second copy cycle is executed using M for the toner signal X. Subsequently, copy cycles will be executed for the remaining process colors. A total of four copy cycles are repeated.

In the IIT, the color components of R, G, and B of the image are read by using the CCD sensor with the size of one pixel of 16 dots/mm. The IIT outputs the read signals as 24 bits of data (3 colors × 8 bits; 256 gray levels). B, G, and R filters are laid on the upper surface of the CCD sensor with the density of 16 dots/mm and a total length of 300 mm. The CCD sensor makes scans 16 lines/mm at a speed of 190.5 mm/sec. Accordingly, the sensor produces the read data at the rate of about 15M pixels/sec for each color. The IIT log converts the analog data of B, G, and R pixels into the density data from the reflectivity data, and then digitizes the density data.

The respective modules will be described in detail. FIGS. 15(a) through 15(g) are diagrams for explaining the respective modules of the IPS.

(a) END Conversion Module

Figure 15A:
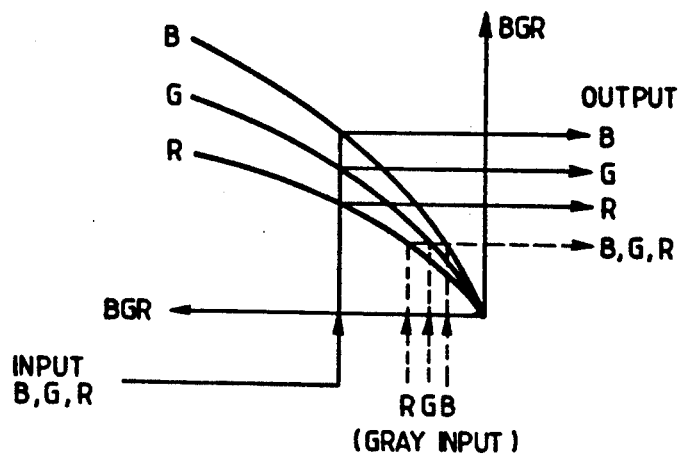
FIGS. 15(a) through 15(q) relate to the respective modules constituting the IPS.

The END conversion module 301 converts the optically read signal of the color original obtained by the IIT into a gray balanced color signal. The toners of the color image are equal to one another when the color is gray. The toner amount of gray is used as a reference toner amount. However, the separated color signals of B, G, and R produced from the IIT when it reads a gray document are not equal in value because the spectral characteristics of the light source and the color separation filter are not ideal. The imbalanced color signals are balanced by using a converting table (LUT: look up table) as shown in FIG. 15(a). This balancing process performed by the LUT is the END conversion. When a gray original is read, the LUT converts the B, G, and R color separated signals into signals of equal gradation in accordance with a level (black→white) of the gray signal. The LUT depends on the characteristics of the IIT and 19 LUTs may be used. Of those LUTs, 16 tables are for the film projectors including negative films and 3 tables are for copy, photograph, and generation copy.

(b) Color Masking Module

The color masking module 302 converts the B, G, and R color signals into signals indicative of toner amounts of Y, M, and C, respectively, through a matrix operation. This conversion is applied to the signals after they are subjected to the gray balance adjustment by the END conversion.

In this instance, the conversion matrix for the color masking is a 3×3 matrix exclusively used for converting the B, G, and R into Y, M and C. A matrix capable of dealing with BG, GR, RB, B2, G2, and R2, in addition to B, G, and R as well as any other suitable matrix may be used, if necessary. Two sets of matrices are used, one for an ordinary color adjustment and the other for emphasis signal generation in the monochromatic color mode.

Thus, when the video signal from the IIT is processed by the IPS, the gray balance adjustment is first conducted. If the gray balance adjustment follows the color masking process, the adjustment using the gray original must be performed so as to allow for the characteristics of the color masking making the conversion table more intricate.

(c) Original Size Detection Module

Figure 15B:
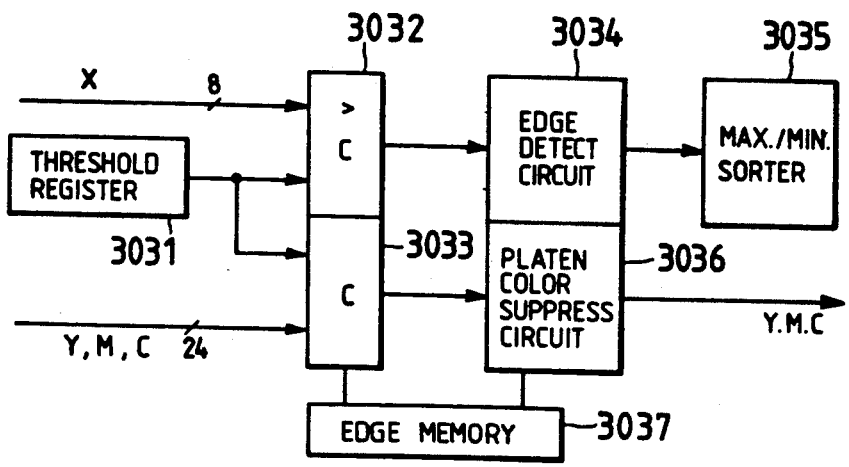

Originals that can be copied include not only standard size documents, but also patched up documents as well as others. To select a proper size paper corresponding to the size of an original, it is necessary to detect the size of the original. In cases where the paper size is larger than the original size and the peripheral region of the original is masked, the resultant copy is excellent. For this reason, the original size detection module 303 detects the size of the original and suppresses the platen color (edge suppress) at the time of scanning in order to read the original image. Accordingly, a color, for example black, that is clearly distinguished from the original is used for the platen color. The upper limit value and lower limit value for platen color discrimination are set and stored in a threshold register 3031, as shown in FIG. 15(b). At the time of prescan, the signal is converted, via gamma (Q) conversion, into a signal X representing the data approximate to the reflectivity of the original (by using the spatial filter 306 which will be explained in detail). The signal X is compared with the upper/lower limit values as is set and stored in the register 3031, by a comparator 3032. An edge detecting circuit 3034 detects the edge of the original, and stores the maximum and minimum values of X and Y into a max./min. sorter 3035.

Figure 15C:
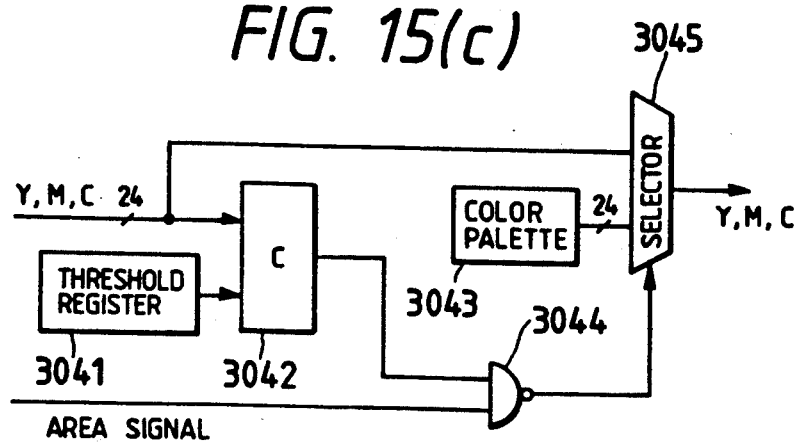
Figure 15D:
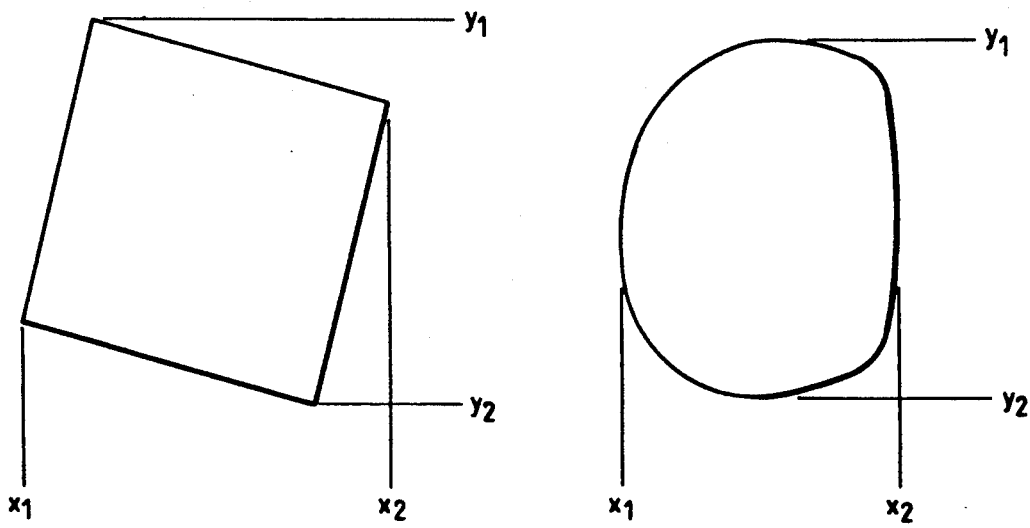

As shown in FIG. 15(d), when the original is oblique or non-rectangular, the maximum values and the minimum values ($s_1$, $x_2$, $y_1$, $y_2$) at four points on the outline of the figure are detected and stored. At the time of scanning for reading the original, the comparator 3033 compares the Y, M, and C of the original with the upper/lower limit values in the register 3031. A platen color suppress circuit 3035 suppresses the pictorial information outside the edge, i.e., the read signal of the platen, to effect the edge suppressing processing.

(d) Color Change Module

The color change module 305 sets up a condition wherein a designated color in a specific area on an original is erasable. As shown in FIG. 15(c), this module is made up of a window comparator 3042, threshold register 3041, and color palette 3043. To effect color change, the upper/lower limit values of Y, M, and C of the colors to be changed are set in the threshold register 3041. The upper/lower limit values of Y, M, and C of the converted colors are set in the color palette 3043. The NAND gate 3044 is controlled by an area signal applied from the area image control module. When it is not a color change area, the color signals of Y, M, and C of the original are transferred without change from a selector 3045.

When the color change area is reached, and the color signals of Y, M, and C of the original are between the upper limit values and the lower limit values as set and stored in the threshold register 3041, the selector 3045 is switched by the output signal of the window comparator 3042 and sends the converted color signals of Y, M, and C which are set in the color palette 3043.

As for the designated color, by directly pointing an original by a digitizer, 25 pixels of B, G, and R in the vicinity of the coordinates (as designated at the time of prescan) are averaged and the designated color is recognized on the basis of the average. Through this averaging operation, the designated color can be recognized with a precision within 5 of color difference even in the case of the original comprising 150 lines. To the B, G, and R density data, the designated coordinates are converted into an address for reading the density data from the IIT shading correction circuit. In the address conversion, readjustment corresponding to the registration adjustment is needed, as in the case of the original size detection. In the prescan, the IIT operates in the sample scan mode. The B, G, and R density data read from the shading RAM are subjected to shading correction by software, and are averaged. Further, the data is subjected to END correction and color masking, and is then set in the window comparator 3042. The registered colors are selected from some 1670 colors enabling up to eight colors to be simultaneously registered. The reference color thus prepared includes a total of 14 colors, Y, M, C, G, B and R, colors between these colors, and K and W.

(e) UCR/Black Generation Module

When equal quantities of color signals of Y, M, and C are combined, gray is produced. Theoretically, the same color can be obtained by replacing the equal quantities of Y, M, and C with black. However, the color would be impure and hence the reproduced color would not be fresh. To cope with this problem, the UCR/black generation module 305 generates a proper amount of K to prevent such color impurities, and equally reduces the toner colors Y, M and C, in accordance with the amount of the generated K. This process is called an under color removal (UCR). More specifically, the maximum and the minimum values of the toner colors Y, M, and C are detected. An amount of K is also generated by a conversion table in accordance with the difference between the maximum and the minimum values. Further, the toner colors Y, M, and C are UCR processed in accordance with the amount of generated K.

Figure 15E:
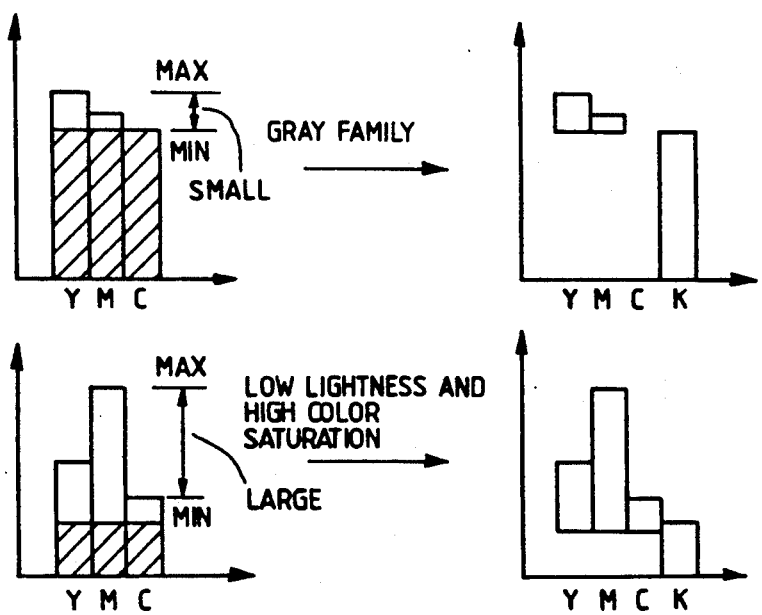

As shown in FIG. 15(e), in the case of a color close to gray, the difference between the maximum and the minimum value is small. Accordingly, the minimum value or its near value of each color Y, M, and C is removed for generating the color K. When the difference is large, the quantities of the colors Y, M, and C to be removed are set below the minimum values to reduce the quantity of the generated K. In this way, the mixing of tusche into the pure color and the hue degradation of a low gradation and high hue color can be prevented.

Figure 15F:
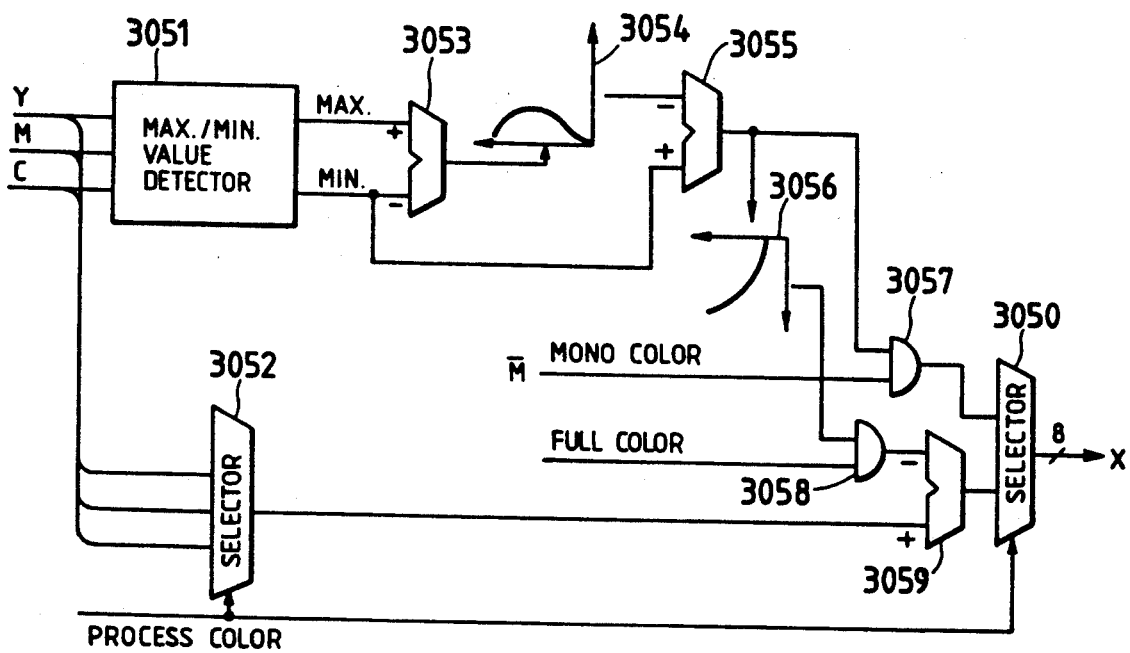

FIG. 15(f) shows a specific circuit arrangement of the UCR/black generation module in which a max./min. value detector 3051 detects the maximum and minimum values of the process colors Y, M, and C. A calculating circuit 3053 calculates the difference between the maximum and the minimum values of each color. A conversion table 3054 and another calculating circuit 3055 generate black K. The conversion table 3054 adjusts the value of K.

When the difference between the maximum and the minimum value is small, the output signal of the conversion table is zero. Accordingly, the calculating circuit 3055 produces a minimum value of K. When the difference is large, the output value of the conversion table 3054 is not zero and the calculating circuit 3055 subtracts the difference from the minimum value to produce a relative value of K. A conversion table 3056 provides the amount of Y, M, and C to be removed in accordance with the K value. In cooperation with the conversion table 3056, an additional calculating circuit 3059 subtracts the values as defined by the k value from the process colors Y, M, and C. AND gates 3057 and 3058 operate for the signal K and the signals of Y, M, and C after UCR processing in accordance with the signals in the mono color mode and the full color mode. The selectors 3052 and 3050 are used for selecting any of the toner signals Y, M, C, and K by the process color signals. A color is thus reproduced by the mesh points of Y, M, and C. Accordingly, the curves and tables that are empirically formed are used for the removal of Y, M, and C and for determining the generation ratio c.f K.

(f) Spatial Filter Module

In the color image forming apparatus incorporating the present invention, the IIT reads an image of an original while the original image is being scanned by the CCD. When the data is used intact, the resultant data is faded data. The mesh points are used for image reproduction. Accordingly, Moire occurs between the mesh point period of the printed matter and the sampling period of 16 dots/mm. The same phenomenon occurs between the mesh point period generated by the machine and that of the original. The spatial filter module 306 is provided to remove the above fading and Moire phenomenon. A low-pass filter is used for the Moire removal and a high-pass filter is used for edge emphasis.

Figure 15G:
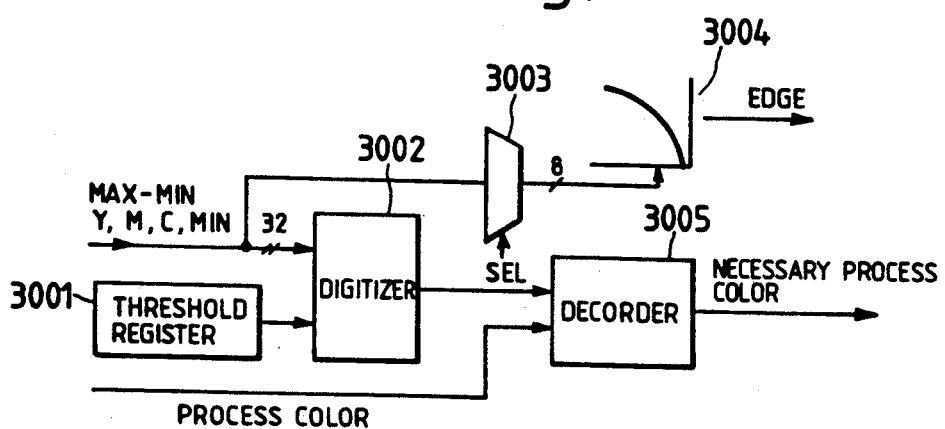

In the spatial filter module 306, as shown in FIG. 15(g), a selector 3003 selects one of the input signals Y, M, Min and Max-Min. A conversion table 3004 converts the input signal into data signals approximately indicative of its reflectivity. Use of this type of data makes it easy to pick up the edge data. In this instance, the selected color signal is Y. A threshold register 3001, a 40-bit digitizer 3002, and a decoder 3005 separate the color signals Y, M, C, Min, and Max-Min into eight colors, Y, M, C, K, B, G, R, and W (write), for each pixel. A decoder 3005 recognizes the hue in accordance with the digitized data signal, and produces 1-bit of data indicative of the necessity to process color or not.

Figure 15H:
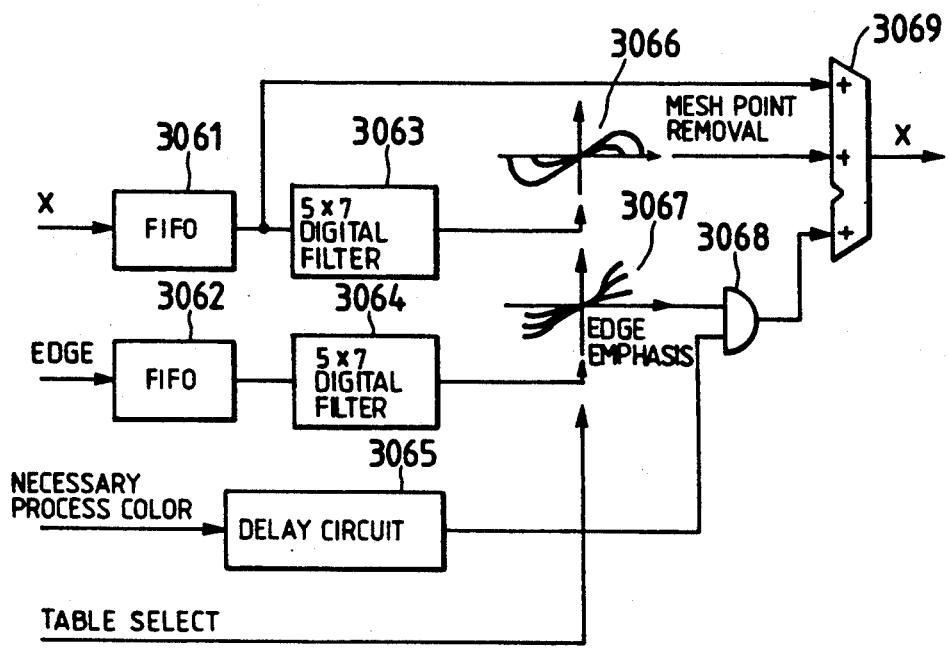

The output signal of the circuit of FIG. 15(g) is applied to the circuit of FIG. 15(h). In the circuit of FIG. 15(A), a FIFO 3061, a 5×7 digital filter 3063, and a modulation table 3066 cooperate to--generate the meshpoint removal data. A FIFO 3062, a 5×7 digital filter 3064, a modulation table 3067, and a delay circuit 3065 cooperate to generate edge emphasis data by using the output data of the output circuit of FIG. 15(g). The modulation tables 3066 and 3067 are selectively used in accordance with the selected copy mode, such as photograph copy, character only copy, and photo/character copy.

Figure 15J:
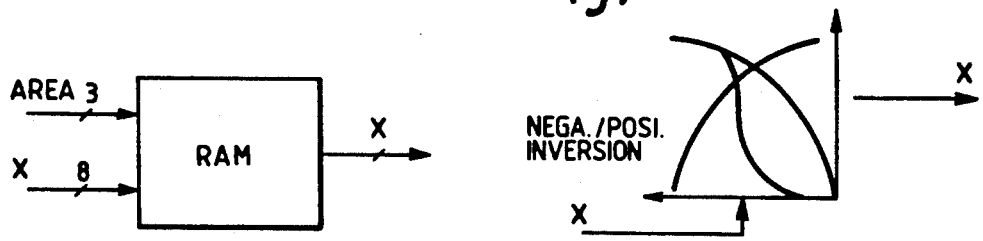
Figure 15K:
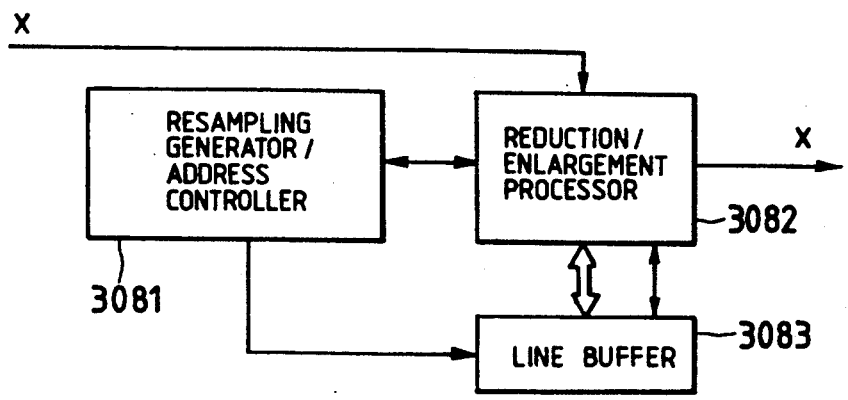
Figure 15I:
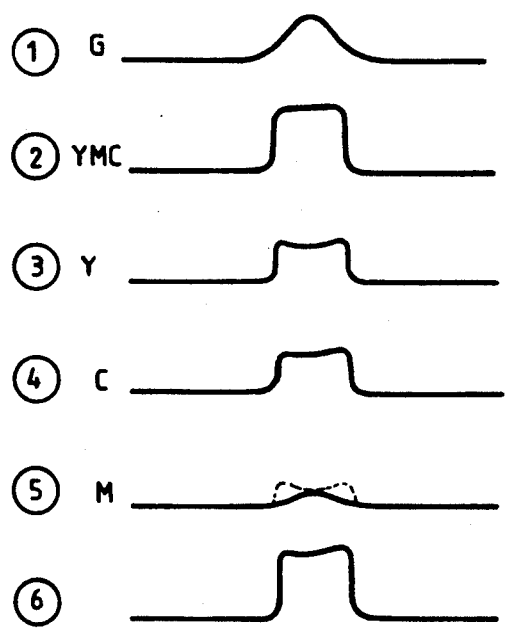

With respect to the edge emphasis, when a green character as shown in FIG. 15(i) (1) is reproduced in the form of a character (2), the colors Y and C are emphasized at the edges as indicated by waveforms (3) and (4), but the color M is not emphasized, as is indicated by the solid line of waveform (5). The switching for this is carried out by the AND gate 3068. In this case, if waveform (5) representing the color M, is emphasized as indicated by the broken line, M is emphasized at the edges as shown in waveform (6) and accordingly the color purity is lost (i.e., M is contaminated). To switch the emphasis of the AND gate 3068 for each process color, the delay circuit 3065 synchronizes the FIFO 3062 with the 5×7 digital filter 3064. When a fresh green character is reproduced by using conventional image processing, the magenta M is emphatically mixed into the green character and the color purity is lost. To prevent this, when the spatial filter module recognizes the green character, it outputs the colors Y and C in an ordinary manner, but outputs the magenta M for edge emphasis.

(g) TRC Conversion Module

In accordance with an on/off signal derived from the IPS (in the case of the full color copy) the IOT exercises the copy cycles four times while using process colors of Y, M, C, and K . Thus, reproduction of a full color original is realized. However, to exactly reproduce the colors theoretically obtained through the signal processing, delicate and careful adjustment is required to take all the IOT characteristics into consideration. The TRC conversion module is used to improve the color reproduction. An address conversion table stored in the RAM contains various combinations of Y, M, and C and is accessed with 8-bit image data as shown in FIG. 15(j). Via such a table, functions such as density adjustment, contrast adjustment, negative/positive inversion, color balance adjustment, character mode, and transparent composition, may be exercised in accordance with an area signal. Bits 0 to 3 of the area signal are assigned to the upper four bits of the RAM address. In an out-of-area mode, the above functions may be appropriately combined. In this instance, the RAM has a memory capacity of 2k bytes (256 bytes×8 planes) and stores eight conversion tables. During the IIT carriage return, a maximum of 8 conversion tables are stored for every cycle of Y, M, and C. These tables are selectively used in accordance with the designated area and the copy mode used. If the memory capacity of the RAM is increased, there is no need for storing the conversion tables during every cycle.

(h) Reduction/Enlargement Module

Figure 15L:
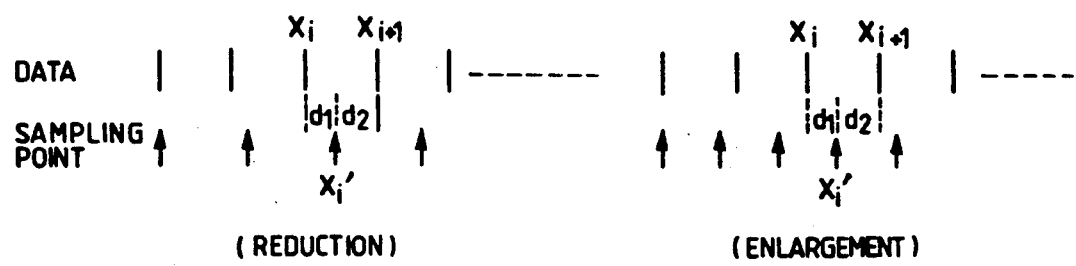

A reduction/enlargement processor 3082 contained in the reduction/enlargement module 308 exercises the reduction/enlargement processing during the period that data X is temporarily stored in a line buffer 3083 from which it is transferred as shown in FIG. 15(k). A resampling generator/address controller 3081 generates a sampling pitch signal and a read/write address for the line buffer 3083. The line buffer 3083 serves as a two line ping-pong buffer in which the first line data is read out of one line, while, at the same time, the next line data is written into the other line. The reduction/enlargement processing in the main scan direction is digitally processed by the reduction/enlargement module 308. For the reduction/enlargement in vertical scan direction, the scan speed of the IIT is appropriately varied in the range from 2 times to ¼ time so as to vary the magnification from 50% to 400%. During digital processing, when the data is transferred to and from the line buffer 3083, the reduction is based on a thin-out interpolation, while the enlargement is based in an additional interpolation. When the data lies between the adjacent sampling points, the interpolation data is obtained by weighing the in-between data in accordance with the distances of that data to the data located on both sides, as shown in FIG. 15(l). For example, if the data is $X_i'$, the following calculation would be used:

$$(X_i \times d_2) + (X_{i+1} \times d_1)$$

where $d_1+d_2=1$, and $d_1$ and $d_2$ are distances from a sampling point to the data $X_i$ and $X_{i+1}$ on both sides of the data $X_i'$.

During the reduction processing, data is loaded into the line buffer 3083 while the data is interpolated. At the same time, the reduced data in the previous line is read out of the buffer and sent to the succeeding stage. During enlargement processing, the data is loaded into and temporarily stored in the line buffer, while the data is interpolated for enlargement and while the previous line data is read out of the line buffer. When the data is interpolated for enlargement at the time of writing, a clock frequency must be increased in accordance with magnification. Such an enlargement process, however, allows the same clock to be used for both the read and write operations. Further, shift image processing in the main scan direction is made possible by reading data at a midpoint between one read timing and the next read timing or by delaying the read timing. The repetitive processing is made possible by repeatedly reading the data. The mirror image processing is also made possible when the data is read out in the reverse direction.

(i) Screen Generator

A screen generator 309 converts a gradation toner signal of each process color into an on/off or binary toner signal. In the screen generator, the digitizing processing and the error diffusion processing are conducted by comparing a threshold matrix with the gradated data. The IOT receives the binary toner signal, and turns on and off a laser beam to reproduce a halftone image. In this case, the laser beam has an elliptically shaped cross section of about 80 μm long and about 60 μm wide. This geometry is selected so as to correspond to a recording density of 16 dots/mm.

Figure 15M:
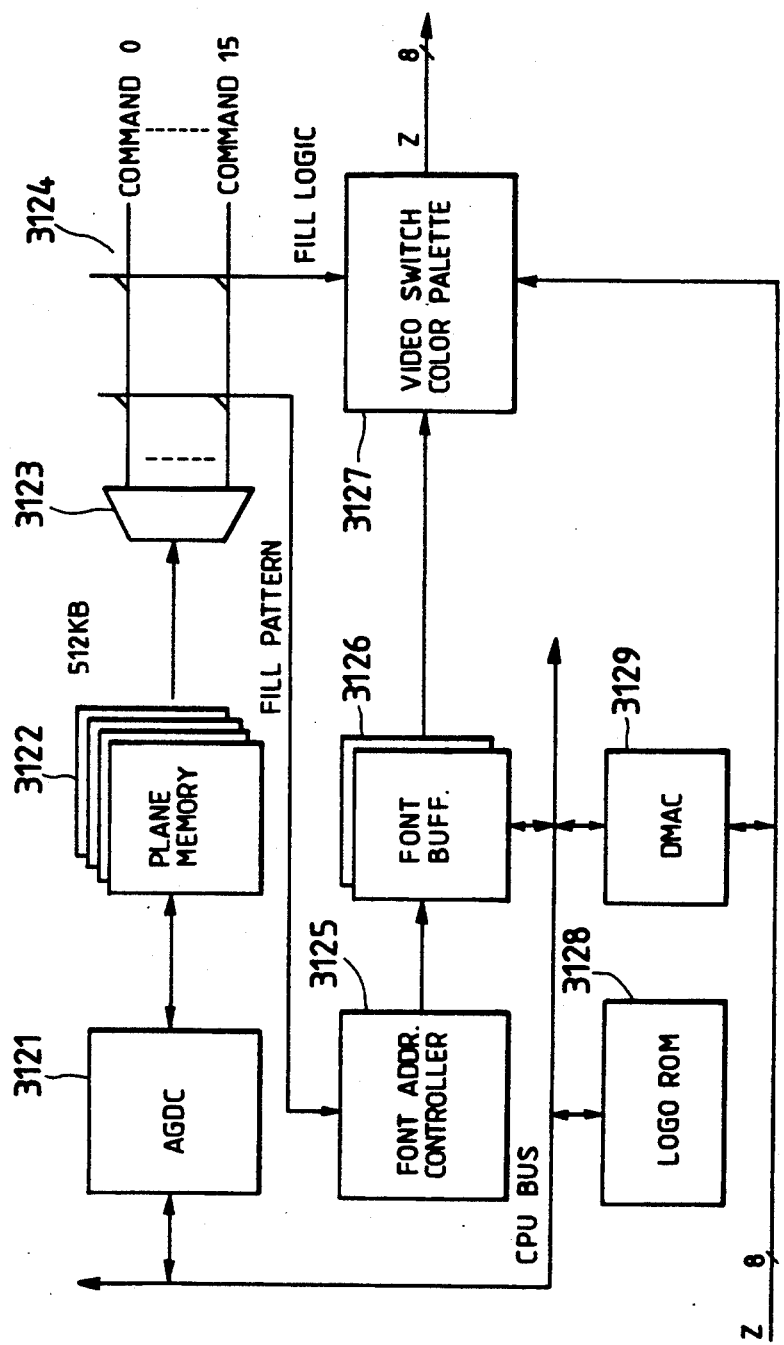
Figure 15N:
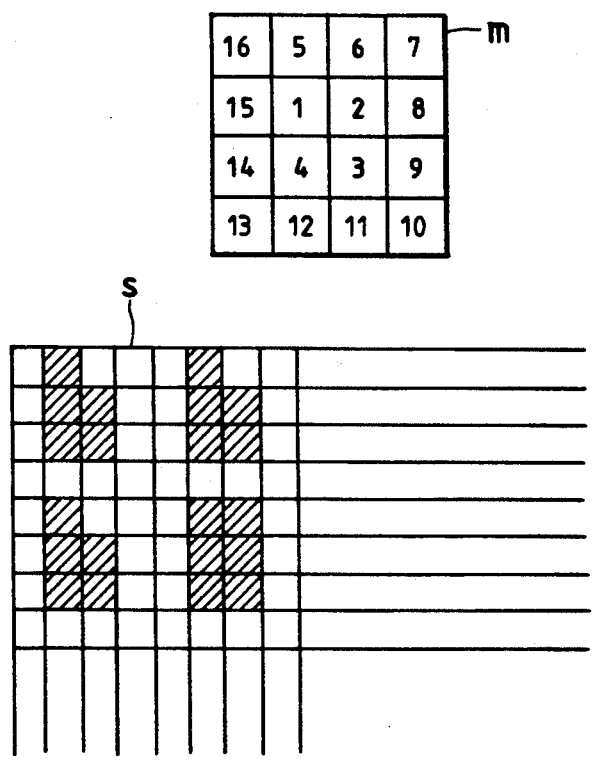

A description of how to express gradation followed by a description directed to forming halftone cells each of 4×4, for example, as shown in FIG. 15(n) will be described. To form halftone cells, the screen generator sets up a threshold matrix "m" corresponding to a halftone cell. Then, it compares the matrix with the gradated data. If the value of the gradated data is "5", the screen generator generates signals that are turned on in the squares of the matrix "m" having a value less than "5".

Figure 15O:
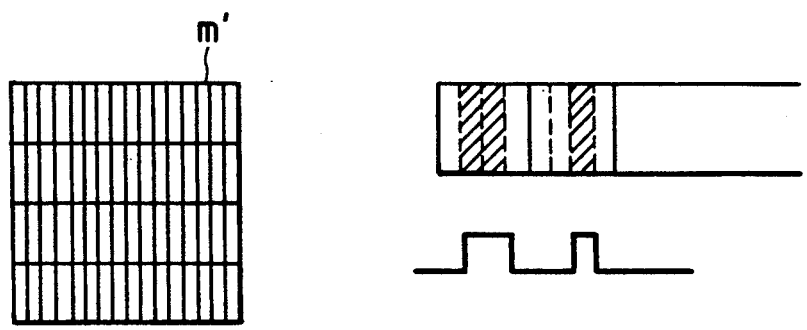

The 4×4 halftone cell of 16 dots/mm is generally called a mesh point of 100 psi and 16 gradations. If an image is depicted by such mesh points, the image reproduction is poor. In the present invention, to increase the gradations, the 16 dots/mm pixel is further divided into four subsections along the vertical direction, i.e., main scan direction. Accordingly, the laser beam is turned on and off at distances of ¼ unit, i.e., at 4-times the frequency, as shown in FIG. 15(o). The gradation attained is four times that of conventional gradation expressing methods. To this end, a threshold matrix "m'" as shown in FIG. 15(o) is set up in the present invention. Further, if a submatrix method is used, the number of lines can be effectively increased.

Figure 15P:
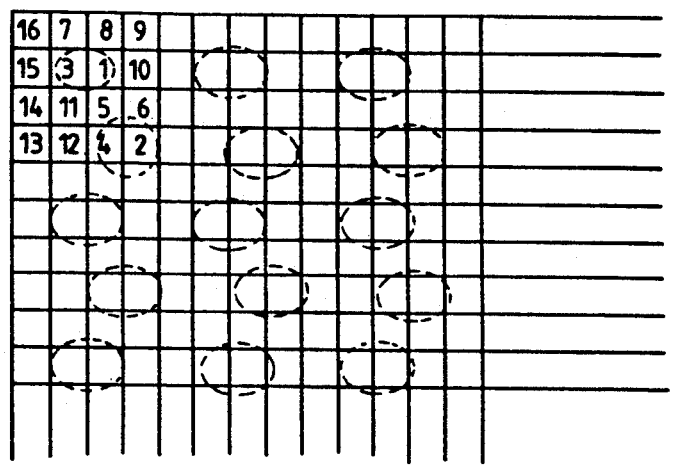
Figure 15Q:
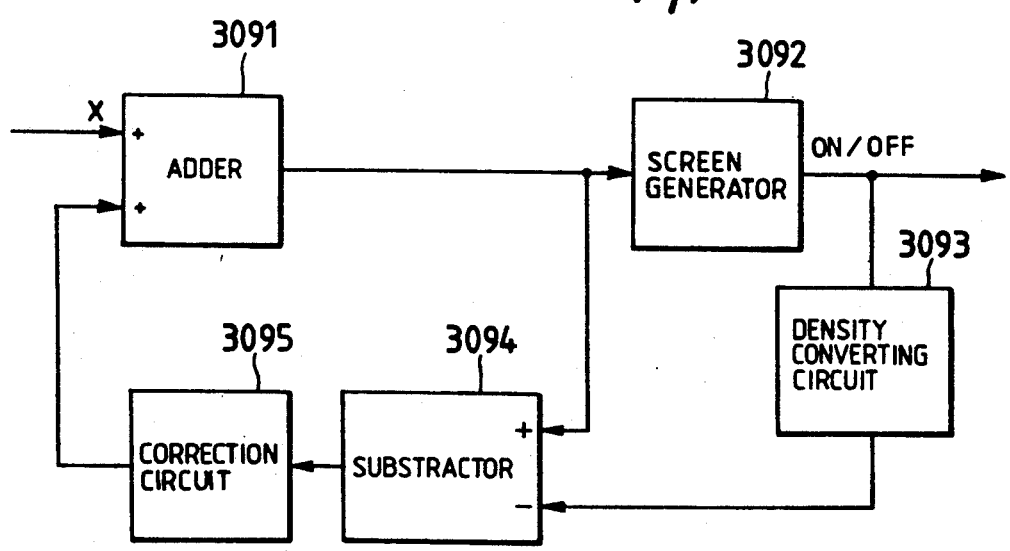

The above method uses the threshold matrices "m" of the type in which the center portion of each halftone cell is used as a sole growth nucleus. In the submatrix method, a pixel consists of a plurality of unit matrices Wherein each matrix has two or more growth nuclei, as shown in FIG. 15(p). If such a screen pattern design method is used, the number of lines and the gradation may be changed in accordance with bright or dark portions such that 141 psi and 64 gradations are used for bright portions, and 200 psi and 128 gradations are used for dark portions. Such a pattern may be designed while visually judging smoothness in gradation, definition, graininess, and the like.

When the halftone image is reproduced by using the above dot matrix method, the gradation or gray level and the resolution are inversely related. For example, if the gray level is increased, the resolution decreases. On the other hand, if the resolution is increased, the gray level decreases. If small threshold data matrices are used, the image actually outputted suffers from quantification error. The error diffusion processing improves the gradation reproducibility in such a manner that the quantification errors between the on/off or binary signal generated by the screen generator 3092 and the input gradation signal are detected by a density converting circuit 3093 and subtractor 3094, and are fed back by using a correction circuit 3095 and an adder 3091. For example, the corresponding position of the previous line and the pixels on both sides of it are convoluted through a digital filter.

The screen generator changes over the threshold error and a feedback coefficient for the error diffusion processing every original or area in accordance with the type of image, such as halftone images and character images. In this way, the reproduction of images of high gradation and high definition is improved.

(j) Area Image Control Module

In the area image control module 311, seven rectangular areas and a priority order can be set in an area generator. Control data relating to the respective areas is set in a switch matrix. The control data includes data of color change and color mode indicative of monochromatic color or full color, modulation data concerning photographs, characters, and the like, data concerning the TRC, data concerning the screen generator, and the like. The control data is used for controlling the color masking module 302, color conversion module 304, UCR module 305, spatial filter 306, and TRC module 307. The switch matrix may be set by software.

(k) Edit Control Module

The edit control module executes outline-drawing processing in which an original image comprising a circular figure, such as a circular graph, and not a rectangular figure is read, and a specified area of an indefinite configuration is painted with a specified color. As shown in FIG. 15(m), a CPU bus is connected with an AGDC (advanced graphic digital controller) 3121, font buffer 3126, logo ROM 3128, and DMAC (DMA controller) 3129. The CPU writes an encoded 4-bit area command into a plane memory 3122 through the AGDC 3121, and loads a font into the font buffer 3126. The plane memory 3122 consists of four memory planes. Each point on an original can be set by 4 bits of planes 0 to 3 in such a manner that for the bit pattern "0000", a command 0 is used to output an original. A decoder 3123 decodes the 4-bit data into commands 0 to 15, and a switch matrix 3124 converts the commands 0 to 15 into commands to make fill pattern, fill logic, and logotype jobs. A font address controller 3125 generates an address of a font buffer 3126 in accordance with a pattern such as mesh point shade and hatching shade, by using a 2-bit fill pattern signal.

A switch circuit 3127 selects one of document data X, font buffer 3126, and color palette in accordance with a fill logic signal of the switch matrix 3124 and the contents of the original data X. The fill logic signal is used to fill only the background of an original image with a color mesh in order to change the color in a specific portion of the image to another color, to mask or trim a specific portion of the image, and to color specific image portions.

As seen from the foregoing description, in the IPS, the read signals from the IIT are subjected to END conversion and the color masking process. The read signals are further subjected to edge suppression and color change as well as the under color removal process. In addition, a tusche background color is generated. Then, the read signals are converted into the process colors. In the case of processings such as spatial filter, color modulation, TRC, and reduction/enlargement, it is better to use the process color data rather than the full color data because the amount of processed data is small, and hence the number conversion tables used may be reduced to ⅓. Accordingly, a larger variety conversion tables may be used to improve the reproducibility of color, gradation, and definition.

(II-2-B) IPS Hardware

Figure 16A:
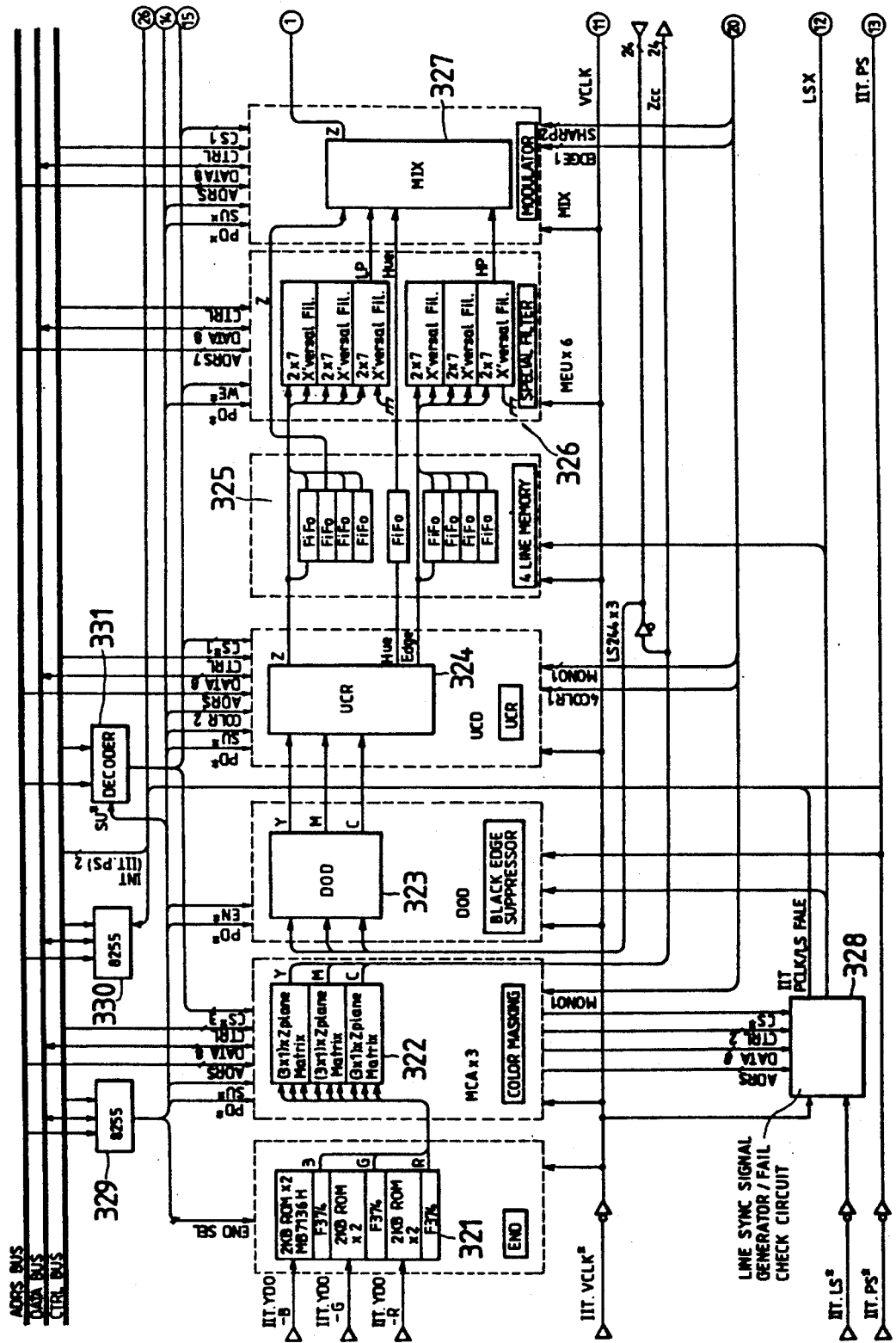
FIGS. 16(a) through 16(d) show a hardware configuration of the IPS.
Figure 16B:
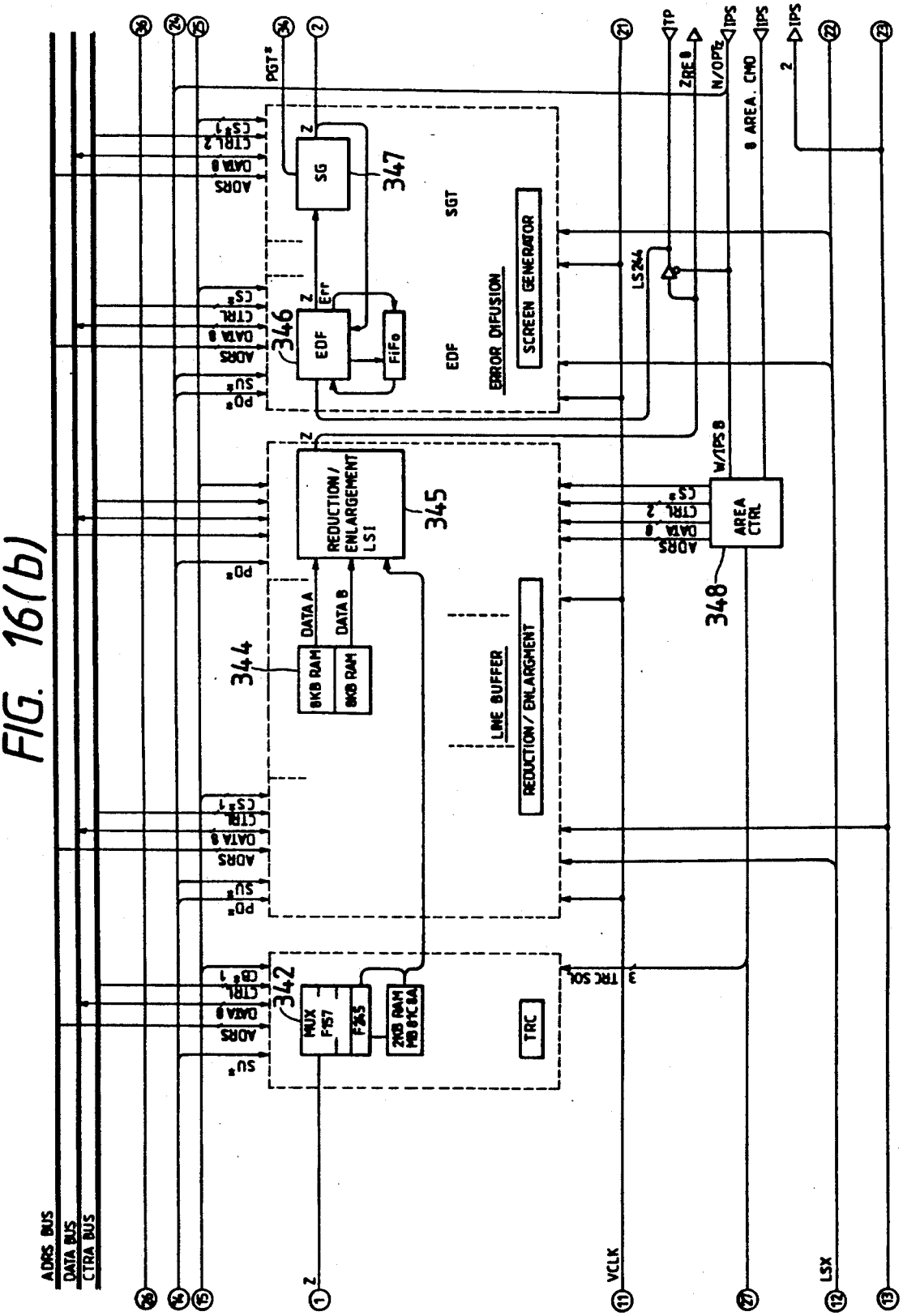
Figure 16C:
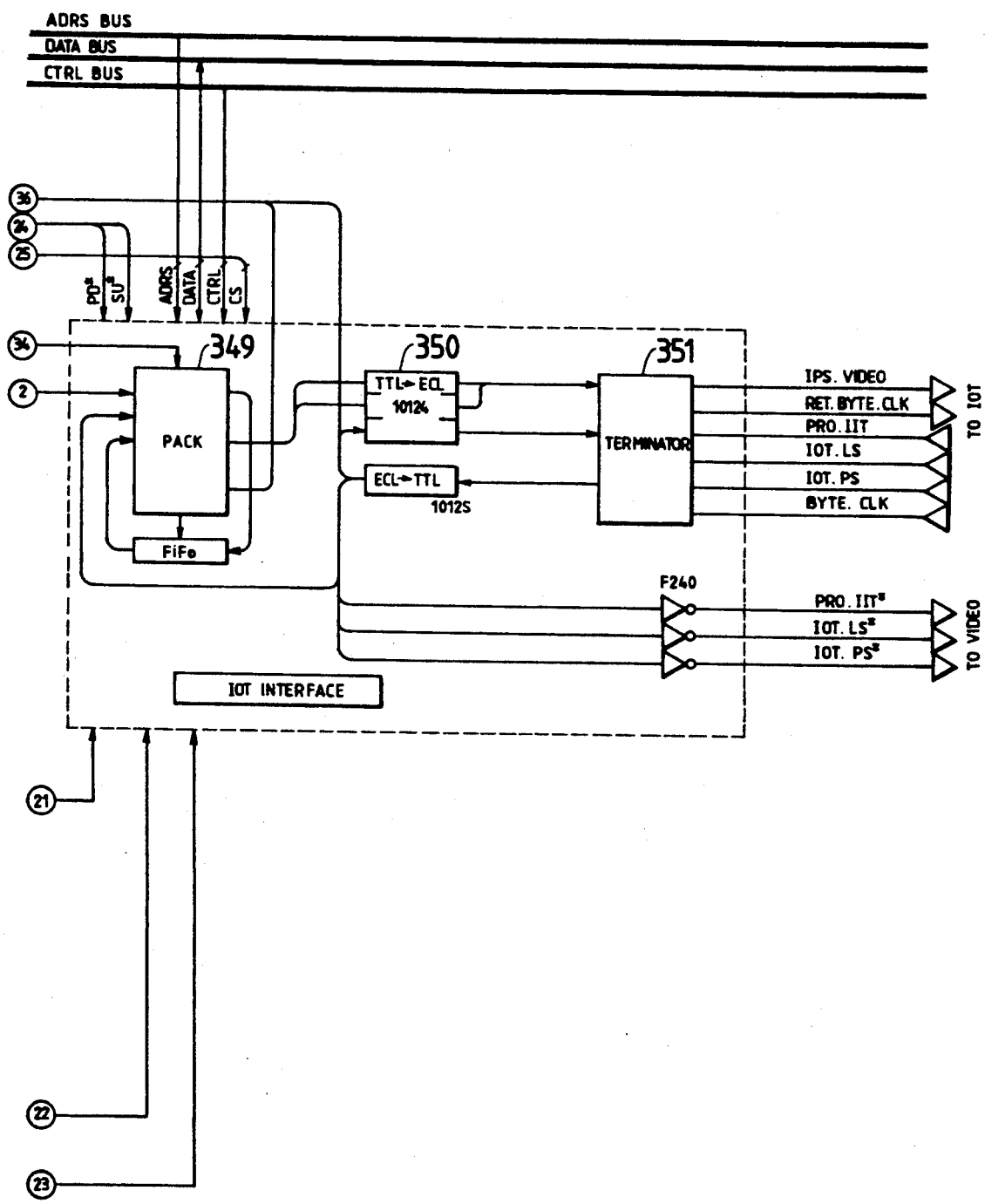
Figure 16D:
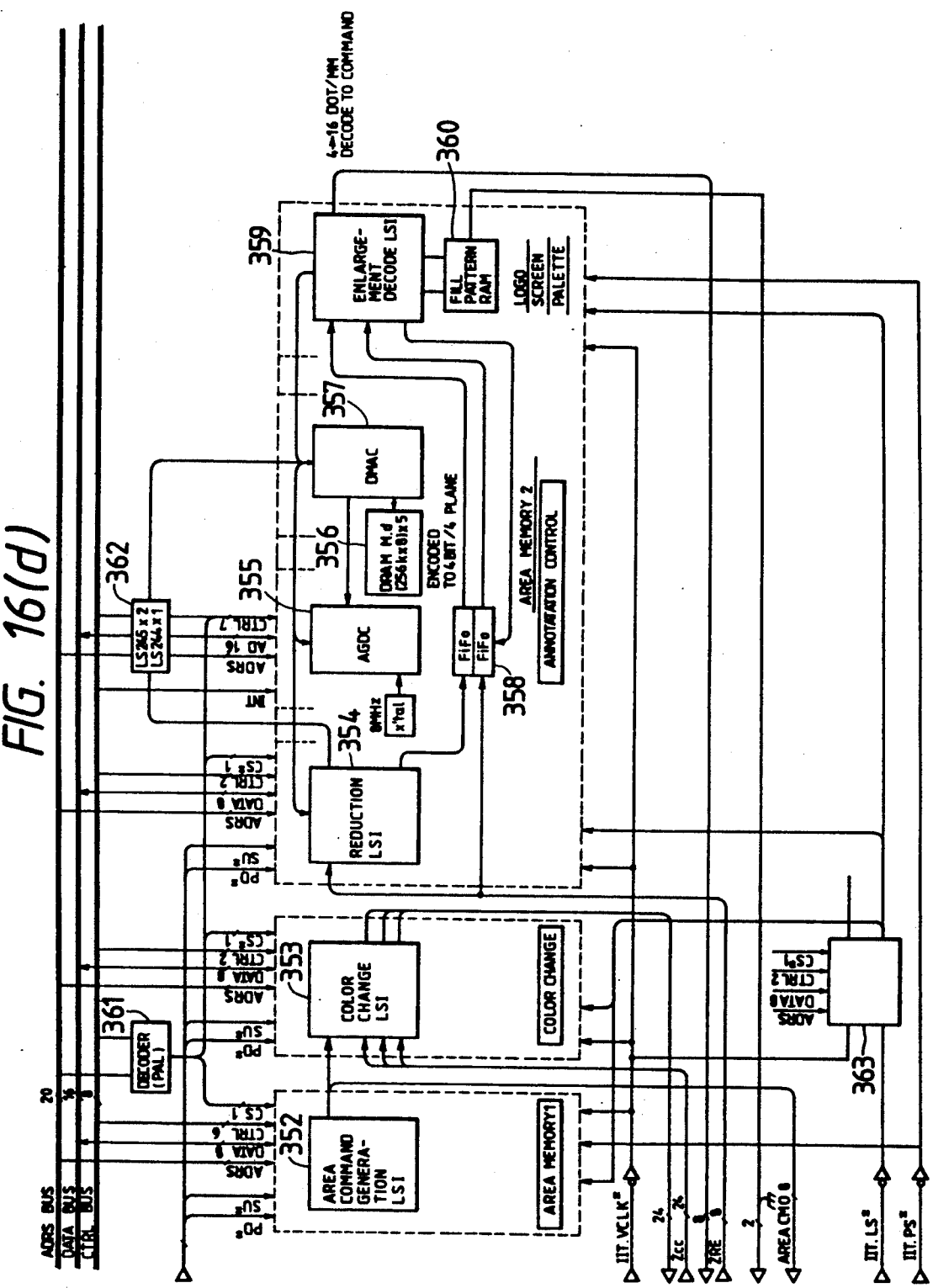

FIGS. 16(a) through 16(d) show a hardware configuration of the IPS. The circuitry of the IPS is divided into two circuit boards IPS-A and IPS-B. The circuit board IPS-A contains circuitry for exercising the basic functions of the color image forming apparatus, such as the reproductions of colors, gradation, and definition. The second circuit board ISP-B contains circuitry for exercising applications and professional work, such as editing. The circuit arrangement of IPS-A is shown in FIGS. 16(a) through 16(c) and the circuit arrangement of IPS-B is shown in FIG. 16(d). During use of the color image forming apparatus of the present invention, user demands for additional and new applications and professional work will inevitably occur. By merely modifying only the circuitry of the second circuit board IPS-B the copier may flexibly cope with such demands, because the basic functions of the copier are secured by the circuitry of the first circuit board IPS-A.

As shown in FIGS. 16(a) through 16(d), the IPS board is coupled with CPU buses including an address bus ADRSBUS, data bus DATABUS, and control bus CTRLBUS. The board is also coupled with video data lines B, G, and R from the IIT, a video clock IIT VCLK as a sync signal, a line sync signal (the main scan direction and the horizontal sync) IIT IS, and a page sync (vertical scan direction vertical sync) IIT PS.

The video data is pipeline processed in the stage after the END converting unit. Accordingly, the video data is delayed by the number of clock cycles required for the respective processing stages in the pipeline processing. A line sync generator/fail check circuit 328 is provided for generating and distributing horizontal sync signals to meet a delay, and for the fail checking the video clock and line sync signal. Consequently, the line sync signal generator/fail check circuit 328 is coupled with the video clock IIT VCLK and the line sync signal IIT IS. To change the settings of the circuit 328, it is coupled with the CPU buses (ADRSBUS, DATABUS and CTRLBUS), and a chip select signal CS.

The video data B, G, and R from the IIT is inputted to the ROM 321 in the END converting unit. The END conversion table may be loaded into RAM, for example, under control of the CPU. However, when use of the copier progresses it is unlikely that the END table must be altered while the image data is being processed. For this reason, two 2K byte ROMs may be used for each of the END conversion tables of B, G, and R. That is, a LUT (look-up table) system using the ROMs and 16 conversion tables may be provided and selectively used by a 4-bit select signal ENDSel.

The END converted data signal outputted from ROM 321 is coupled with a color masking unit made up of a calculation LSI 322 comprising several planes of a 3×2 matrix for each color and coupled with the CPU buses. The coefficients of the matrices may be set in the calculation LSI 322 by the CPU. The LSI 322 is coupled with a set-up signal SU and a choice select signal CS. These signals are used for connecting the calculation LSI 322 that processed the image signals to the CPU buses so as to allow the CPU to reprogram the settings in the LSI 322. A 1-bit select signal MONO is coupled with the calculation LSI 322 for selection of the matrices. The LSI 322 further receives a power down signal PD. When no scan is made in the IIT, i.e., no image processing is performed, the internal video clock is stopped by the power down signal PD.

Those signals of Y, M, and C that have been converted from the color image signals B, G, and R by the LSI 322, are applied to color change LSI 353 in the second circuit board IPS-B shown as in FIG. 16(d). Here, the colors of these signals are changed and inputted to a DOD LSI 323. The color change LSI 353 contains four color change circuits each comprising a threshold register for setting the unchanged colors, color palette for setting changed colors, and a comparator. The DOD LSI 323 contains an original edge detector, black edge suppressor, and the like.

The black edge suppressed data signal outputted from the DOD LSI 323 is applied to a UCR LSI 324. This LSI contains a UCR circuit, black generating circuit, and necessary color generators.

The LSI 324 produces a process color X corresponding to the toner color, necessary colors Hue, and an edge signal Edge. Accordingly, this LSI also receives a process color designating signal COLR and color mode signals (4COLR and MONO).

The line memory 325 consists of two types of FIFOs. The first type is used for storing the 4 lines of data in order to transfer signals corresponding to the process color X, necessary colors Hue, and edge Edge to a 5×7 digital filter 326. The second type is used for adjusting the timing delays caused by the first FIFOs. The process color X and the 4 lines of edge Edge signals are stored, and a total of five lines of these data signals are transferred to the digital filter 326. The data signal of the necessary color Hue is delayed by the FIFO in order to synchronize it with the output data signal of the digital filter 326, and is then transferred to a MIS LSI 327.

The digital filter 326 consists of two 5×7 filters (low-pass filter LP and high-pass filter HP) each comprising three 2×7 LSI filters. One of the 5×7 filters is used for processing the process color X, and the other is used for processing the edge Edge data signal. The MIS LSI 327 applies mesh-point removal and edge emphasis to these output data signals by using the conversion tables. These processed data signals are then mixed into the process color X. The LSI 327 receives an edge EDGE signal and a sharp Sharp signal for switching the conversion tables from one to another.

The TRC 342 comprises 2K bytes of RAM containing eight conversion tables. The conversion tables may be reprogrammed during the return period of the carriage and before each scan and selected by a 3-bit select signal TRSel. The data processed by the IRC 342 is transferred to a reduction/enlargement LSI 345 by a transceiver. In the reduction/enlargement unit, 8K byte RAMs 344 form a ping-pong buffer (line buffer). The LSI 343 generates resampling pitches and addresses for the line buffer.

The output data of the reduction/enlargement unit returns by way of an area memory portion in circuit board IPS-B. An EDF LSI 346 contains a FIFO for retaining the data of the previous line, and performs error diffusion processing by using the previous line data. After error diffusion processing, a signal X is outputted to an IOT interface by way of an SG LSI 347 in the screen generator unit.

In the IOT interface, the signals outputted from the SG LSI 347 which are received in the form of 1-bit on/off signals are packed into an 8-bit data signal and sent in parallel to the IOT.

In the circuit board IPS-B, the data signals actually flowing in the board are for the 16 dots/mm record density. Because of this, a reduction LSI 354 reduces the data into ¼, digitizes them, and finally stores them into an area memory. An enlargement decode LSI 359 contains a fill pattern RAM 360. When reading the area data out of the area memory in order to generate a command, the LSI 359 expands the data to accommodate a record density of 16 dots/mm. By using the expanded data, a log address, color palette, and filter pattern can be generated. A DRAM 356, comprising four planes, stores 4 bits of coded area data. An AGDC 355 is a controller used exclusively for controlling the area commands.

(II-3) IMAGE OUTPUT TERMINAL (IOT)

(II-3-A) Outline

Figure 17:
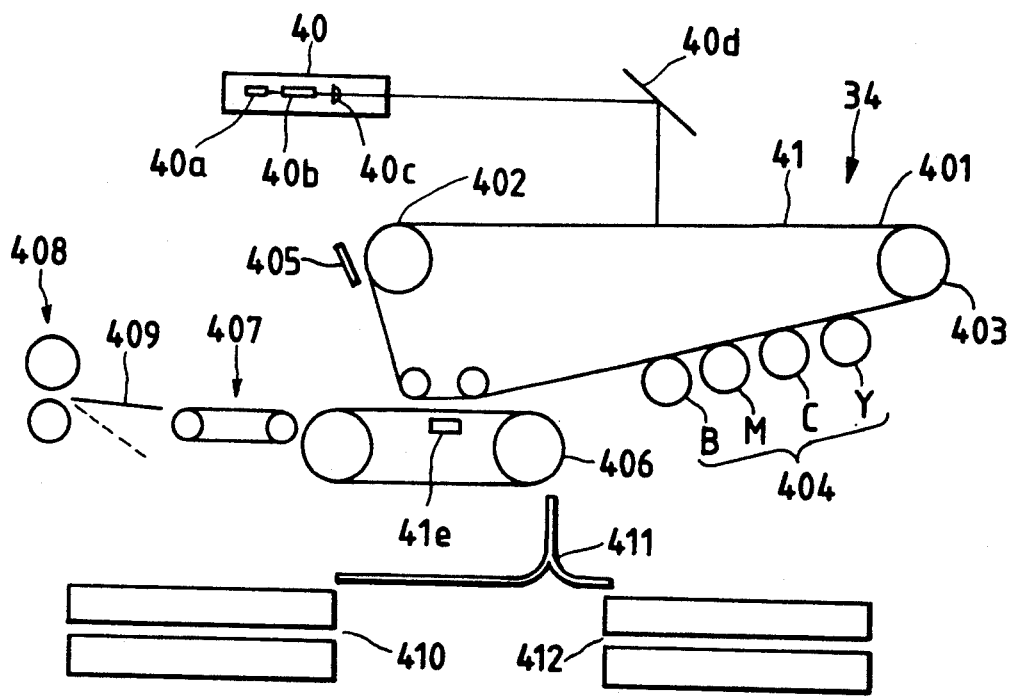
FIG. 17 is an explanatory diagram showing the schematic structure of the IOT.

An outline of the image output terminal (IOT) is shown in FIG. 17. The IOT uses a photo receptor belt 41 as a photo sensitive member. The IOT is provided with a developing unit 404 comprising four developing devices, i.e., black (K), magenta (M), cyan (C) and yellow (Y), for full color development, a tow roll transfer loop 406 for transferring paper to the transfer unit, a vacuum transfer 407 for transferring paper from the tow roll transfer loop 404 to a fuser 408, paper trays 410 and 412, and a paper transfer path 411. The three units of the photo receptor belt, the developing unit 412, and the paper transfer path 411 can be pulled out of the front side of the IOI.

The data light obtained by modulating a laser beam from a laser source 40 is guided through a mirror 40d onto the surface of the photo receptor belt 41, thereby forming a latent image. The latent image formed on the surface of the tow roll transfer loop or turtle 406, is developed into a toner image by the developing unit 404. The developing unit 404 consists of four developing devices K, M, C and Y which are disposed as shown. The layout of the developing devices is such that it allows a relationship between dark attenuation and the characteristics of the respective toners, a difference in the results of mixing of the respective color toners with the black toner, and the like. In the case the full color copy, these developing devices are driven in the order Y C M K.

Papers fed from the two-stage elevator tray 410 and tray 412 are supplied through the transfer path 411 to the transfer tow roll transfer loop 406. The loop 406 is disposed in the location of the transfer unit and comprises a pair of rolls coupled by a timing chain or timing belt and a gripper bar to be described later. The paper is gripped and transferred by using the gripper bar, and the toner image on the surface of the photo receptor belt is transferred onto the paper. In the case of 4-color full color printing, the paper is turned four times by the tow roll transfer belt. During the four turns, the toner images of Y, C, M and K are successively transferred onto the paper in that order. After the image transfer, the paper is released from the gripper bar, transferred to the vacuum transfer 407, and fed to the fuser 408. The toner image on the paper is fused by the fuser and then delivered outside the base machine.

The vacuum transfer 407 compensates for the difference in speed between the transfer loop 406 and the fuser 408 thereby synchronizing their operation. In the present invention, the transfer speed (process speed) is 190 mm/sec. and in the case of full color copying, the fusing speed is 90 mm/sec. Thus, the transfer speed is different from the fusing speed. To secure the fusing speed, the process speed is reduced. Because the 1.5 kVA power supply must be secured, it cannot be distributed to the fuser.

To cope with this problem, when a small size paper, such as B5 and A4, is used, the instant the image transferred paper is released from the transfer loop 406 and rides on the vacuum transfer 407, the speed of the vacuum transfer 407 is decreased from 190 mm/sec to 90 mm/sec making it equal to the fusing speed. The distance between the transfer loop and the fuser is made as short as possible so that the copier of the present invention is compact. Because A3 paper exceeds the distance between the vacuum transfer and the fuser, when the speed of the vacuum transfer is decreased, there inevitably occurs a situation in which the leading end of the paper reaches the fuser while the trailing end is still undergoing the image transfer process. In this situation, the paper is braked resulting in possible color displacement. To solve this problem, a baffle plate 409 is provided between the fuser and the vacuum transfer. When A3 paper arrives, the baffle plate is slanted downwards to curve the A3 paper along the plate thereby effectively elongating the path between the fuser and the vacuum transfer. Accordingly, the vacuum transfer is operable at the same speed as the transfer loop 406 transfer speed. With such an arrangement, after the image transfer is ended, the leading end of the paper reaches the fuser such that the speed difference between the transfer loop 406 and the fuser 408 is compensated for and both operate in synchronicity. The above approach is similarly applied to the OHP because it has a poor thermal conduction.

The copier of the present invention is designed such that a black copy as well as full color copies can be made with high efficiency. In the case of a black copy, the toner layer is thin and hence requires less heat to be fused. Accordingly, the fusing speed is 190 mm/sec and is not reduced during the vacuum transfer. The same holds true for a single color copy because the single color copy has a single toner layer. After the transfer process is completed, a cleaner 405 wipes off any toner remaining on the surface of the photo receptor belt.

(II-3-B) Transfer Loop

Figure 18A:
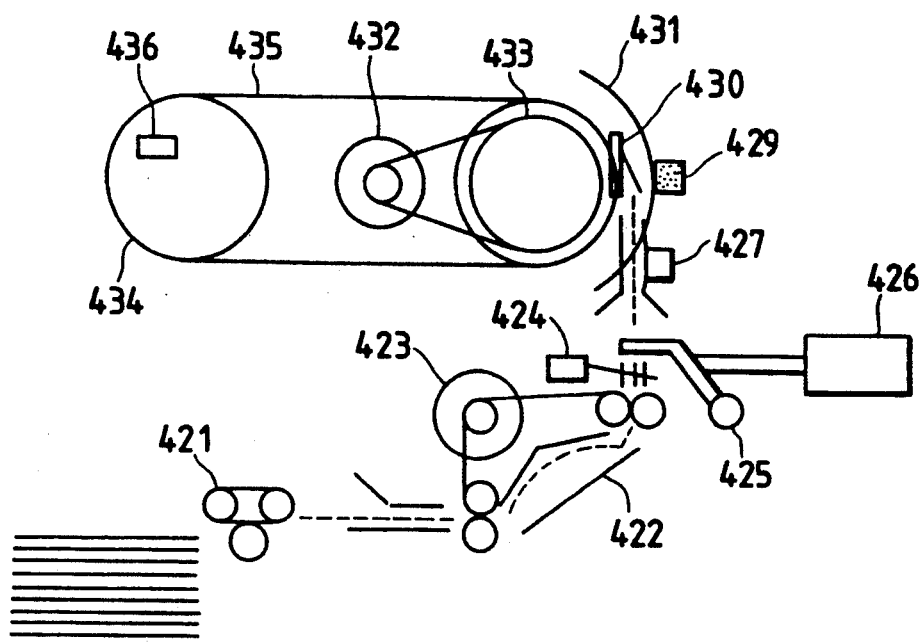
FIGS. 18(a) and 18(b) are explanatory diagrams showing the structure of a transfer unit.

The tow roll transfer loop 406 is configured as shown in FIG. 18(a) such that no mechanical paper support member is used, thus eliminating color irregularity, and the transfer speed can be increased through a speed control. Papers are picked up from a tray one sheet at a time by a feed head 421 and are transported through a buckle chamber 422 and a registration gate 425, controlled by a registration gate solenoid 426, to the transfer loop. Arrival of the paper at the registration gate 425 is detected by a preregistration gate sensor 424.

The transfer loop is driven counterclockwise by rotating a roller 433 and a servo motor 432 through a timing belt. No particular drive is applied to another roller 434. A timing chain or belt 435 is wound around the paired rollers. A grip bar or gripper 430 is provided between the chains (in the direction orthogonal to the paper transfer direction). The gripper 430 is opened at the entrance of the transfer loop with the aid of a solenoid. The gripper 430 grips and pulls the paper for transfer at the entrance to the transfer loop. Conventionally, an aluminum or steel support covered with a mylar sheet or mesh supports the paper. When it is heated, the differences in thermal expansion with respect to the support results in surface irregularities. The surface irregularities of the support cause nonuniform transfer efficiency over the support surface, and, consequently, color irregularity. The use of the gripper 430 eliminates a need for the paper support thus avoiding the color irregularities.

The transfer loop is not provided with a support for the transferred paper, and the paper is released by centrifugal force. To hold the paper against the centrifugal force, the paired rollers are designed to draw a vacuum and attract the paper thereby causing the paper to flutter after passing the roller. At the transfer point, the paper is electrostatically attracted toward the photo receptor belt near a detach corotron and a transfer corotron, and the toner image on the photo receptor surface is transferred onto the paper. After the image transfer, at the exit of the transfer loop, the present position of the gripper 430 is detected by a gripper home sensor 436. At the proper time, the gripper 430 is opened by a solenoid thus releasing the paper and transferring it to the vacuum transfer 413.

In the case of the full color copy, the paper is turned around the transfer loop four times for color image transfer purposes. Likewise, in the case of the three-pass color copy, the paper is turned three times.

Figure 18B:
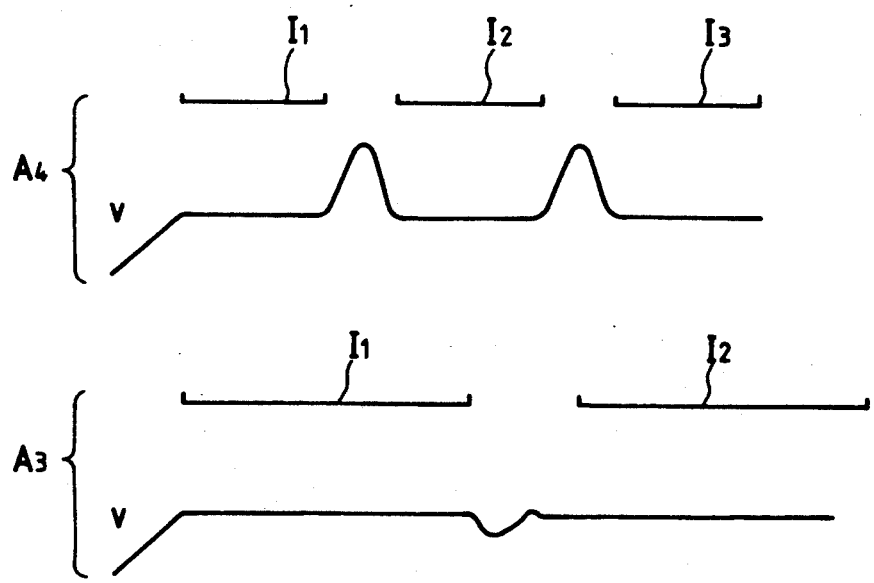

The timing control of the servo motor 432 will be described with reference to FIG. 18(b). The control of the transfer loop is such that, during image transfer, the servo motor 432 is driven at a constant speed, and after the transfer process ends, the lead edge transferred onto the paper is coincident with the transfer point of the next latent image. The length of the photo receptor belt 41 is such that three latent images are formed for A4 paper, and two latent images are formed for A3 paper. The length of the belt 435 is approximately 1⅓ times the length of the A3 paper.

To make a color copy on A4 size paper, when a latent image $I_1$ of the first color is transferred to the paper, the servo motor 432 is driven at a constant speed. After the transfer ends, the servo motor is rapidly accelerated so that the lead edge transferred onto the paper coincides with the leading edge of the latent image $I_2$ of the second color. To make a color copy of A3 size, after the transfer of the first color latent image $I_1$ ends, the servo motor is decelerated and waits until the lead edge transferred onto the paper coincides with the leading edge of the latent image $I_2$ of the second color.

(II-4) USER INTERFACE (U/I)

(II-4-A) Use of Color Display

Figure 19A:
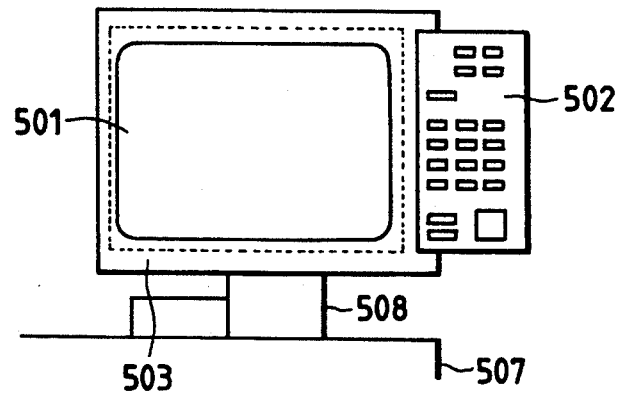
FIGS. 19(a) through 19(c) are diagrams showing an example of mounting a UI using a display.
Figure 19B:
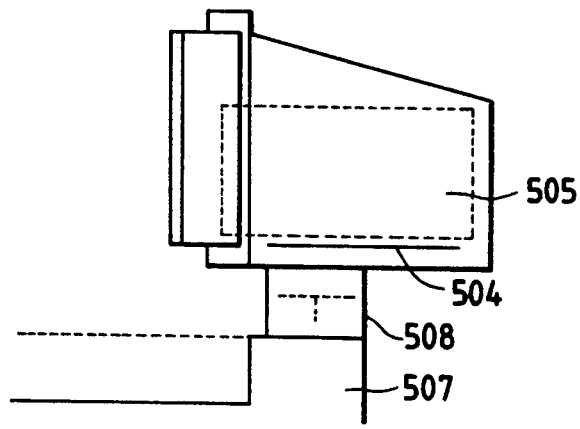
Figure 19C:
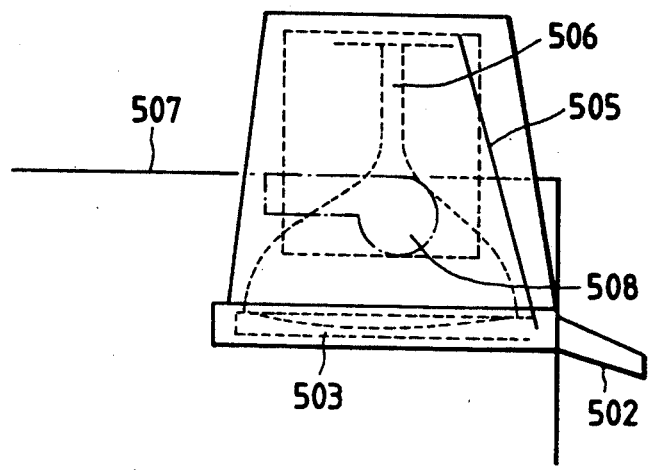
Figure 20A:
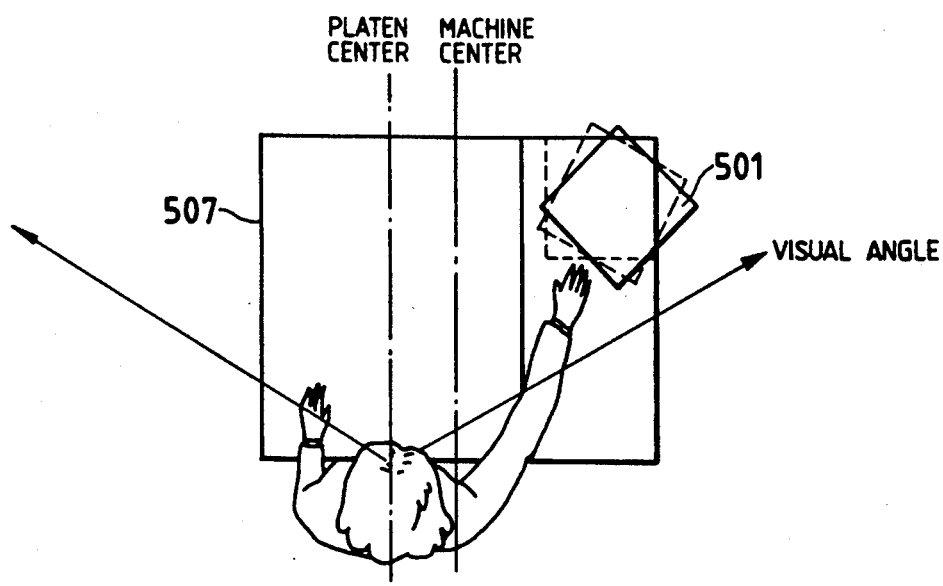
FIGS. 20(a) and 20(b) are diagrams showing a placement angle and height of the UI.
Figure 20B:
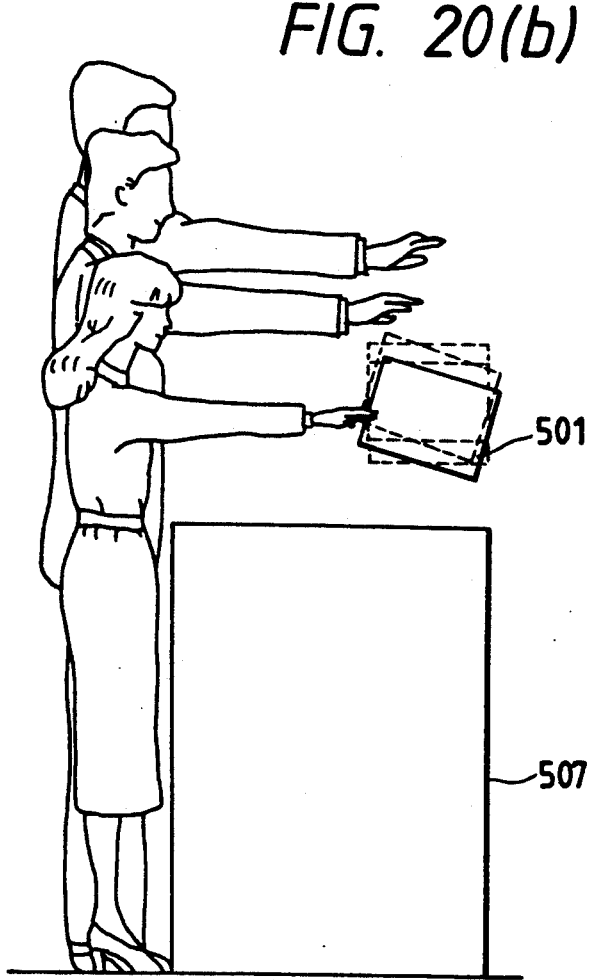

FIGS. 19(a) through 19(c) show how a user interface (UI) utilizing a display device is mounted, and FIGS. 20(a) and 20(b) illustrate the angle and height of the user interface mounted to the base machine.

The user interface is a man-machine interface and so it must be simple to operate and distinctively and impressively present necessary information to an operator. The user interface according to the present invention is user friendly and simple to use for both beginners and experienced operators alike. The main interface allows a user to directly select desired functions and provides necessary information to the operator quickly and accurately through the use of colors, icons, and buttons.

Operability constitutes an important factor in evaluating the user interface. To improve the operability of the user interface of the present invention, the user interface is provided with a 12″ color display monitor 501 and a hard control panel 502 located near the monitor, as shown in FIG. 19(a). Such a creative color display provides legible menus to its users. Further, an infrared ray touch board 503 is disposed on the periphery of the color display 501 to allow a user to directly access the machine by soft buttons displayed in the screen of the monitor 501. Various types of operations are assigned to the hard buttons on the hard control panel 502 and the soft buttons in the screen of the monitor 501 to provide for simple operation and effective use of the menu displays.

The color display 501 and the hard control panel 502 are provided on the rear side of the base machine 507 with a monitor control/power supply board 504, a video engine board 505, and a CRT driver board 506, and the like, as shown in FIGS. 19(b) and 19(c). As shown in FIG. 19(c), the hard control panel 502 is inclined toward the front of the display 501.

The color display with the hard control panel 502 is placed atop a support arm 508, i.e., not directly placed on the base machine so that it stands erect on the base machine 507. Since a stand-type color display 501 and not a console panel-type is used in the conventional machine, the display may be installed above the base machine 507. Particularly, when it is located at the right back corner, the dimensions of the copier may be designed without having to take the console panel space into account. A compact copier may, therefore, be designed The height of the platen or the base machine is selected to be waist high, which is best for a user to set an original on the platen table. This height limits the design freedom in selecting the height of the base machine. The conventional console panel is mounted on the top of the base machine. The console is placed substantially at waist height, making access to the console panel by hand easy. However, the display and operating sections for selecting the various functions and for setting the conditions to execute the functions are relatively far out of the operator's sight.

In the case of the user interface of the present invention, however, the display and operating sections are placed above the platen and thus closer to the operator's eyes than the conventional console. Therefore, it is easy to operate the machine and see the sections, as shown in FIG. 20(b). Further, these sections are positioned not below the operator's eyes, but to the right and in front of them. Such placement makes it easy to operate the machine and provides additional space to accommodate the control board and option devices including a memory card device, a key counter, and the like. Accordingly, when a memory card device is assembled into the copying machine, no structural or aesthetic appearance modifications to the base machine are required. Further, it is easy for a designer to properly select where to mount and adjust the height of the display. The display may also be adjusted to a desired angle.

(II-4-B) System Configuration

Figure 21:
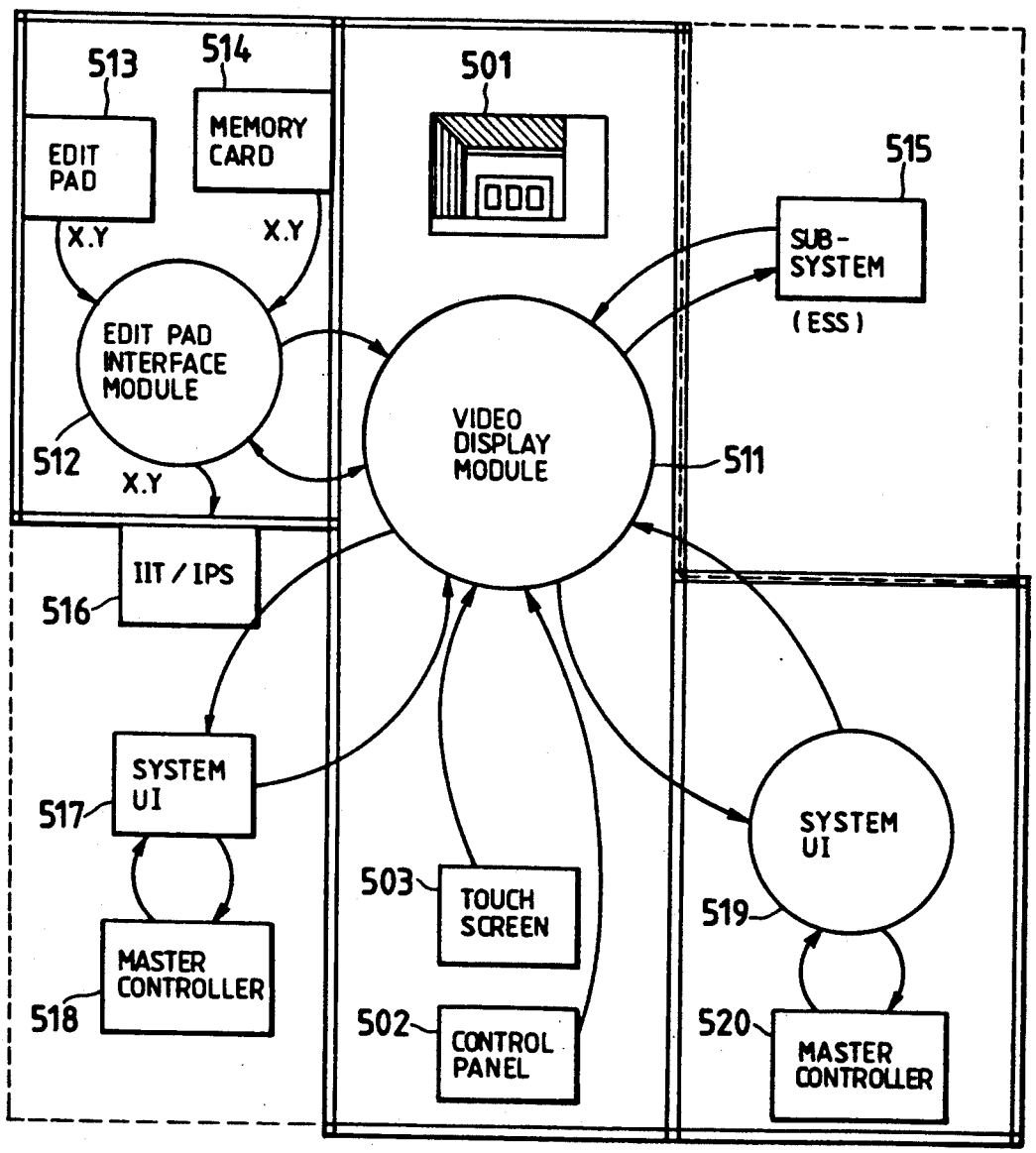
FIG. 21 shows a module configuration of the UI.
Figure 22:
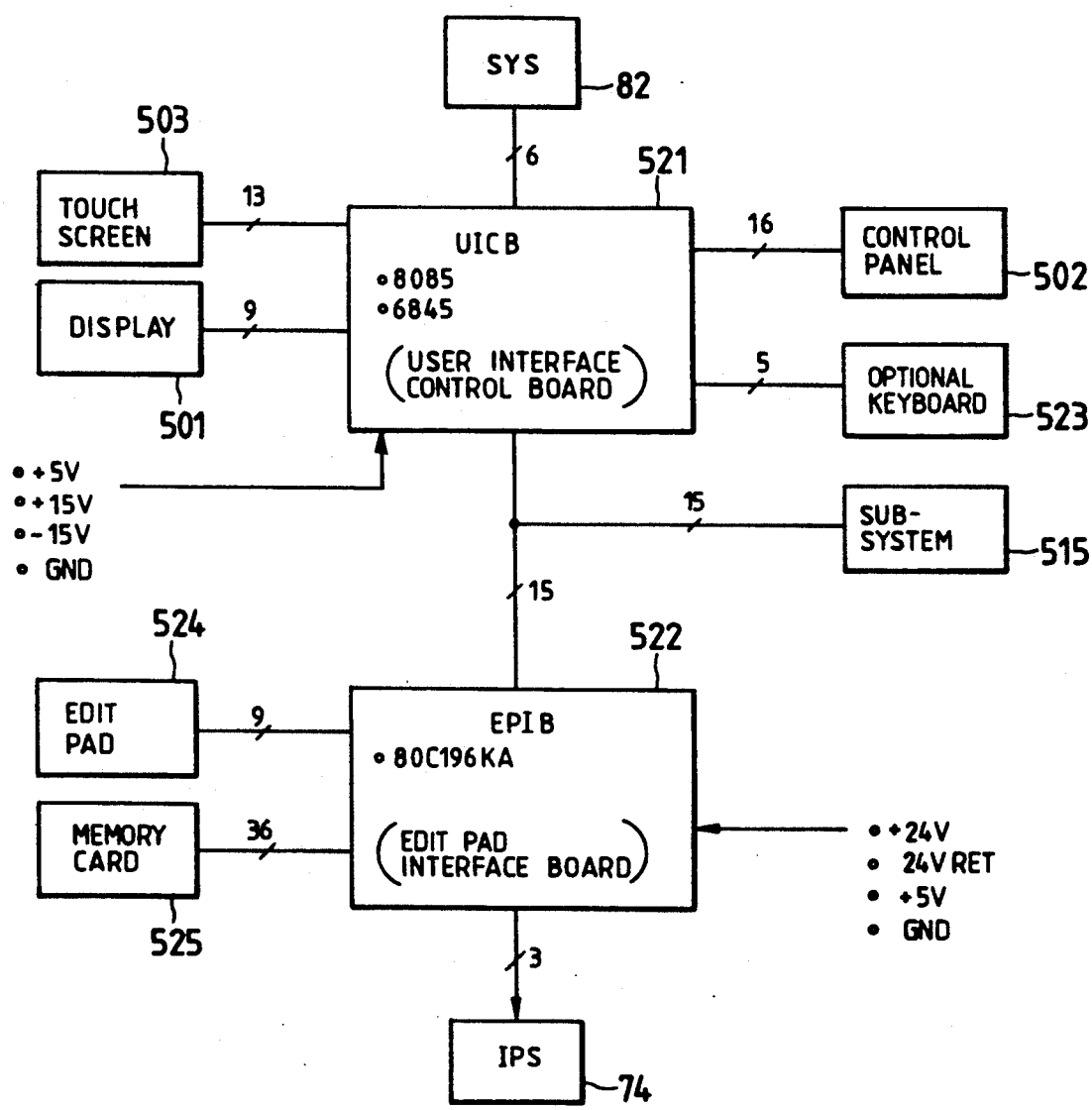
FIG. 22 shows a hardware configuration of the UI.

FIG. 21 shows a module configuration of the user interface, and FIG. 22 shows a hardware configuration of the same.

As shown in FIG. 21, the user interface of the present invention is composed of a video display module 511 for controlling the display screen of the color display 501, and an edit pad interface module 512 for inputting and outputting data to and from an edit pad 513 and a memory card 514. System UIs 517 and 519 and a subsystem 515 for controlling the above modules, and a touch screen 503 and a control panel 502 are connected to the video display module 511. The edit pad interface module 512 enters X and Y coordinate data from the edit pad 513, receives jobs and X and Y coordinates from the memory card 514, sends video map display data to the video display module 511, and transfers UI control signals to and from the video display module 511.

An area designation consists of a marker designation for designating a specific area on an original by a red or blue marker for effecting trimming and color change process, a 2 point designation by using coordinate data in a rectangular area, and a closed loop designation by tracing an edit pad. The marker designation has no particular data. The 2 point designation is for designating a small amount of data. The closed loop designation requires a large amount of data for the area to be edited. The IPS is used for the editting data. The amount of data is too large to transmit at high speeds. For this reason, the transfer line connected to the IIT/IPS 516 and exclusively used for transmitting the X and Y coordinate data is provided separately from the ordinary data transmission line.

The video display module 511 enters vertical and horizontal input points (coordinate positions) on a touch screen 503, recognizes a button ID, and enters a button ID on the control panel 502. Further, the video display module 511 sends a button ID to the system UIs 517 and 519, and receives a display request from the system UIs 517 and 519. The subsystem (ESS) 515 is connected to a work station and a host CPU, for example, and serves as a print controller when the copying machine is used as a laser printer. In this case, the data of the touch screen 503, control panel 502, and keyboard (not shown) is transferred to the subsystem 515. The contents of the display screen are sent from the subsystem 515 to the video display module 511.

The system UIs 517 and 519 transfer the copy mode and machine state data to and from master controllers 518 and 520. In connection with the software architecture shown in FIG. 4, one of the system UIs 517 and 519 is the SYSUI module 81 in FIG. 4, and the other is the MCBUI module 86 of the MCB remote.

The hardware of the user interface according to the present invention comprises control boards UICB 521 and EPIB522, as shown in FIG. 22. In connection with the above module configuration, the functions of the user interface are also categorized into two groups. The UICB 521 uses two CPUs, such as Intel 8085 and 6845 microprocessors or their equivalents in order to control the hardware of the UI, to drive the edit pads 513 and 514, and to process the received data of the touch screen 503 and to write the results on the CRT screen. The EPIB 522 uses a 16 bit CPU, such as the 80C196KA made by Intel, and transfers the data depicting the bit map area to the UICB in the DMA mode. A 16 bit CPU is used because an 8 bit CPU is not able to depict data in the bit map area and so that the many machine functions are decentralized.

Figure 23:
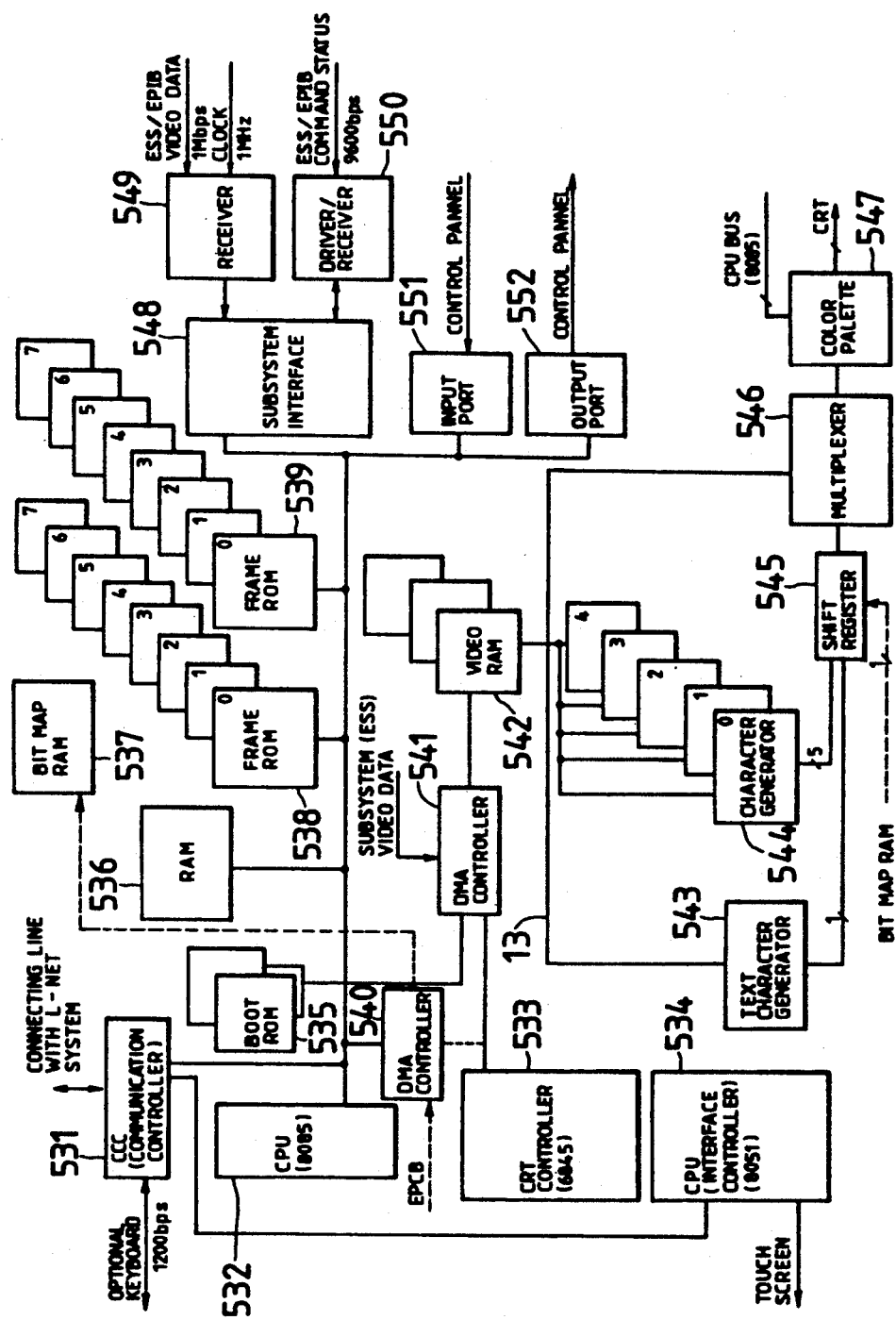
FIG. 23 shows a configuration of a UICB.

FIG. 23 shows a circuit arrangement of the UICB. The UICB uses a CPU 534, such as an Intel 8051 or its equivalent, in addition to the above CPUs CCC 531 and is connected to the high speed communication line L-NET or a communication line of an optional keyboard. In addition, it controls communications by the CPU 534 and CCC 531. Further, the CPU 534 is also used for driving the touch screen. The signals of the touch screen, i.e., the coordinate position data, are fetched through the CCC531 and into the CPU 532 from the CPU 534. The CPU 532 recognizes and processes the button ID. The UICB is connected to the control panel through an input port 551 and an output port 552. Further, it receives video data at 1Mbps together with a 1MHz clock signal from the EPIB 522 and the subsystem (ESS) through the subsystem interface 548, receiver 549, and driver 550. In addition, it is capable of transmitting and receiving commands and status data at 9600 bps.

The memories used are a boot ROM 535, which stores a bootstrap program, frame ROMs 538 and 539, RAM 536, bit map RAM 537, and V-RAM 542. The frame ROMs 538 and 539 store the data with regard to the display screen. Because this data structure is not a bit map, it may be handled by software. When a display request arrives through the L-NET, the CPU 532 generates depicting data in the RAM 536 to be used as a work area. The data generated is written into the V-RAM 542 by the DMA 541. The bit map data is transferred from the EPIB 522 to the bit map RAM 537, and written thereinto by the DMA 540. A character generator 544 is used for a graphic tile and a text character generator 543 is used for a character tile. The V-RAM 542 is controlled by a 24 bit (3 byte) tile code. The tile code comprises 13 bits to indicate the kinds of tiles, 2 bits to identify text, graphic or bit map, 1 bit for brink data, 5 bits for color data of the tiles, and 3 bits to indicate background or foreground. A CRT controller frames a display according to the tile code data that is stored in the V-RAM 542, and feeds the video data to the CRT screen by way of a shift register 545, multiplexer 546, and color palette 547. Depiction in the bit map area is changed by the shift register 545.

Figure 24:
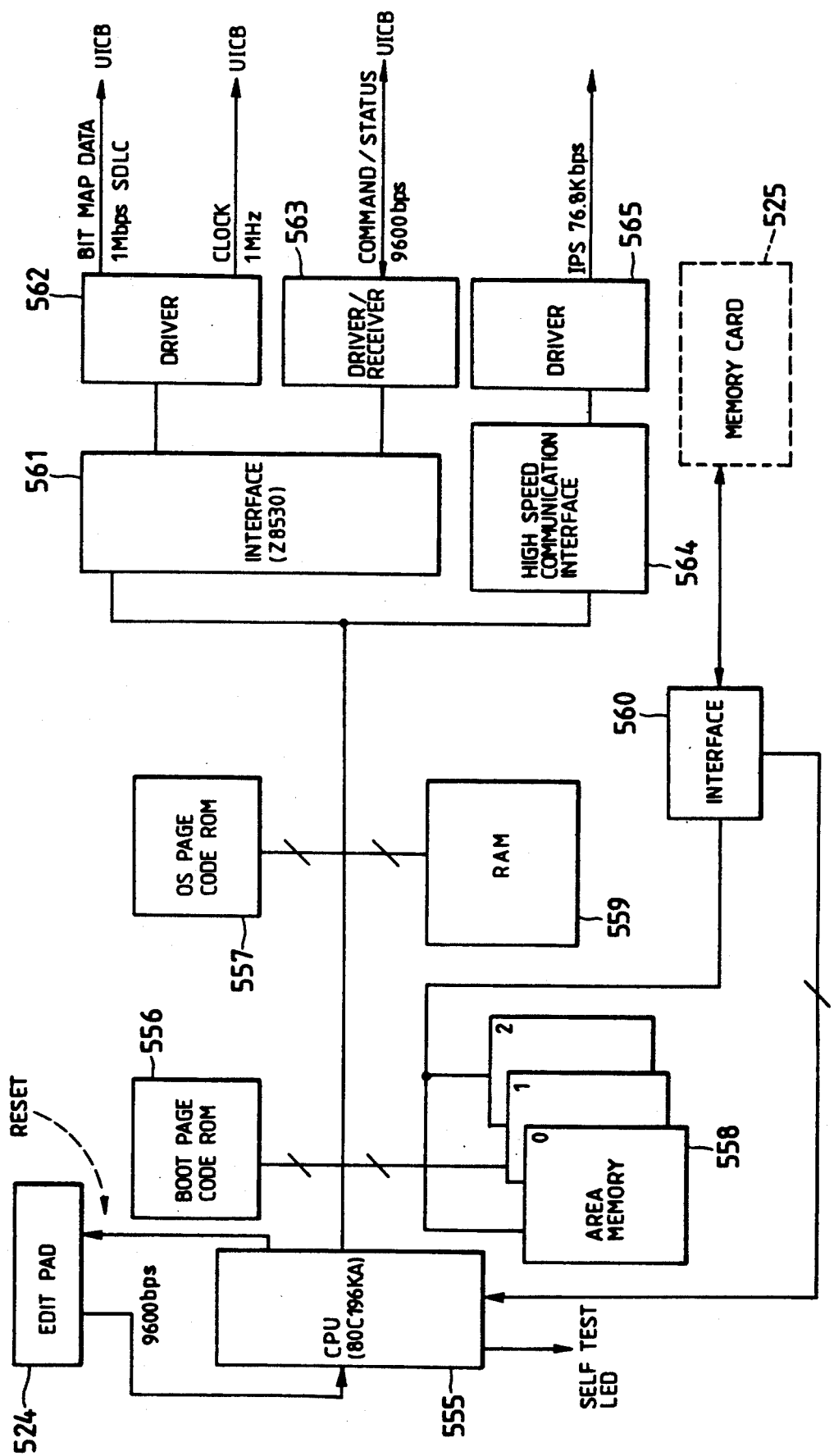
FIG. 24 shows a configuration of an EPIB.

FIG. 24 shows an arrangement of the EPIB. The EPIB comprises a 16 bit CPU 555, such as on Intel 80C196KA or its equivalent, boot page code ROM 556, OS page code ROM 5557, area memory 558, and RAM 559 used as a work area. The EPIB transfers bit map data to the UICB, and transfers commands and status data to and from the same, through a driver 562 and a driver/receiver 563. Through a high speed communication interface 564 and a driver 565, the EPIB transfers X and Y coordinate data to the IPS. Data transfer to and from a memory card 525 is performed through an interface 560. Accordingly, when the EPIB receives the data designating a close loop edit area, or copy mode data from the edit pad 524 or the memory card 525, the received data is transferred to the UICB through the interface 561 and the driver 562, and to the IPS through the high speed communication interface 564 and the driver 565.

(II-4-C) Effective Use of Display Screen

Also, in the case of using a display system as the user interface to visually present a large amount of data of the multifunctioning copying machine, the amount of data required to assist the display of the machine operating data is correspondingly increased. The increase of data requires a broad display area, which is contrary to the concept of a compact machine. If a compact size display is used, all necessary data must be displayed on one display screen. However, this high display density is difficult to realize. Further if it were realized, the displayed items would be illegible to an operator.

In the present invention, the display screen layout and its controls are designed in such a manner as to enable use of a compact display. The color display can provide various display modes by controlling many display attributes such as color, brightness, and the like. In this respect, the color display is superior to LED and LCD displays used in the conventional console panel. By making use of its advantageous features, a legible display with a compact display unit can be obtained.

For example, the information to be displayed on the display screen is categorized into a plurality of groups of information displayed in a plurality of displays. With regard to one display, the detailed information is displayed in a pop-up manner, and is not displayed on the primary display screen. Accordingly, the display is concise, clear and contains only necessary information.

In the display containing different items of information, color and emphatic indicators are used so that the operator can readily and distinctly differentiate the necessary information on the display screen from the unnecessary information.

a. Screen Layout

Figure 25A:
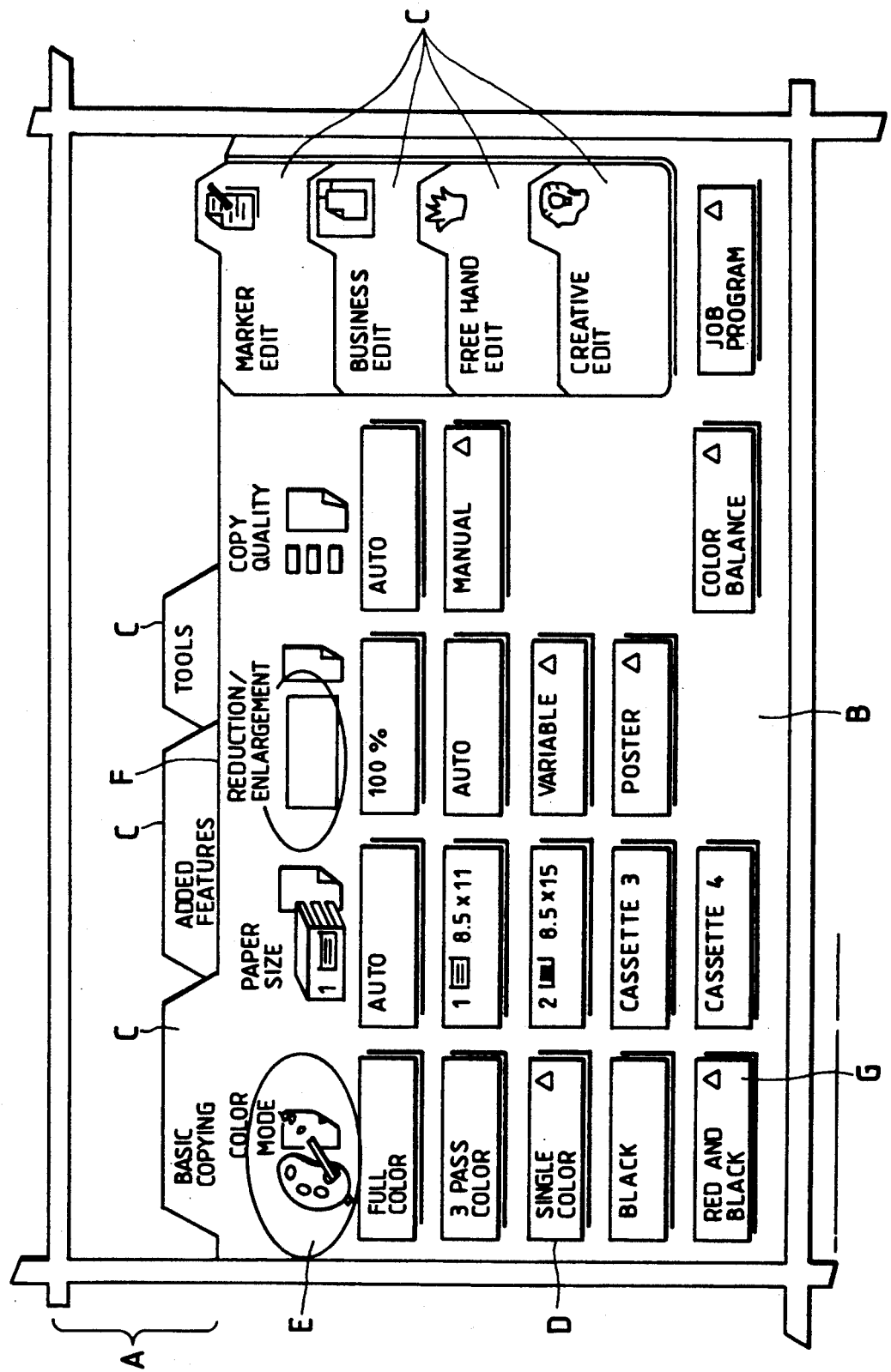
FIGS. 25(a) through 25(c) show display layouts for instructive controls.
Figure 25B:
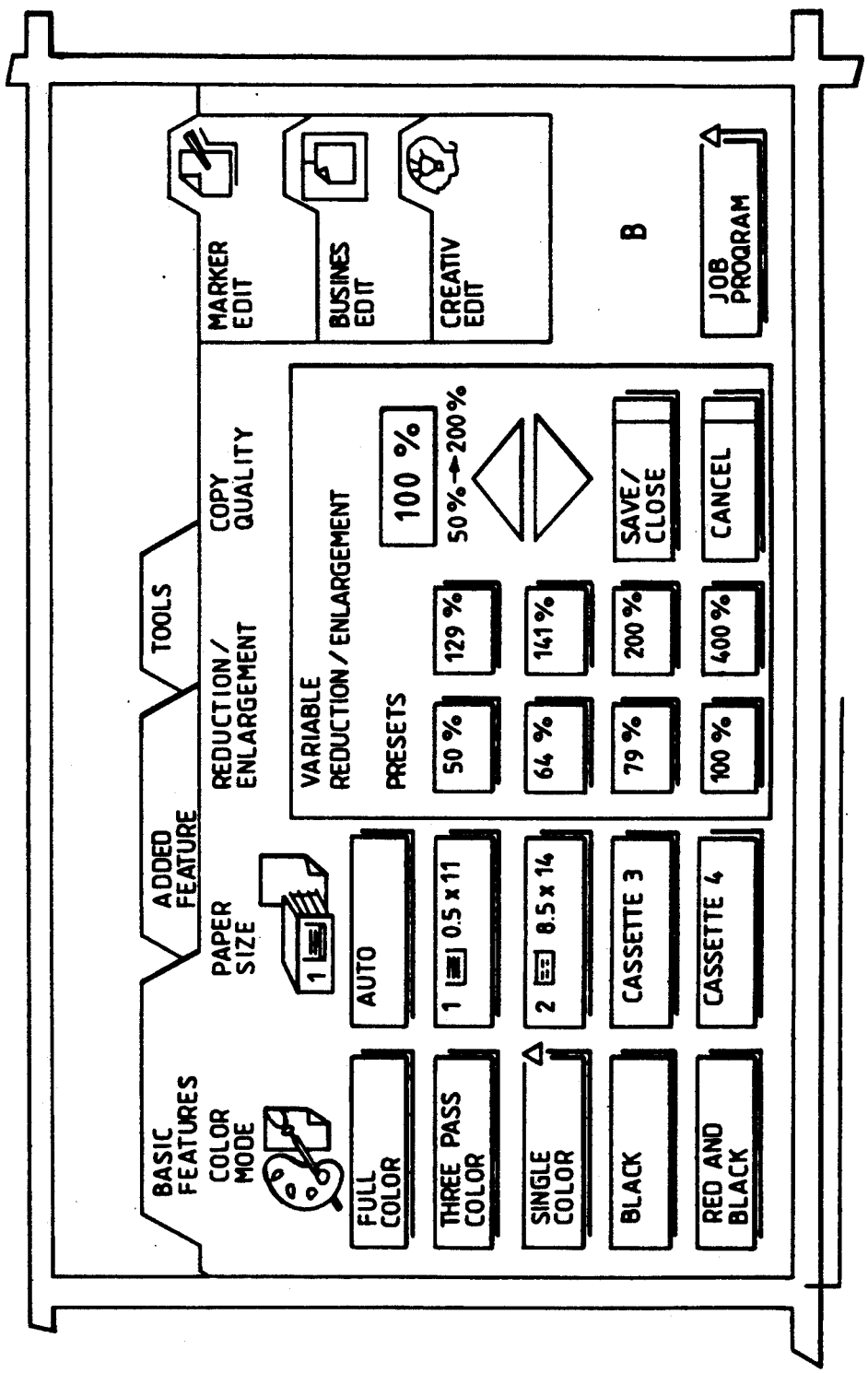
Figure 25C:
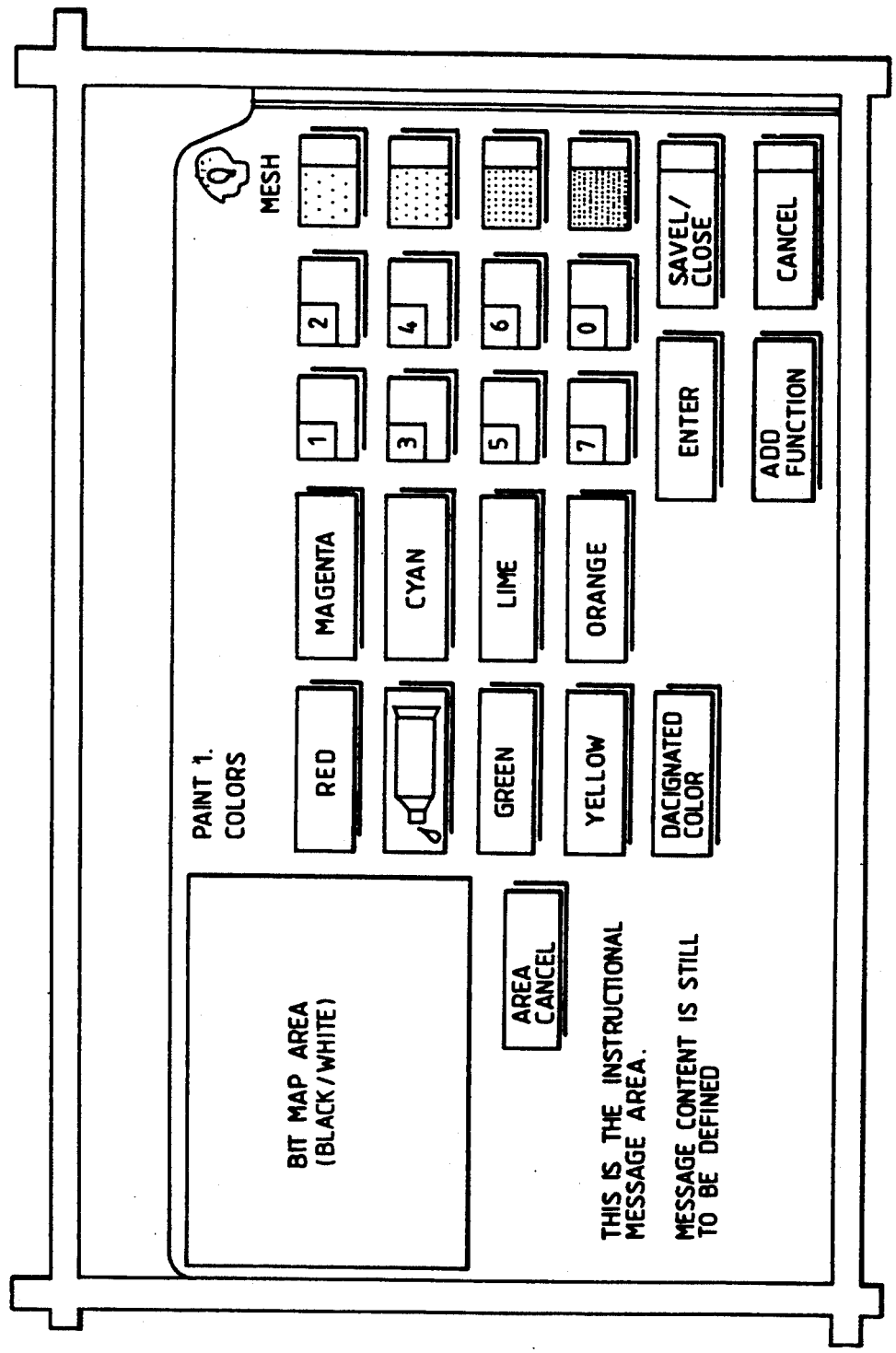

FIGS. 25(a) through 25(c) show display screen layouts. FIG. 25(a) shows a basic copy display, FIG. 25(b) shows a display in which a pop-up display is inserted in the basic copy display, and FIG. 25(c) shows a paint 1 display of the creative edit.

In the user interface according to the present invention, an initial display shown in FIG. 25(a) is the basic copy display for setting copy modes and is divided into two sections, a message area A and a pathway area B.

The message area A consists of the upper three lines on the screen. The first line is for a statement message, the second and third lines are for various messages, such as a guide message when different functions are contradictively selected, a message showing a faulty state of the machine, and an alarm message, and the right end portion of the message area is used for displaying the number of copies, such as the number of copies set by the ten key keypad, and the number of copies under copying operation.

The pathway area B is used to select various functions, and contains many pathways such as basic copy, added feature, marker edit, business edit, free hand edit, creative edit, and tool. The pathway tabs C for each pathway are also displayed. Each pathway comprises a pop-up function for improved operability The pathway area B further contains soft buttons D as choices for selecting functions by touching it by the finger, an icon (picture)E for indicating the function selected, and an indicator F for indicating magnification percentages. Those soft buttons with pop-up functions are marked with a pop-up mark G of delta (Δ). By touching the pathway tab C, the pathway corresponding to the touched tab is opened. By touching the soft button, the function indicated by the touched soft button is selected. The soft buttons D are logically arranged for easy operation.

The basic copy display as well as the other displays are sorted to maximize their compatibility with other devices, and between the soft panel and hard console panel. Further, each edit display consists of a plurality of levels that can be selected in accordance with the degree of skill of the operator. Further, the pop-up function is used. Of those functions displayed, functions requiring a high level of technique or those which are complicated are displayed in a pop-up manner.

The pop-up display has detailed setting items data for a specific function and a pop-up open function. To see detailed setting items data, the pop-up must be opened. Once opened, the display of each pathway is easy to see. The pop-up display is opened by touching the soft button with the pop-up mark and is closed by touching a close button, a cancel button, or an all-clear button, or when an auto clear function operates. A display shown in FIG. 25(b) appears when the reduction/enlargement function is selected and the pop-up display is opened by touching a variable reduction/enlargement soft button.

In the basic copy display, when the pathway tab for the creative edit is touched, the display changes to the creative edit pathway screen. The display of paint 1 of the creative edit pathway displays is shown in FIG. 25(c). The display includes a bit map area H and an instructional message area I. The bit map area H is located in the left upper portion of the screen. When an edit area is designated by the edit pad, a single color bit map is displayed in the area and an instructional message area I is located in the lower left portion in the screen. By using this area, instructive messages for edit work are presented to the operator. As a matter of course, the message differs with the type of the edit work to be performed in the screen, a work area occupies an area except for the bit map area H, instructional area I, and the message area A, in the upper portion of the screen.

b. Basic Copy Display

As shown in FIG. 25(a), the pathway for the basic copy display includes soft buttons (choices) for selecting color mode, paper select, reduction/enlargement, copy image quality, color balance, and job program, and the pathway tabs for selecting marker edit, business edit, freehand edit, and creative edit, and edit feature and tool. This pathway is an initial pathway and is displayed after power on and when an auto clear mode is initiated by pushing the all clear button.

The color mode comprises five modes, a full color (4 pass color) mode using the four colors Y, M, C and K for copy, a 3-pass color mode using the three colors Y, M, and C, a single color mode using a single color selected from among 12 colors, a black mode, and a black/red mode. A default mode may be automatically selected and appropriately set. The single color mode and the black/red mode have detailed setting items so are displayed in a pop-up code.

The paper select mode comprises an automatic paper select (APS), tray 1, tray 2, cassette 3, and cassette 4. The APS functions when a specific magnification is set in the reduction/enlargement mode, and does not function when the auto magnification select (AMS) mode is set up. The default mode is the APS.

The reduction/enlargement mode comprises 100%, AMS for determining magnification on the basis of document size and paper size when paper of a specific size is set, and variable magnification select. In this mode, a set, calculated on auto magnification, is indicated by the indicator on top. In the variable magnification select, magnification may be set in steps of 1% and in the range of 50% to 400%, the default being 100%. Magnification in the vertical and the horizontal directions may be set independently. Accordingly, these detailed items are displayed in the pop-up mode.

With respect to the reduction/enlargement mode described above, magnification in the vertical scan direction (X direction) is adjusted by controlling the scan speed and magnification in the main scan direction is adjusted by changing the method of reading data from the line memory in the IPS.

There are two choices of copy image quality, an auto mode and a manual mode. In the auto mode, the optical density is automatically controlled for a mono color document, and a color balance is automatically controlled for a color document. In the manual mode, the pop-up technique is used for controlling the optical density of the document in seven steps. The control is carried out by the IPS.

The job program is effective only when a memory card is inserted into a slot of the card reader. In this mode, jobs can be written into and read out of the memory card. The memory card used in this instance has 32K bytes and is capable of storing a maximum of 32 jobs. Accordingly, all jobs other than that of the projector mode can be programmed.

c. Edit Feature Display

The pathway of the edit feature display includes soft buttons (choices) for selecting copy output, copy sharpness, copy contrast, copy position, film projector, page programming, job program, and binding margin, and the pathway tabs for the marker edit, business edit, freehand edit, and creative edit, and the basic copy and tool.

The copy output has two choices, a top tray and a sort mode. The default is the top tray, and when no sort is used, this item is not indicated.

The copy sharpness has three choices, standard, manual, and photo. In manual mode, the pop-up display is used and control in 7-steps is possible. In the photo mode, the pop-up display is used and contains items of photo, character, print and photo/character. The control for this is carried out in the IPS.

The copy contrast has a seven step copy contrast control. The copy position has a choice of an auto center function in which the center of the copy image is positioned at the center of paper by the default.

The film projector is used for copying images onto various kinds of films, and will be described in detail later. The pop-up display is used for selecting any 35 mm negative and 35 mm positive by the projector, and any 35 mm negative 6 cm×6 cm slide and 4"×5" slide on the platen.

The page programming has choices of cover mode for applying a cover to copies, insert mode for inserting white or color paper into copied papers, color mode to set color copying for every page of the document, and paper to select a desired tray for every page of the document. This item is not displayed when the ADF is not set up.

In the binding margin mode, the margin may be set in increments of 1 mm and in the range of 0 to 30 mm. The binding margin designates one location for one document. The length of the binding margin is from the lead end of the paper to the lead end of the image area. The length of the margin in the main scan direction is adjusted by a shift operation of the like buffer in the IPS. The length of the margin is adjusted by shifting the scan timing of the IIT.

d. Edit Display and Tool Display

The edit display consists of four pathways, the marker edit, business edit, free hand edit, and creative edit.

The marker edit pathway and the free hand pathway comprise the choices extract, delete, color application (mesh/line/solid), and color change. Further, they have basic copy, edit feature, and tool pathway tabs.

The business edit pathway comprises the choices extract, delete, color application (mesh/line/solid), color conversion, coloring, logotype insertion, and binding margin. Further, the business edit pathway, like the marker edit and free hand pathway, have basic copy, edit feature, and tool pathway tabs.

The creative edit pathway comprises the choices extract, delete, color application (mesh/line/solid), color conversion, coloring, logotype insertion, binding margin, negative/positive inversion, inlay composition, transparency composition, paint, reflected image, repeat, enlargement continuous projection, partial movement, corner/center movement, manual/auto one-side magnification, color mode, color balance control, page continuous copy, and color composition. Further, the creative edit pathway also has basic copy, edit feature, and tool pathway tabs.

The tool pathway is used by key operators and customer engineers and is opened by entering a password. Choices of the tool pathway include an auditron, machine initial value set-up, default select of the respective functions, color registration., film type registration, fine adjustment of registered color, preset of the respective choices of the machine, setting of a film projector scan area, audio tone, i.e., type of tone and volume, setting of timers for the paper transport system and others, i.e., auto clear, etc., billing meter, setting of dual languages, diag. mode, max. control value, and memory card format.

The default select determines color mode, paper select, copy density, copy sharpness, copy contrast, paper tray for page programming, color of the single color, color and mesh of a color palette for color application, pattern of a logotype, binding margin, and color balance.

e. Other Display Controls

Progress of the copying operation can be constantly monitored by the user interface. When a jam occurs, the user interface displays the occurrence. With respect to function settings, an information display presents information concerning the current display parameters at all times.

The displays, not including the bit map area, are composed of 3 mm (8 pixels) wide and 6 mm (16 pixels) high tiles. Each display is 80 tiles wide and 25 tiles high. The bit map area is displayed with pixels and is 151 pixels high and 216 pixels wide.

As described above, the user interface is arranged such that the functions are categorized into different modes such as the basic copy, edit feature, and edit. The various displays are assigned to those modes, and accordingly, the display is changed in accordance with the mode used. The display of each mode presents items such as function select, setting of conditions for function exercise, and the like. To exercise a function, a choice must be selected by pushing the associated soft button. Necessary condition data can be entered while viewing the display. Some of the choices in the menu are displayed in the form of a pop-up display (overlay display or window display) which provides a concise and easy-to-see visual presentation, even if the number of selectable functions and conditions settings is large. Accordingly, the operability of the copying machine is improved over the conventional machine.

(II-4-D) Hard Control Panel

The hard control panel, as shown in FIGS. 20(a) and 20(b), is disposed on the right side of the color display panel, and is slightly bent toward the center. The control panel is provided with various buttons comprising ten keys, ten key clear, all clear, stop, interrupt, start, information, auditron, and language.

The ten key buttons are used to set the desired number of copies, enter codes and data, and enter a password when the tool is used. These buttons are invalid when a job occurs or is interrupted.

The all clear button is used to return all of the copy modes to their default value, and return the display to the basic copy display except when the tool display is opened. When an interrupt job is set, the copy mode returns to its default, but the interrupt mode is not removed.

The stop button is used to interrupt a job thus halting copy production once the paper still remaining in the copier is delivered outside the machine. In the diag. mode, the stop button is used to stop (interrupt) the input/output check.

The interrupt button is used to set up an interrupt mode during primary job execution when the job has not been interrupted, and returns control to the primary job when control is interrupted. When the interrupt button is depressed during execution of the primary job, the machine centers a reserve mode, and the job is either interrupted or ends when the copied paper is delivered outside the machine.

The start button is used to start a job or to restart an interrupted job. In the diag. mode, it is used to enter, save and start inputting and outputting codes and data. When the machine is preheating and the start button is depressed, the machine automatically starts when the preheating is complete.

The information button comprises an on button and an off button. These buttons are in a ready state except during the progressing of the copying operation. When the on button is operated, an information display for the display being currently presented appears. The off button is operated to remove the information display.

The auditron button is used to enter a password at the start of a job. The language button is used to select a desired language for the expressions in the display from among a plurality of languages. The hard control panel is also provided with LEDs for indicating operation of the respective buttons.

(II-5) FILM IMAGE READER

(II-5-A) Outline

The film image reader, as shown in FIG. 2, is composed of a film projector (F/P) 64 and a mirror unit (M/U) 65.

(a) Film Projector (F/P)

Figure 26:
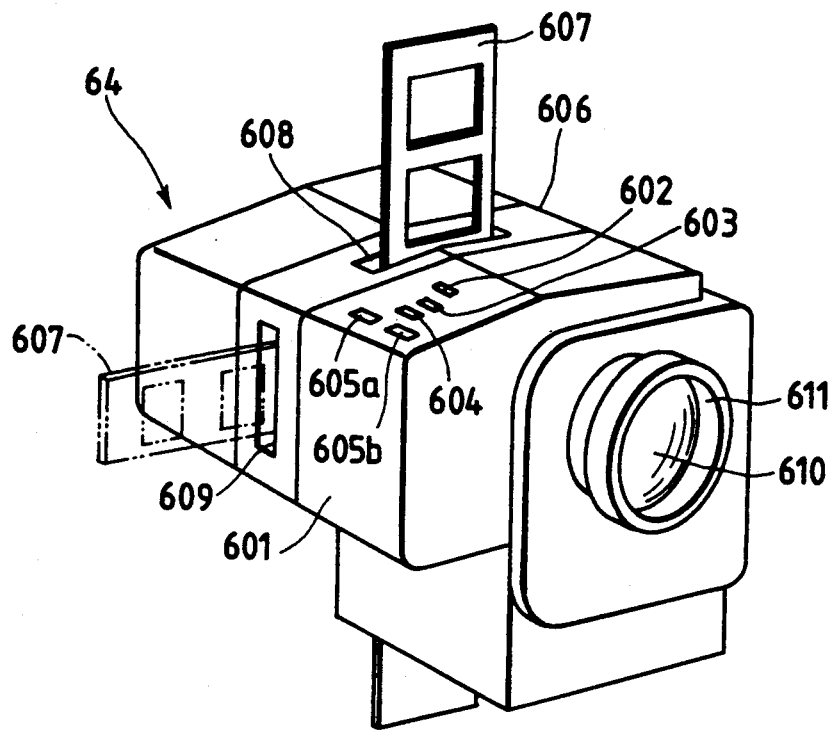
FIG. 26 shows a perspective view of an F/P.

As shown in FIG. 26, the F/P is provided with a housing 601. The housing 601 is further provided with an operation check lamp 602, manual lamp switch 603, auto focus/manual focus (AF/MF) select switch 604, and manual focus (M/F) operation switches 605a and 605b. The housing 601 is further provided with an open/close member 606. Slots 608 and 609 are formed in the upper surface and the sidewall of the open/close member 606. A film holder 607 holding an original film 633 is inserted into the housing 601 through either of these slots. During use, these slots are selectively used in accordance with the orientation of the image recorded in the film 633. Slots (not shown) are additionally formed in the bottom surface and the wall opposite to the above. Through these slots, the film holder 607 may be ejected. The open/close member 606 is hinged to the housing 601 or removably mounted to the housing 601. With the open/close member 606 thus mounted, foreign material entering the housing 601 may be removed by an operator.

In the present invention, two types of film holders are used, one for 35 mm negative film, and another for 35 mm positive film. The F/P 64 accepts both types of films as well as 6 cm×6 cm and 4"×5" negative films. The negative film is placed close between the M/U 65 and the platen glass 31.

Figure 29:
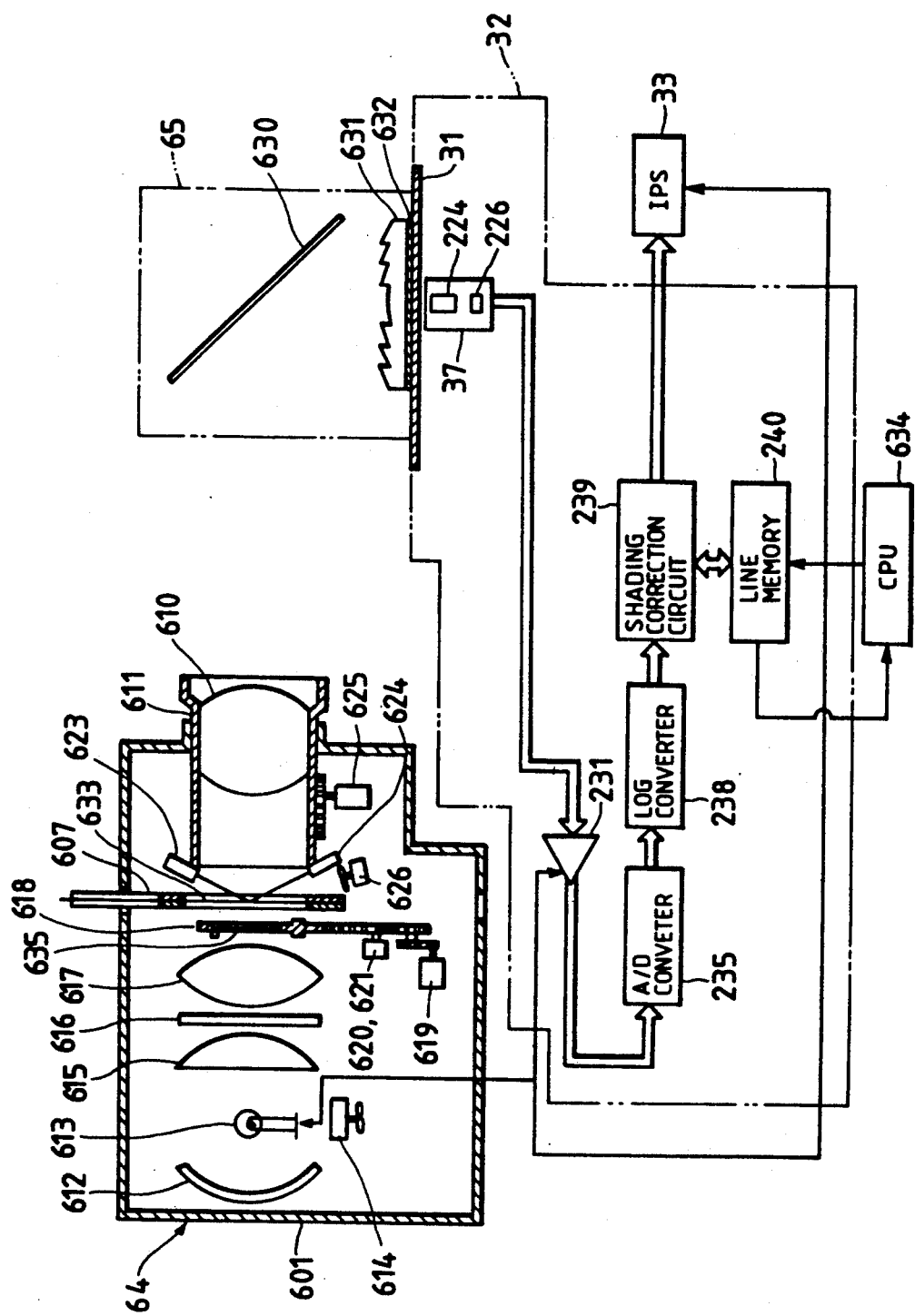
FIG. 29 shows a configuration of the F/P in connection with the F/P, M/U, and IIT.

As shown in FIG. 29, a lens holder 611 which holds a projection lens 610 is supported in the right portion of the housing 601 as viewed in the drawing.

Within the housing 601, a reflector 612 and a light source lamp 613, such as a halogen lamp, are aligned with the projection lens 610 with respect to an optical axis. A cooling fan 614 for cooling the lamp 612 is disposed near the lamp 613. An aspheric surface lens 615 for converging rays of light from the lamp 613, a heat wave absorbing filter 616 for cutting off the light of a predetermined wave length, and a convex lens 610 are disposed on the right side of the lamp 613 and are aligned with the same optical axis referenced above.

An auto exchanger for correction filtering is installed on the right side of the convex lens 617. The auto filter exchange includes a correction filter holder 618, motor 619, first and second position sensors 620 and 621, and controller (not shown, but housed in the F/P 64). The filter holder 618 holds a correction filter 635 for correcting the film density of the 35 mm negative film and the positive film. The correction filter illustrated in FIG. 29 depicts one of the two types of films mentioned above. Finally, the motor 619 drives the filter holder 618.

The first and second position sensors 620 and 621 are for detecting angular displacements of the filter holder 618. During use, a correction filter corresponding to the original film 633 is automatically selected from other filters contained in the filter holder 618, and is aligned with the projection lens 610 and other lenses with respect to the optical axis. The auto filter exchanger 635 may be located in any place other than the above as long as it lies on the optical axis of the projection light, for example between the platen glass 31 and the imaging unit 37.

An auto focus device comprising a light emitting means 623 such as a photo diode and a photo sensor 624 that operate in connection with the lens holder 611, and a motor 625 for sliding the lens holder 611 of the projection lens 610 with respect to the housing 601 is also installed. When the film holder 607 is inserted through the slot 608 or 609 and into the housing 601, the original film 633 contained in the film holder 607 is positioned between the filter holder 618 and the paired photo diode 623 and photo sensor 624. A fan 626 for cooling the original film 633 is located near the place where the original film 635 is set.

A power supply for the F/P 64 is different from the power supply for the base machine 30, but may be installed within the base machine 30.

(b) Mirror Unit (M/U)

Figure 27:
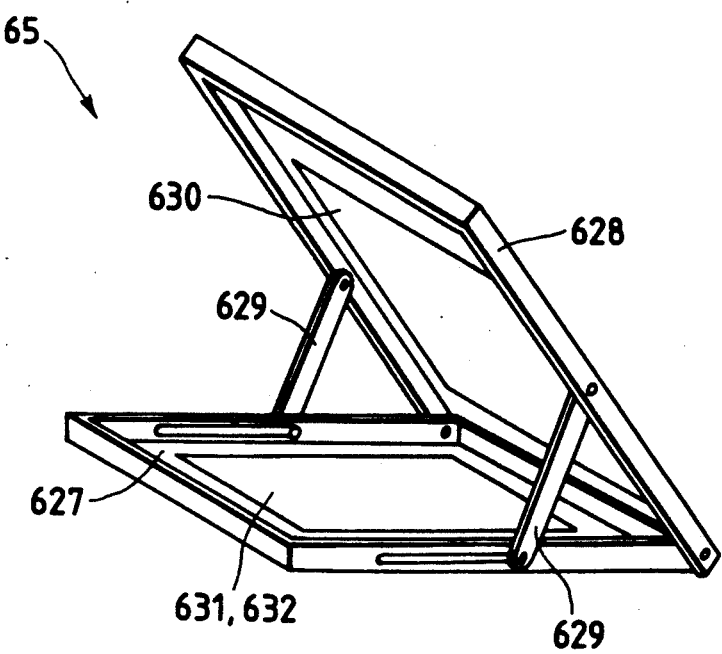
FIG. 27 shows a perspective view of an M/U.

As shown in FIG. 27, the mirror unit (M/U) 65 is made up of a bottom plate 627 and a cover 628 mounted at one end of the bottom plate 627 such that it can swing. Supports 629 are coupled between the bottom plate 627 and the cover 628. The supports 629 support the cover 628 when left open at a 45° angle with respect to the bottom plate 627 when the bottom plate is fully opened.

A mirror 630 is mounted to the rear side of the cover 628. The bottom plate 627 has a large opening which is filled with a fresnel lens 631 and a diffusion plate 632.

As best illustrated in FIG. 29, the fresnel lens 631 and the diffusion plate 632 are formed by a single acrylic plate. The top surface of the acrylic plate constitutes the fresnel lens 631, and the bottom surface constitutes the diffusion plate 632. The fresnel lens 631 converts the light reflected from the mirror 630, that would otherwise be spread out, into parallel rays of light in order to prevent the peripheral portion of an image from being darkened. The diffusion plate 632 minutely diffuses the parallel rays of light to the extent that it prevents the line sensor 226 from detecting a shadow of the selfoc lens 224 within the imaging unit 37.

When color copying which uses the F/P 64 is not selected, the mirror unit 65 is folded and stored in a storage place. During use, it is opened and placed at a predetermined location on the platen glass 31 of the base machine 30.

(II-5-B) Major Functions

The major functions of the film image reader are as follows:

(a) Auto Exchange of Correction Filter

A halogen lamp is generally used as the light source lamp 613 of the F/P 64 because it contains more red (R) light than blue (B). When the light emitted from the halogen lamp projects an image on a film, the ratio of red (R), green (G) and blue (B) light is influenced by the spectral characteristic of the lamp. Therefore, the spectral characteristic of the halogen lamp must be corrected.

A variety of film recording images exist, such as negative films and positive films. The negative and positive films per se each consist of many types of films each having their own spectral characteristics. For example, in the case of the negative film, the transmittance of R is high and the transmittance of B is low. Therefore, when negative film is used, the spectral characteristics of the lamp must be corrected accordingly to increase the amount of blue light.

The F/P 64 is provided with a correction filter for performing such a correction of the spectral characteristic of the lamp. In the F/P 64, these correction filters are automatically exchanged by the auto filter exchange previously discussed. More specifically, a microprocessor (CPU) in the system (SYS) issues a 2-bit command signal which sets a correction filter, corresponding to the original film 633, at a predetermined position. In response, the controller drives the motor 619 so that 2-bit signals derived from the first and second position sensors 620 and 621 coincide with the 2-bit command signal from the CPU. When these signals are coincident, the controller stops the motor 619 and the correction filter corresponding to the original film is automatically set at a predetermined position. In this manner, the correction filter can be exchanged readily and exactly.

(b) Original Film Inserting Direction Detection

The original film 633 may be inserted into the housing through either slot 608 or 609. Therefore, in accordance with the orientation of the image of the film, the film may be inserted into the housing vertically or horizontally. In this case, at least one of the slots 608 and 609 is provided with a film detecting switch so that at least one film detecting switch is provided. If the slot 608 has the film detecting switch, the film holder 607 is inserted through the hole 608, the switch is turned on and produces a detect signal. When the detect signal is present, a necessary area of the line sensor 226 is vertical, that is, the scanning direction is set to be coincident with the longitudinal direction of the projection image. When the film holder 607 is inserted through the slot 609, the switch is in off state and no detect signal is produced.

When the detect signal is absent, the necessary area is lateral, i.e., the main scan direction is set to be in the longitudinal direction of the projection image.

Also, when the film detect switch is provided either in the slot 609 alone, or in both the slots 608 and 609, the necessary area of the line sensor 226 is set so that the vertical scan direction is in the longitudinal direction of the projection image when the film holder 607 is inserted through the slot 608. When the film holder 607 is inserted through the slot 609, the necessary area of the line sensor 226 is set so that the main scan direction is in the longitudinal direction of the projection image. That is, the on and off signals of the film detect switch are set so as to set up the above operations.

(c) Auto Focus (AF) Function

When the film holder 607 is set to the F/P 64, the original film 633 must be positioned with several tens mm precision. Therefore, after the original film 633 is set, a focusing operation is required. To manually focus, an image of the original film 633 is projected onto the diffusion plate 632 of the M/U 65 and an operator slides the projection lens holder 611 for focusing while viewing the projection image. In this case, however, the image projected onto the diffusion plate 632 is hard to see and therefore exact focusing cannot be attained.

To cope with this problem, the F/P 64 is arranged so as to automatically focus the projection image when it is set to the F/P 64.

The AF function is exercised by the AF in the following manner. A related key on the display of the U/I 36 is operated to set up the F/P mode. The photo diode 623 emits light. In FIG. 26, the AF/MF select switch 604 is set to the AF side and the AF is ready for operation. As shown in FIG. 29, when the film holder 607 containing the original film 633 is set, the light from the photo diode 623 reflects at the original film 633. The reflected light is detected by the photo sensor 624 of the two element type, for example, for the AF purposes.

The two elements of the photo sensor 624 produce signals corresponding to the amount of reflected light, and apply them to a CPU 634. The CPU 634 calculates the difference between these signals. When the difference is not 0, the CPU produces a signal and drives the motor 625 in a direction resulting in a reduction of the difference. With the rotation of the motor, the projection lens holder 611 slides, and with the sliding of the lends holder, the photo diode 623 and the photo sensor 624 both move. When the difference between the signals of the sensors is reduced to 0, the image is in focus and the CPU 634 stops the motor 625.

As seen from the above description, when the film holder containing the original film is loaded into the F/P 64, focusing is automatically carried out without the assistance of any manual operation. Consequently, the focusing operation is trouble free and improperly focused copies are avoided.

(d) Manual Focusing (MA) Function

To exercise the manual focusing function, the AF/MF select switch 604 is set to the MF side, and the lamp 613 automatically lights up for a predetermined period of time, to set up an MF mode. In this mode, an operator operates the switches 605a and 605b while observing the projection image on the diffusion plate 632. Through the MF, the film image is focused at a specific portion.

(e) Manual Turn-On of Light Source Lamp

When a manual lamp switch 603 is pushed, the lamp 613 is turned on. The switch is not used in normal mode, but is used for back lighting to copy an image recorded on a relatively thick original including paper, films, and the like, to view a projection image for a long period of time in the AF mode, and to check if the lamp is working.

(f) Automatic Changing of Magnification and Scan Area

The instant copying machine is arranged so that by setting the paper size by the U/I 36, an optimum paper size is automatically selected. Additionally, when the kind of film used is selected by the U/I 36, a copy area is automatically selected in accordance with the kind of film.

(g) Automatic Shading Correction

The ROM of the CPU 634 contains prestored density data of the ASA 100 orange mask of each of the negative films produced by FUJI (trade mark), KODAK (trade mark) and KONICA (trade mark). When one of these films is selected, the CPU 634 automatically makes the shading correction based on the density data stored in the ROM. Therefore, there is no need for loading the base film of that film into the F/0 64. Further, density data of the orange mask of film other than the above three types of films can be recorded and stored into the copying machine system RAM.

(h) Automatic Image Quality Adjustment

Corrections such as gamma ($\Gamma$) corrections are performed on the basis of various conditions such as the density characteristic of the original film and exposure conditions at the time of film-recording. Density control and color balance adjustments are automatically carried out.

(II-5-C) Image Processing

(a) Need and Principle of Image Signal Correction

Generally, the image density range of a film is broader than that of a document and differs with the type of film. For example, the density range of positive film is broader than that of negative film. Further, the density range of film depends on film-recording conditions such as the amount of exposure light, density of the object to be photographed, and brightness at the time of photographing. Actually, the density of the object is broadly distributed over the entire density range of the film.

When the image recorded in the film with the above density characteristics is copied by a copying machine using the light reflected from the image on the film, assuming it undergoes the same signal processing as used during ordinary document copying, the reproduced image is unsatisfactory in quality. To cope with this, correction is applied to the read image signal so as to obtain proper densities for major objects.

Figure 28:
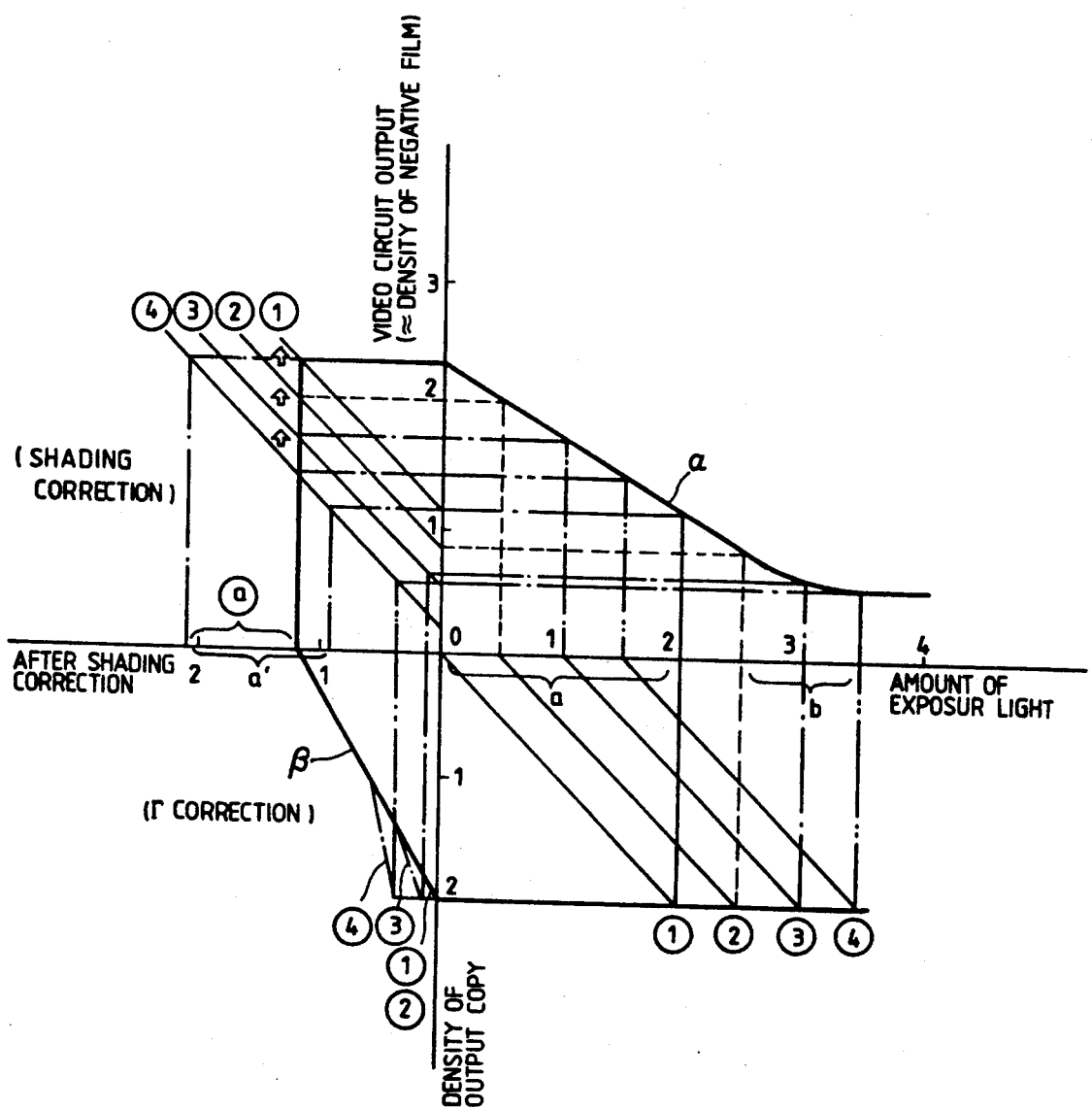
FIG. 28 is a graph showing a density characteristic of a negative film and the principle of correction.

FIG. 28 graphically illustrates the density characteristic of negative film and the principle of its density correction. In the figure, the right half of the abscissa represents the amount of exposure light applied to the object (corresponding to a density of the object), and the left half represents density after the shading correction. The upper half of the ordinate shows video circuit output (approximately equal to the density of negative film), and the lower half of the ordinate shows the density of the output copy. Thus, the first quadrant shows the density characteristic of a negative film, the second quadrant shows shading correction, the third quadrant shows gamma ($\Gamma$) correction, and the fourth quadrant shows the relationship between exposure light amount and density of an output copy.

The density characteristic of the negative film is represented by a line "$a$" as shown in the first quadrant in FIG. 28. When the amount of exposure light from the object is large, the density of the negative film is large. As the amount of exposure light becomes small, the density of the negative film becomes linearly small. When the amount of exposure light from the object decreases to or below prescribed a value, the linear relationship between the exposure light amount and the density of the negative film ceases. When the exposure light amount is small, contrast problems are created, and, for example, the contrast of the face and hair is lost. Also, when the exposure amount is large, if the inclination of the line "$a$", viz. the gamma ($\Gamma$) value is less than 1, and correction is not made, the resultant copy is soft. It is for this reason that gamma ($\Gamma$) correction is needed.

The principle of gamma ($\Gamma$) correction will be described with reference to FIG. 28. As shown, an END curve "$\beta$" is present in the third quadrant. An inclination gamma ($\Gamma'$) of the END curve "$\beta$" is selected to be $\Gamma' = 1/\Gamma$ in order that the relationship between the amount of exposure light from an object to be copied and the output copy density be expressed by a straight line inclined at 45°.

It is now assumed that in the region "$a$" where the amount of exposure light is relatively large, a density adjustment value set in the register of the shading correction circuit is expressed by a straight line (4). In this case, the density after shading correction lies in the region "$a'$". which is out of the conversion region by the END curve "$\beta$". Therefore, a portion of the reproduced image corresponding to this region is smeared with white. To avoid this, the straight line (4), representative of the density adjusting value, is shifted to the straight line (1) so that the density after the shading correction falls within the conversion range by the END curve. If the density adjusting value is so set, the relationship between the amount of exposure light and the output copy density traces the straight line (1) in the fourth quadrant. The copied image has a gradational density. In a region "b" where the exposure light amount is relatively small, the relationship between the amount of exposure light and the negative film density loses its linearity. In this case, the density adjusting value of the shading correction circuit is changed to the straight line (4) in the second quadrant. When the exposure light amount lies in the region "b", and an image of a person with black hair and wearing a brown hat is copied, the densities of the hair and the hat are substantially the same, and there is a good contrast between the hair and the hat in the resultant copied image.

(b) Method of Image Signal Processing

As shown in FIG. 29, the line sensor 226 reads the projected light of an image on the document film 633 by sensing the amounts of color lights of R, G, and B, and produces representative analog signals of each color component. The analog image signals representing the amounts of each color component are amplified by an amplifier 231 to prescribed levels. Next, the amplified image signals are digitized by an A/D converter 235. The digital signals indicative of the amount of each color component are then converted by a log converter 238 into signals which are indicative of the color component densities.

The density image signals are subjected to shading correction by the shading correction circuit 239 which removes from the image the nonuniform light of the selfoc lens, and any adverse effects due to the variance of the sensitivities of the pixels of the line sensor 226, variances of the spectral characteristics and light amounts of the correction filters and the lamps 613, and aging.

Before shading correction, reference data is stored into the line memory 240. To effect this, when a document film is selected from among the three types of films and the registered films, the related correction filter is selected and set to the positive film filter and the copying machine is operated with the original film 633 not being set. Under this condition, the amount of light from the lamp 613 is read, amplified, digitized, and converted into a density signal. The data based on the density signal thus obtained is stored in the line memory 240 as reference data. More specifically, the imaging unit 37 is step scanned 32 lines for each pixel of R, G and B. The sampled data is transferred through the line memory 240 to the CPU 634. The CPU 634 produces an average density of 32 lines of the sampling data through its calculation. In this way, the shading data is obtained. The averaging of the sampling data eliminates the error for each pixel.

Then, the original film is set, and the image of the original film is read. The CPU 634 calculates a density adjusting value DADj by using the density data of the film read from the ROM, and replaces the DADj value in the register of the LSI in the shading correction circuit 239. Further, the CPU 634 adjusts the amount of light of the lamp 613 and the gain of the amplifier 643 in accordance with the selected film.

The shading correction circuit 239 adds the DADj value to the actual data obtained by reading the original film, and shifts the read value. The shading circuit 239 subtracts the shading data of each pixel from the adjusted data to effect shading correction.

For copying films that are not stored in the ROM of the CPU 634 and in the RAM of the system, a base film is set to collect the density data of the film, and a DADj value must be calculated on the basis of the collected density data.

After shading correction, the IIT 32 transmits density signals of R, G, and B to the IPS 33.

The CPU 634 selects the END curve on the basis of the actual data of the original film, and produces a correction signal for the gamma ($\Gamma$) correction on the basis of the selected curve. The IPS 33 exercises the gamma ($\Gamma$) correction to remove the poor contract problem due to the nonlinear characteristic and the fact that the gamma ($\Gamma$) of the original film is not 1.

(II-5-D) Operation Procedure and Signal Timing

Figure 30:
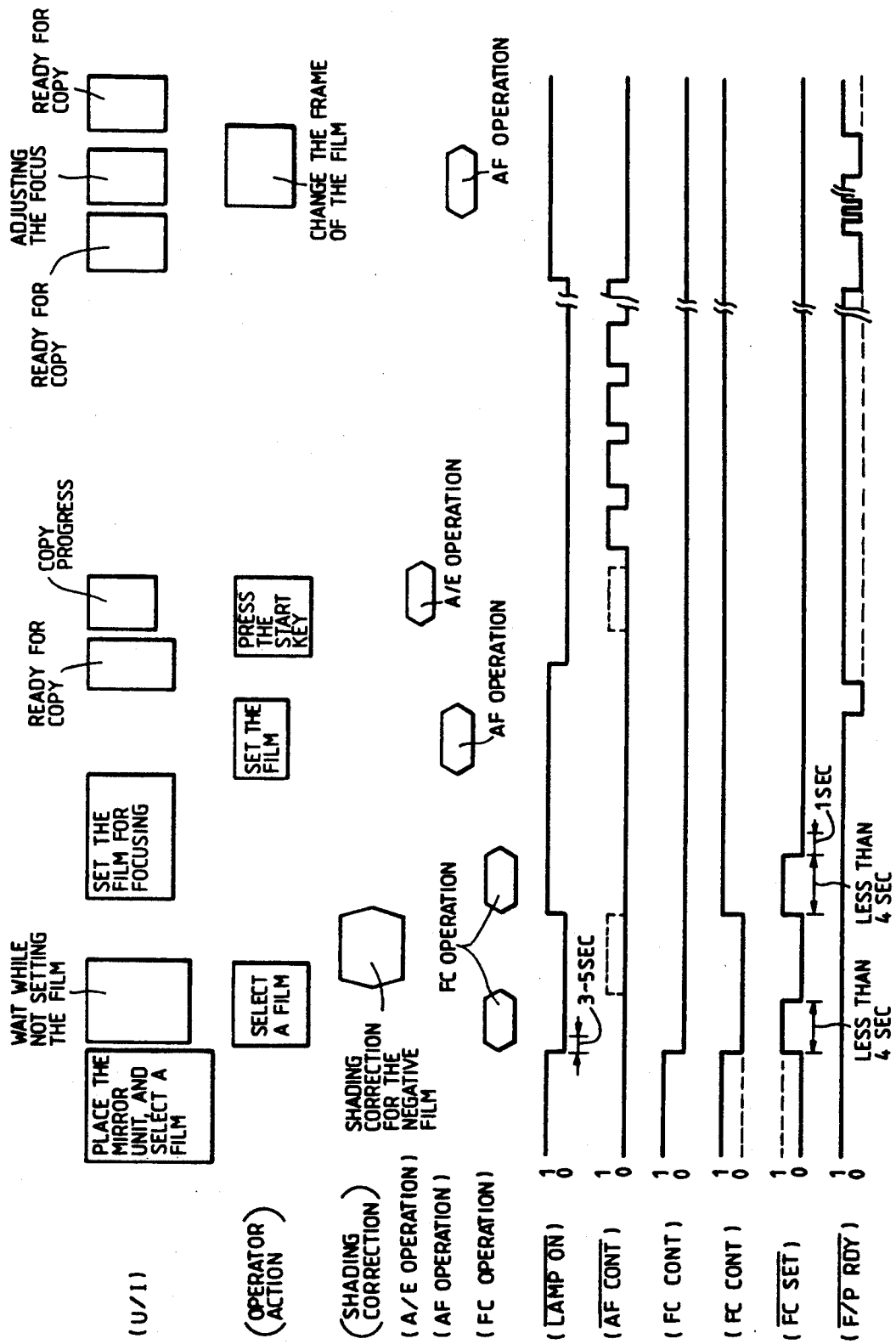
FIG. 30 shows an operation procedure and a timing chart of the operation.

The operation procedure and signal timing will be described with reference to FIG. 30. In the figure, broken lines indicate signals that may be used.

The operation of the F/P 64 is executed by the U/I 36 of the base machine 30. Specifically, by operating the F/P operation key displayed on the U/I display, the base machine 30 is placed into the F/P mode. It is assumed that the original film is any of the three types of films and the registered films previously referenced. As shown in FIG. 30, the display of the U/I 36 presents a message "Place the mirror unit, and select your film". After seeing this, an operator opens the M/U 65, and sets it at a position preset for use on the platen glass 31.

When the film select key is touched, a message "Wait while not placing the film" is displayed. At the same time, the lamp 613 lights up, and the correction filter control (FC CONT) signal becomes (0, 0), and the FC operation starts. More specifically, the auto filter exchanger operates to set the positive correction filter at a preset position. When the correction filter is set, a correction filter exchange end signal ($\overline{\text{FC SET}}$) goes LOW.

When the $\overline{\text{FC SET}}$ signal goes LOW and 3 to 5 seconds have elapsed from the lighting of the lamp 613, the shading data collection starts for shading correction. After the shading data collection ends, the FC SET signal goes (0, 1) in logical state, and the auto filter exchanger starts to operate and set the film correction filter at the preset position. Upon triggering of the shading correction, the display presents the message "Set a film for focusing". At this time, the lamp 613 is off. After seeing this message, the operator loads the film holder 607 containing the document film 633 into the F/P 64. The light from the photo diode 623 is reflected by the film, and the reflected light is received by the photo sensor 624.

When the difference between the amount of light received by the two elements of the photo sensor 624 is not 0, the motor 625 of the AF unit operates for focusing, i.e., the AF operation is performed. After the focusing operation, an F/P ready (F/P RDY) signal goes LOW.

Following this, the FC SET signal goes LOW, and after one minute, the display presents the message "Ready for copy". When the start key of the U/I 36 is pushed, the display gives the message "Copy progresses". The lamp 613 turns on, and, after the lamp stabilizes, data for the auto density adjustment is collected. Specifically, the imaging unit 37 scans the film one time to read a part or the entire projection image, for density adjustment, color balance adjustment, and gamma ($\Gamma$) correction.

In the full color mode, the imaging unit scans the film four times. In this case, the shading correction and the density adjustment are carried out on the basis of the shading data and the automatic density adjustment data. When the copy operation ends, the lamp 613 is off and the message "Ready for Copy" is displayed. Accordingly, a new copy may be made by operating the start key. To copy another image, another frame of the film is set. When the frame of the film is changed, the F/P RDY signal goes HIGH, and the display gives the message "Adjust the focus". When the new frame is set, the AF operation is performed. At the same time, the signal F/P RDY goes LOW, and the message "Ready for copy" is displayed. The start key may then be pushed to re start the copying operation.

(III) IMAGE INPUT TERMINAL (IIT)

(III-1) Image Unit Drive Mechanism

Figure 31:
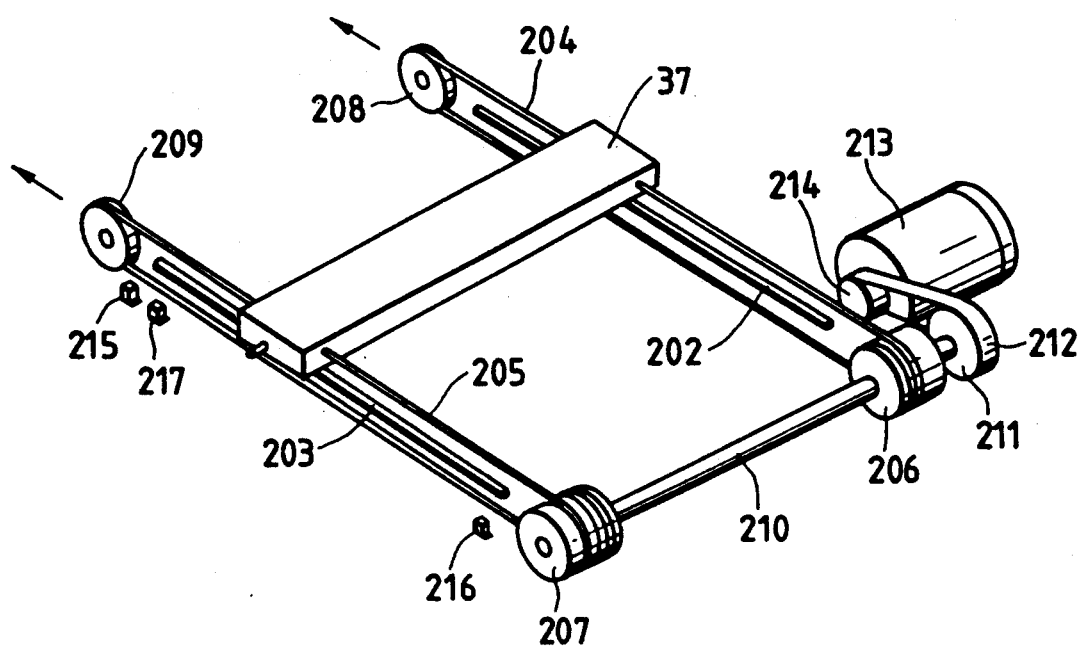
FIG. 31 is a perspective view showing an original scanning mechanism.
Figure 32:
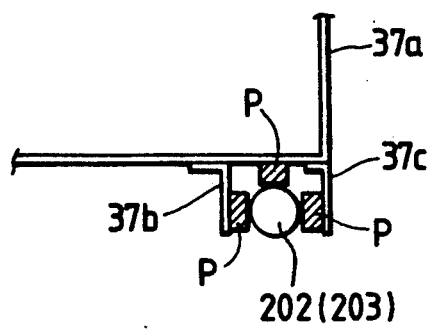
FIG. 32 is a sectional view of a major portion of FIG. 31.

FIG. 31 shows an image unit drive mechanism used in the color copying machine according to the present invention. The imaging unit 37 is removably placed on a pair of slide shafts 202 and 203, and is fixed at both ends to wires 204 and 205. These wires 204 and 205 are wound around drive pulleys 206 and 207 and tension pulleys 208 and 209, respectively. The tension pulleys 208 and 209 are pulled in the direction indicated by the arrows. The paired drive pulleys 206 and 207, and a reduction pulley 211 are mounted to a drive shaft 210, as shown. Limit switches 215 and 216 are sensors for sensing both ends of the imaging unit 37 when it is moved. A registration sensor 217 senses a document read start position.

To make a color copy sheet, the IIT must repeat the scan four times. It is significant to reduce an out-of-synchronization state of the scan and a displacement from the document read start position. To reduce the out-of-synchronization and displacement, it is necessary to minimize the fluctuation of the imaging unit 37 stop position, the fluctuation of the time needed for the imaging unit to travel from the home position to the registration position, and the fluctuation of the scan speed. To this end, a stepping motor 213 is used even though a stepping motor suffers from more vibration and noise than a servo motor. Therefore, many countermeasures have been taken to realize high picture quality and high speed.

(III-2) Control System for the Stepping Motor

Figure 33A:
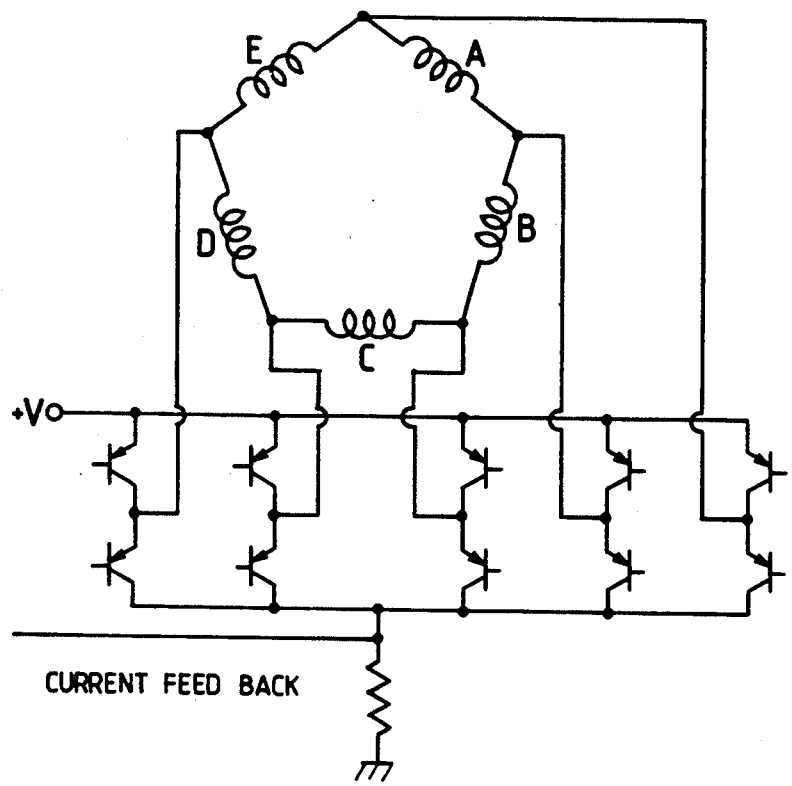
FIG. 33(a) shows a circuit arrangement of a drive circuit of a stepping motor.
Figure 33B:
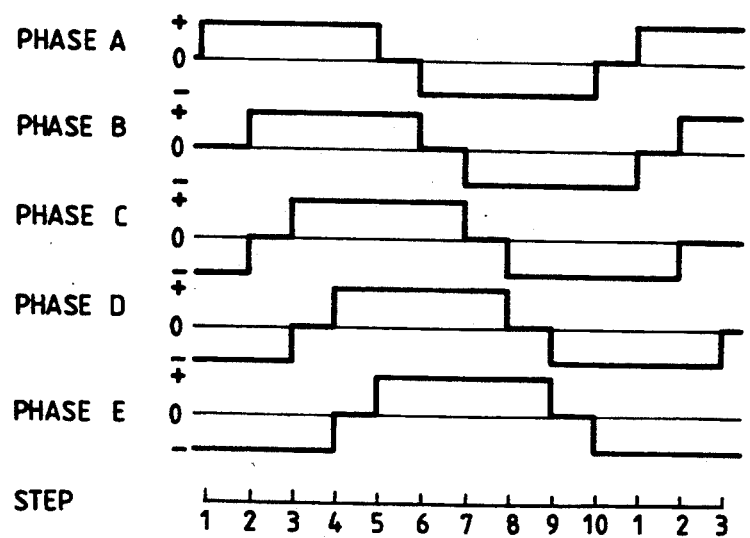
FIG. 33(b) shows an exciting sequence.

As shown in FIG. 33(a), a stepping motor 213 drive circuit is arranged such that the motor winding is wired in a pentagon fashion, its connection points are connected through pairs of transistors to the positive and the negative terminals of a power supply, and the motor is driven in a bipolar mode using ten transistors. The motor current is fed back to smooth current variation and hence to reduce vibration and noise. In the existing sequence, as shown in FIG. 33(b), when the four phases are excited, the one remaining phase is set at a positive or negative equal potential.

Figure 34A:
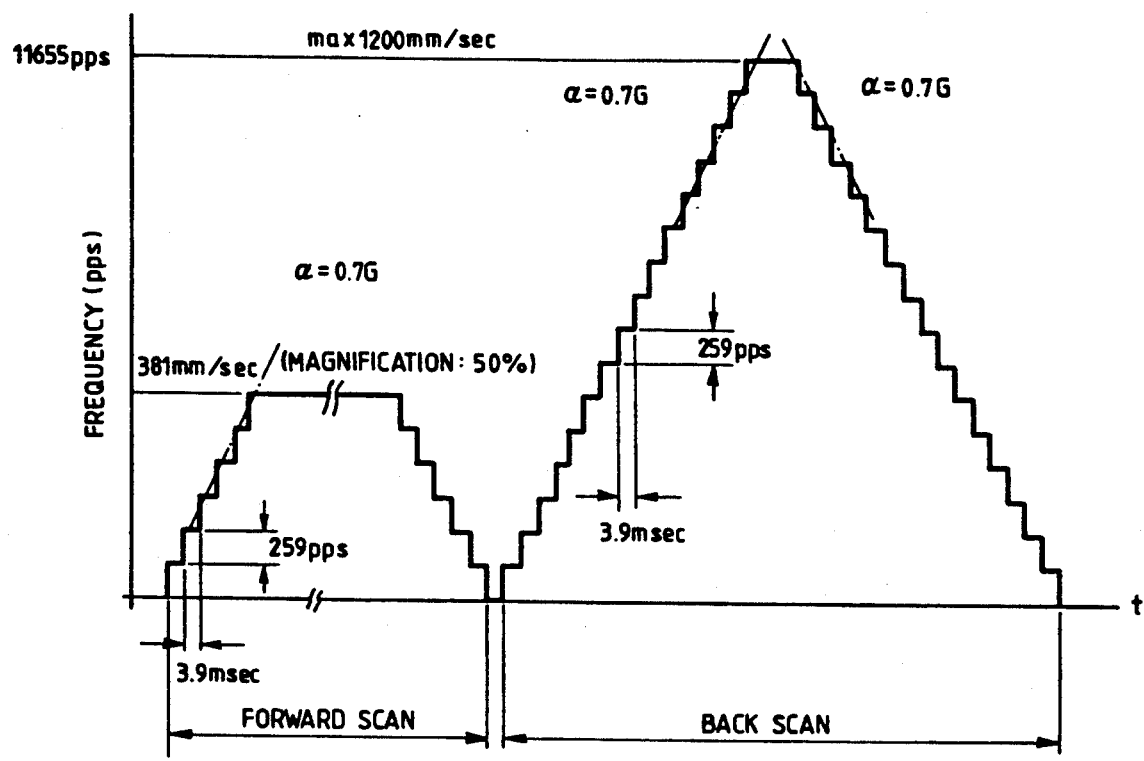
FIGS. 34(a) and 34(b) are diagrams for explaining a scan cycle by the imaging unit.
Figure 34B:
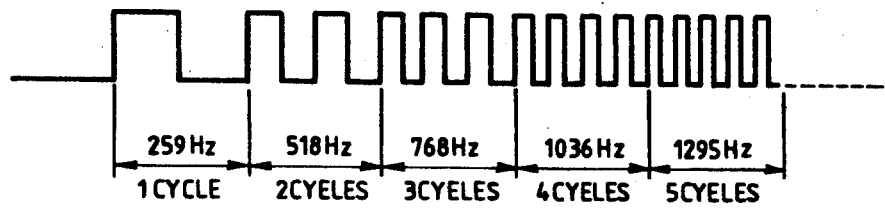

FIG. 34(a) shows a scan cycle of the imaging unit 37 driven by the stepping motor 213. More specifically, the figure shows the relationship between the speed of the imaging unit 37, i.e., the frequency of a signal applied to the stepping motor and time, when the imaging unit executes a forward scan and a backward scan at the 50% magnification, or the maximum speed. In an acceleration mode, as shown in FIG. 34(b), the frequency is increased to approximately 11 to 12 kHz in steps of 259 Hz. Putting a rule into a train of pulses makes pulse generation easy. A trapezoidal profile of speed variation is realized by increasing the signal frequency at a rate of 259 pps/3.9 ms as shown in FIG. 34(b). A rest period is provided between the forward scan and the back scan wherein vibration in the IIT mechanism system settles down, and the synchronization of the imaging unit operation with the image outputting in the IOT is secured. An acceleration of 0.7G in this instance is higher than that of the conventional copier and reduces the scan cycle time.

Figure 35A:
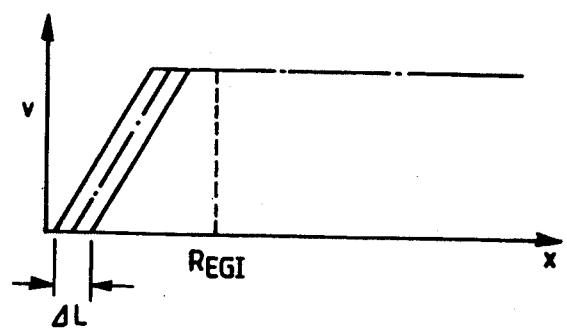
FIGS. 35(a) through 35(c) are explanatory diagrams for explaining the cause of the color displacement in the color copy.
Figure 35B:
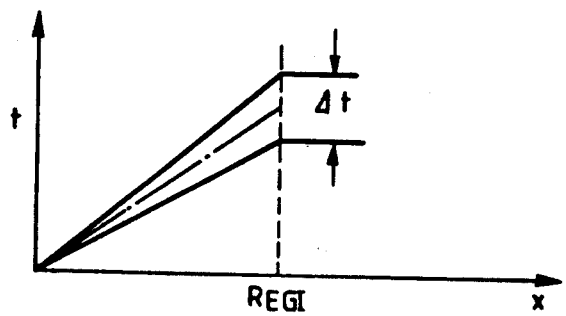
Figure 35C:
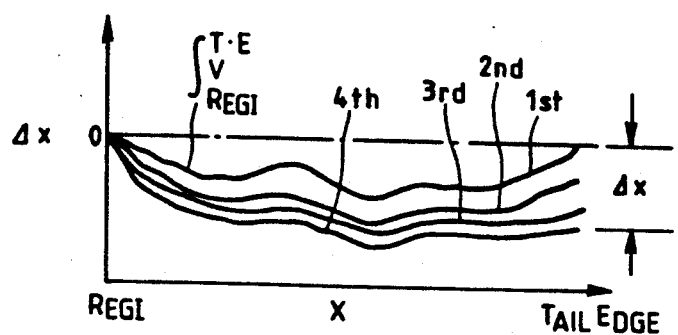

As previously mentioned, in the color document reading, it matters how the displacement from the home position during the four scans is reduced, and consequently, how color displacement and image distortion are reduced. FIGS. 35(a) to 35(c) explain the causes of color displacement. FIG. 35(a) shows how the imaging unit after scanning comes to a standstill at a position different from the home position. Accordingly, in the next scan, the time taken for the imaging unit to reach the registration position various from that of the previous scan. This results in color displacement.

In the case of FIG. 35(b), when there is transient vibration of the stepping motor, i.e., speed fluctuation until the motor speed settles down at a steady speed, during the 4-scan period, the time taken for the imaging unit to reach the registration position varies from the predetermined time resulting in color displacement. FIG. 35(c) shows different variations of the constant speed scan characteristic of the imaging unit between the registration position and the tail edge when the imaging unit is moved for scanning four times. As seen, the speed of the imaging unit of the first scan greatly varies with that of the imaging unit of the second, third, and fourth scans. For this reason, the color copier of the present invention is designed such that the toner color Y, of which displacement is indistinctive, is developed for the first scan. Other causes for color displacement include aging of the timing belt 212 and wires 204 and 205, and various mechanical factors such as viscosity drag between the slide pad and slide rails 202 and 203.

(III-3) IIT Control System

The IIT remote has many functions including sequence control for various copy operations, service support, self check, and fail safe. The sequence control of the IIT generally comprises a scan, sample scan, and initialize controls. Various commands and parameters for controlling the IIT come from the SYS remote 71 through the serial communication network.

Figure 36A:
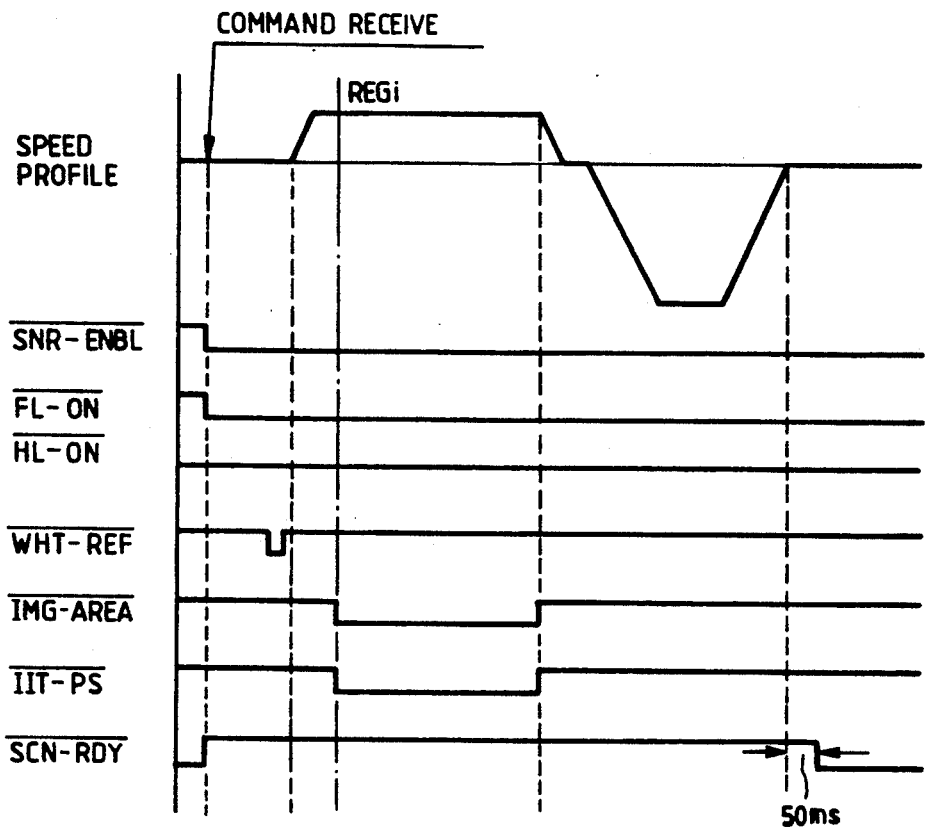
FIGS. 36 through 36(c) are timing charts for explaining the IIT control modes.

FIG. 36(a) shows a timing chart of a normal scan operation. The scan length data is determined by the paper length and magnification, and is exactly 0 to 432 mm (with the steps of 1 mm). The scan speed depends on the magnification (50% to 400%). The prescan length data; i.e., distance between the stop position and the registration position, also depends on the magnification (50% to 400%). When receiving a scan command, the IIT remote produces an FL-ON signal to light a fluorescent lamp. The ITT also turns on a motor driver via a SCN-RDY signal. After a preset time, it produces a shading correction pulse WHT-REF which causes the imaging unit to start the scanning operation. When the imaging unit passes the registration sensor, an image area signal IMG-AREA goes low for a period of time corresponding to the scan length. In synchronism with this, the IIT-PS signal is outputted to the IPS.

Figure 36B:
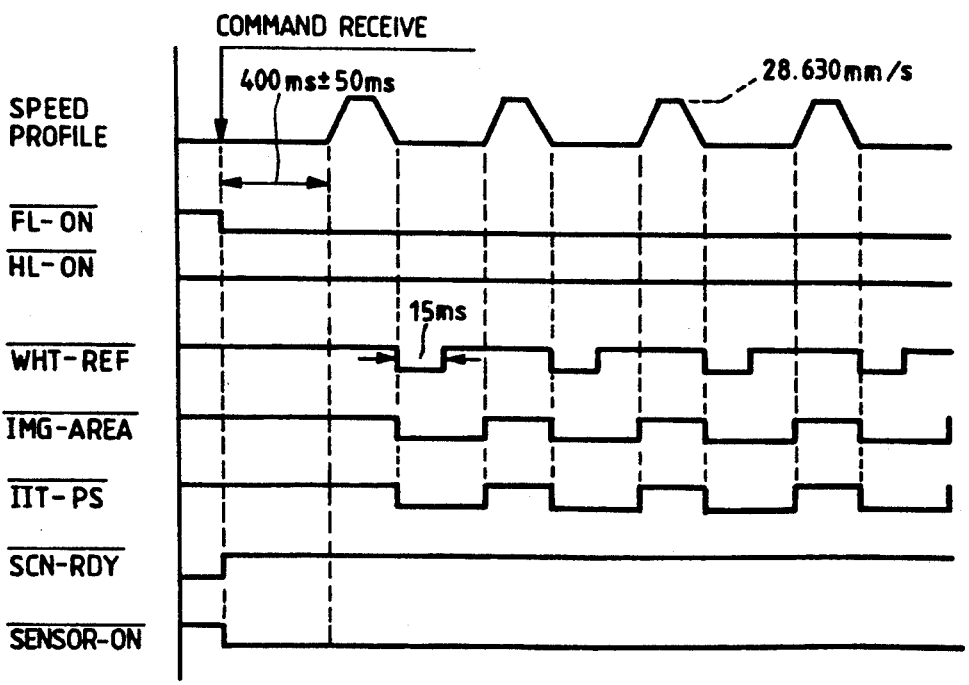

FIG. 36(b) shows a timing chart of the sample scan operation. The sample scan is used for color detection at the time of color change, color balance correction when the F/P is used, and shading correction. In the sample scan, the imaging unit is moved to a preset sample position where it temporarily stops, or repeats a fine motion several times and then stops, depending on the stop position data from the registration position, moving speed, number of fine motions, and step intervals.

Figure 36C:
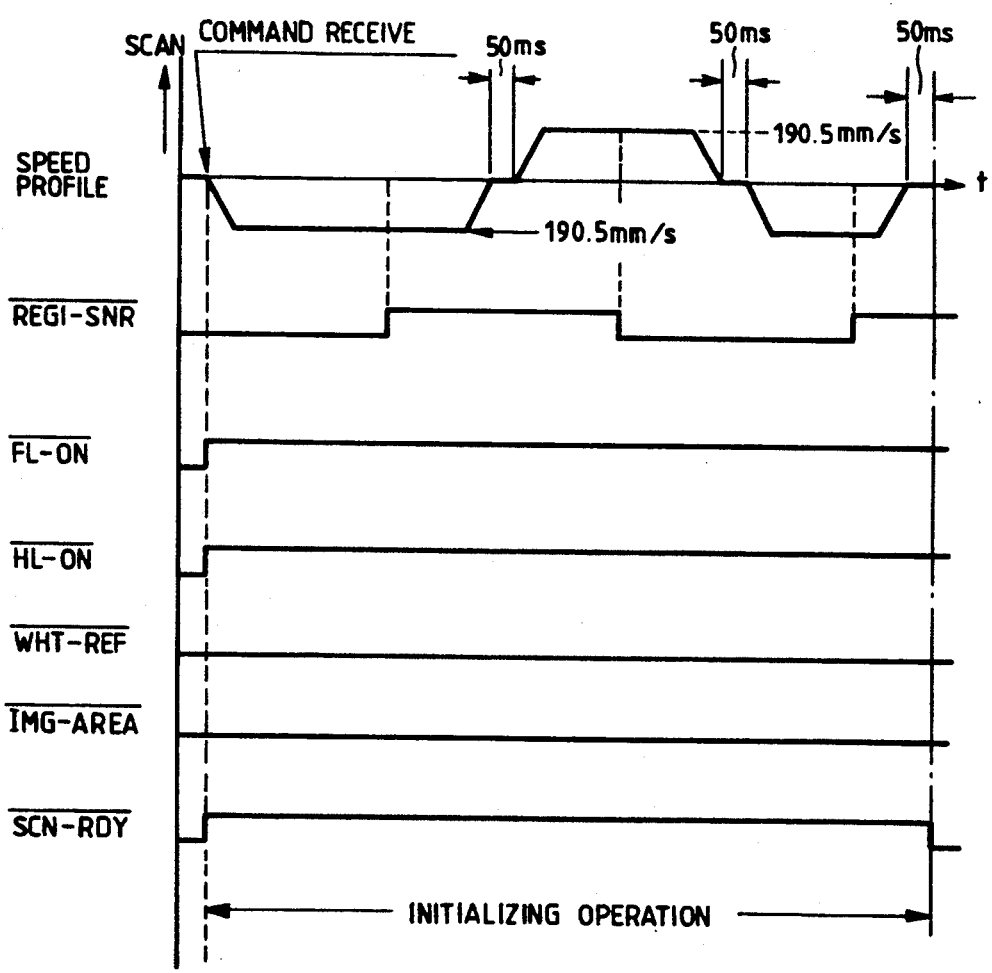

FIG. 36(c) shows a timing chart of the initialize operation. At the time of power on, the IIT remote receives a command from the SYS remote, checks the registration sensor, checks the imaging unit operation by the registration sensor, and corrects the home position of the imaging unit by the registration sensor.

(III-4) Imaging Unit

Figure 37:
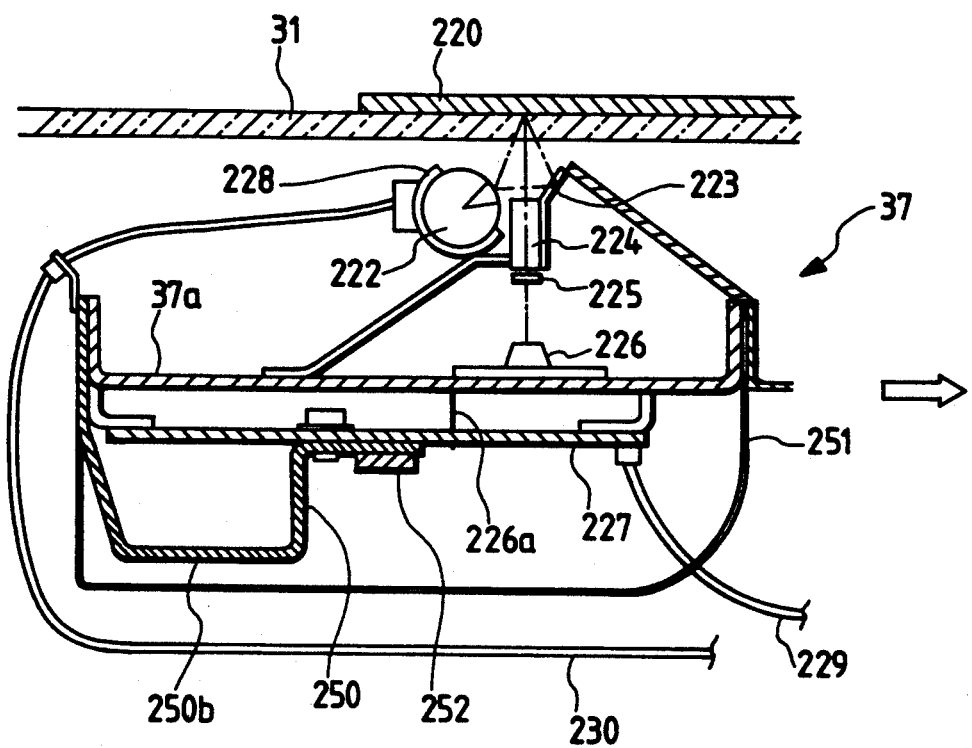
FIG. 37 is a sectional view showing an imaging unit.

FIG. 37 shows a sectional view of the imaging unit 37. An original 220 is set on the platen glass 31 with its image surface facing down. The imaging unit 37 moves under the platen glass in the direction indicated by the arrow. Throughout the movement of the imaging unit, the image surface of the original placed on the platen glass is illuminated with the combination of the 30W daylight fluorescent lamp 222 and a reflecting mirror 223. The light reflected from the original 220 passes through a selfoc lens 224 and a cyan filter 225 and forms a normal equal-size image on the light receiving surface of a CCD sensor array 226. The selfoc lens 224 is a compound eye lens comprising four rows of fiber lens. This lens is bright and has a high resolution. Use of this lens is also advantageous because power consumption of the light source is reduced allowing for a more compact imaging unit. The imaging unit 37 is provided with a circuit board 227 comprising a CCD line sensor drive circuit, CCD line sensor output buffer circuit, and the like. A lamp heater 228 is provided as a flexible cable 229 for the illumination power-source 230 A circuit board 227 lies under a base member 37a fixedly coupled with the line sensor board 226. The radiating plate 250 with convex region 250b is connected to the circuit board 227. A punching metal 251, provided as a magnetic shield, covers the radiating plate 250. An IC 252 for the driver is mounted on the circuit board 227. A connection pin 227a mechanically and electrically couples the line sensor 226 with the circuit board 227.

Figure 38:
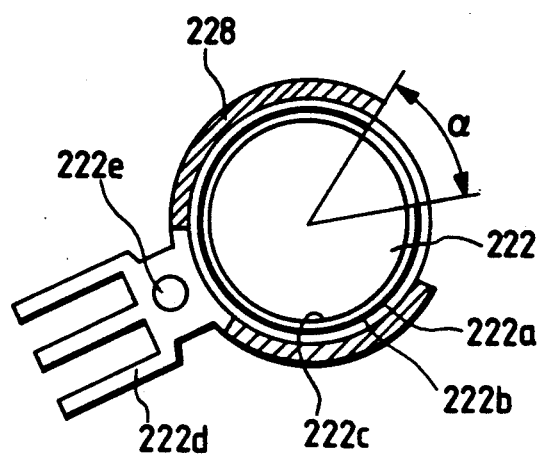
FIG. 38 is a sectional view of a fluorescent lamp.

FIG. 38 illustrates the details of the fluorescent lamp 222. A reflecting film 222b is formed over the inner surface of a glass tube 222a except the surface portion as defined by an aperture angle "α" of about 50°. A fluorescent film 222c further lies on the surface of the reflecting film. With this lamp structure, the light of the lamp 22 can be effectively projected onto the original while electric power is saved. The fluorescent film 222b is applied to the entire inner surface of the lamp and the reflecting film 222b is formed on the inner surface, except on portion defined by the aperture angle, for reducing the peaks from the mercury emission lines. Thus, the light emitted from the lamp is somewhat reduced. A lamp heater 228, and a heat sink (radiating member) 222d are disposed on the outer surface of the lamp 222. A thermister 222e gathers temperature data for controlling the lamp heater 228 and the cooling fan.

Figure 39A:
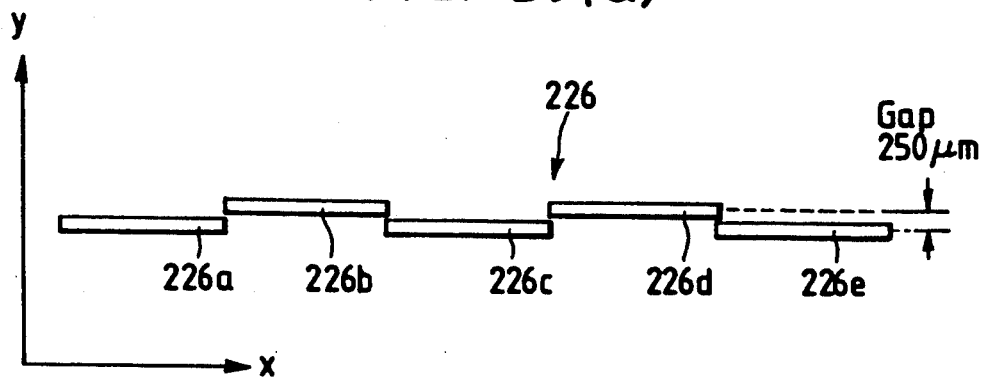
FIG. 39(a) is a layout of CCD line sensors.

As shown in FIG. 39(a), five CCD line sensors 226a to 226e are laid out in a zig-zag fashion in the main scan direction. The reason a zig-zag layout of CCD sensors is used is that when a single CCD line sensor is used, it is difficult to array a number of photo sensor elements without dropping an element and it is difficult to obtain uniform sensitivity. When a plurality of CCD line sensors are arrayed in a line, it is difficult to form pixels in the CCD line sensor extending to both end portions. This results in the presence of light insensitive portions in the CCD sensor.

Figure 39B:
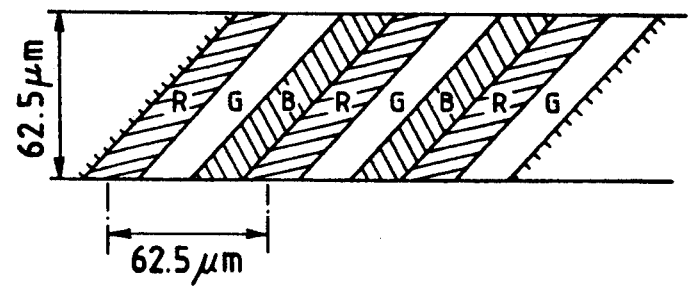
FIG. 39(b) is a layout of color filters.

As shown in FIG. 39(b), in the sensor portion of the CCD line sensor array 226, trios of color filters R, G and B comprises pixels repeatedly laid out in that order, and the adjacent three bits form one pixel at the time of reading. When a read pixel density of each color is 16 dots/mm and the number of pixels of each chip is 2928, the length of one chip is 2928/(16×3)=61 mm and hence the total length of five chips is 61×5=305 mm. Accordingly, a CCD line sensor of an equal size type capable of reading an original of size A3 can be obtained. The respective pixels of R, G and B are slanted by 45°, to reduce moire.

When a plurality of CCD line sensors 226a to 226e are disposed in a zig-zag fashion as in the above case, the adjacent CCD line sensors scan different portions on the original surface. When the original is scanned by moving the CCD line sensors in the vertical scan direction Y orthogonal to the main scan direction X, there is a time lag between the signals derived from the CCD line sensors 226b and 226d of the first row that precedingly scan the original and the signals derived from the CCD line sensors 226a, 226c and 226e of the second row that succeedingly scan the original. This time lag corresponds to a difference between the positions where the CCD line sensors of the first and second rows are located.

To obtain a continuous signal of one line from the image signals dividedly read by the plurality of CCD line sensors, the signals from the first row CCD line sensors 226b and 226d that precedingly scan the original are stored and read out in synchronism with the outputting of the signals from the second row CCD line sensors 226a, 226c and 226e that scan the original succeeding to the first CCD row line sensors. For example, if the position difference is 250 μm and the resolution is 16 dots/mm, a delay of 4 lines is required.

In the image reader, reduction/enlargement is carried out in such a manner that increase and decrease processing, as well as other IPS processing are used for the reduction/enlargement in the main scan direction. Also, the increase or decrease of the moving speed of the imaging unit 37 is used for reduction/enlargement in the vertical scan direction. Accordingly, the resolution in the vertical scan direction is changed by varying the speed of the moving imaging unit 37, while the reading speed, i.e., the number of read lines per unit time, of the image reader is fixed. If the resolution is 16 dots/mm at 100% magnification, the magnification percentage, speed, resolution and the number of zig-zag correction lines are as shown in the following table.

| Magnification (%) | Speed (times) | Resolution (dots/mm) | No. of zig-zag correction lines |
|---|---|---|---|
| 50 | 2 | 8 | 2 |
| 100 | 1 | 16 | 4 |
| 200 | ½ | 32 | 8 |
| 400 | ¼ | 64 | 16 |

Figure 40:
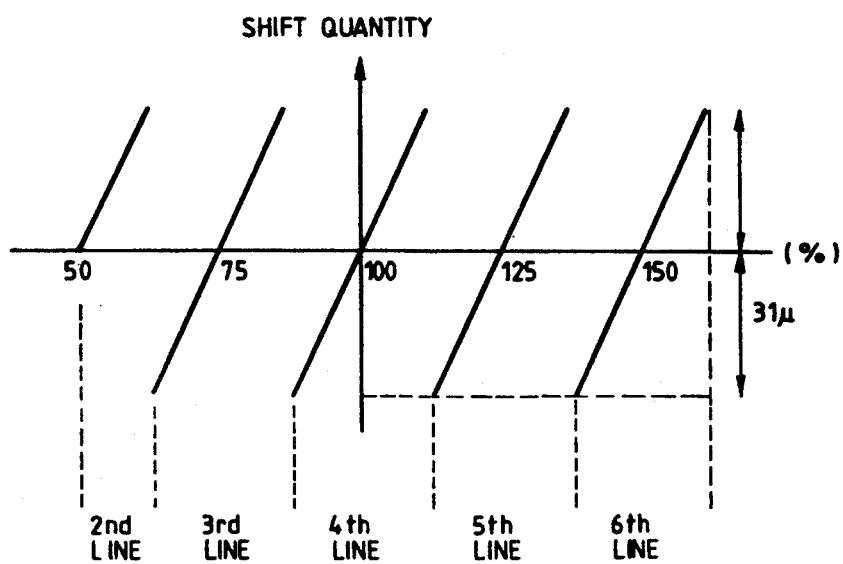
FIG. 40 shows a relationship between the magnification and read displacement.

As seen from the above table, as the magnification percentage increases, the resolution increases, and hence the number of necessary line memories for correcting a difference of 250 mm in the zig-zag layout of the CCD line sensors is also increased. FIG. 40 shows the relationship between shift quantity and magnification. Correction of one line is made every one-pixel displacement by the change of the magnification. A maximum of 31 mm of shift is generated for every on-line correction. This figure, however, is negligible during practical use.

(III-5) Video Signal Processing Circuit

Figure 41:
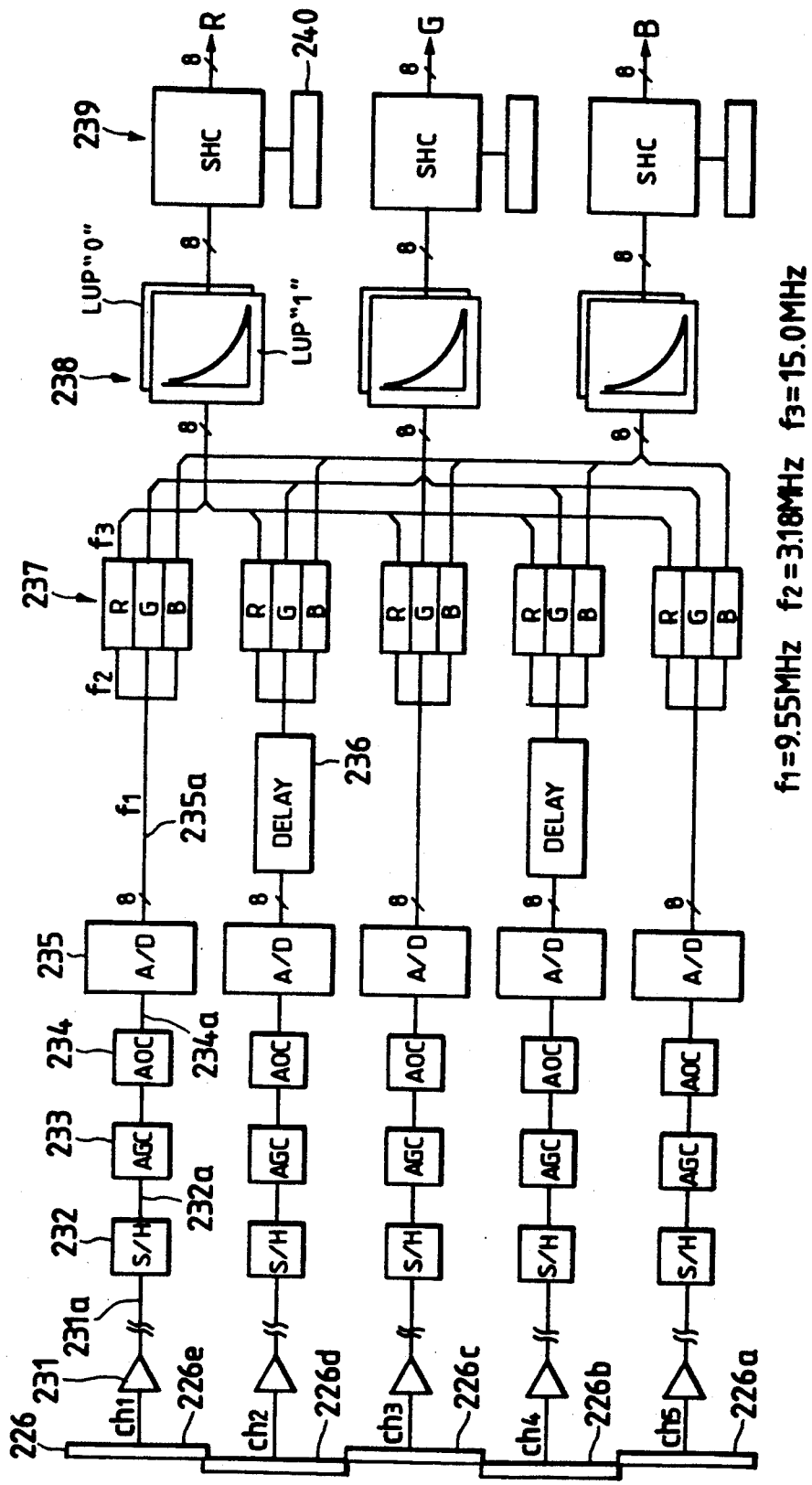
FIG. 41 is a block diagram showing a video signal processing circuit.

The description below referencing FIG. 41 describes in detail a video signal processing circuit for reading a color original of colors R, G and B in terms of reflectivity signals by using the CCD line sensor array 226 when the reflectivity signal is converted into a digital density signal.

An image of an original is read by the CCD line sensor array 226 comprising five CCD line sensors in the imaging unit 37. The image reading, the CCD line sensor array divides the original image into five portions to be read through five channels. Further, in reading the segmented image, the image light reflected from the image is separated into colors R, G and B. The color signals (in a channel typically used for ease of explanation) are amplified to a predetermined level by a amplifier 231. The amplified color signals are transmitted to the circuit of the base machine through a transmission cable connecting the imaging unit to the base machine (FIG. 42, 231a).

Figure 42:
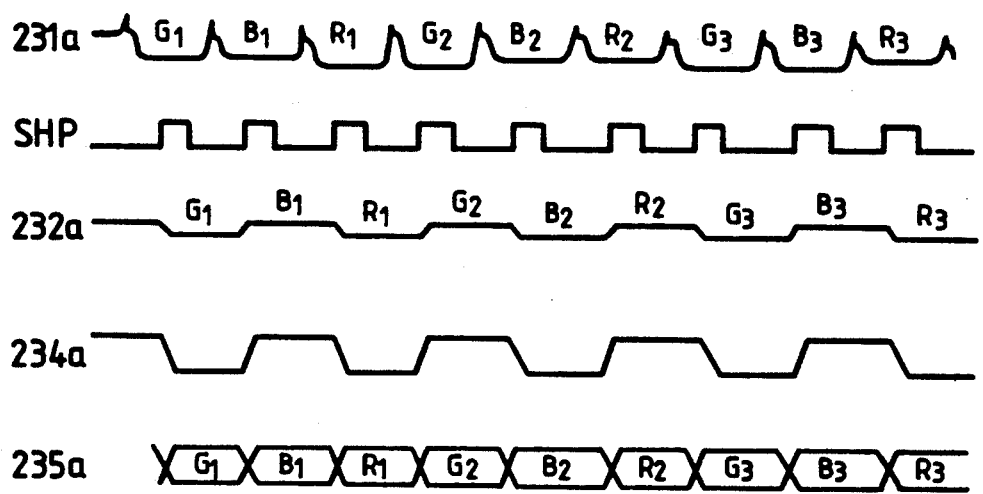
FIG. 42 shows output waveforms of the video signal processing circuit.

In the base machine, a sample hold circuit 232, driven by a sample hold pulse SHP, removes the noise of the color signals and shapes the signals (FIG. 42, 232a). The photoelectric converting characteristic of the CCD line sensor differs for each pixel and each chip. Accordingly, when an original with a uniform density is read by the CCD line sensor, the output signals of the line sensor are not uniform. If these signals undergo image processing, stripes and irregularities will appear in the image formed by the image processed signals. Therefore, correction processing must be applied to the signals derived from the CCD line sensor array.

Figure 43:
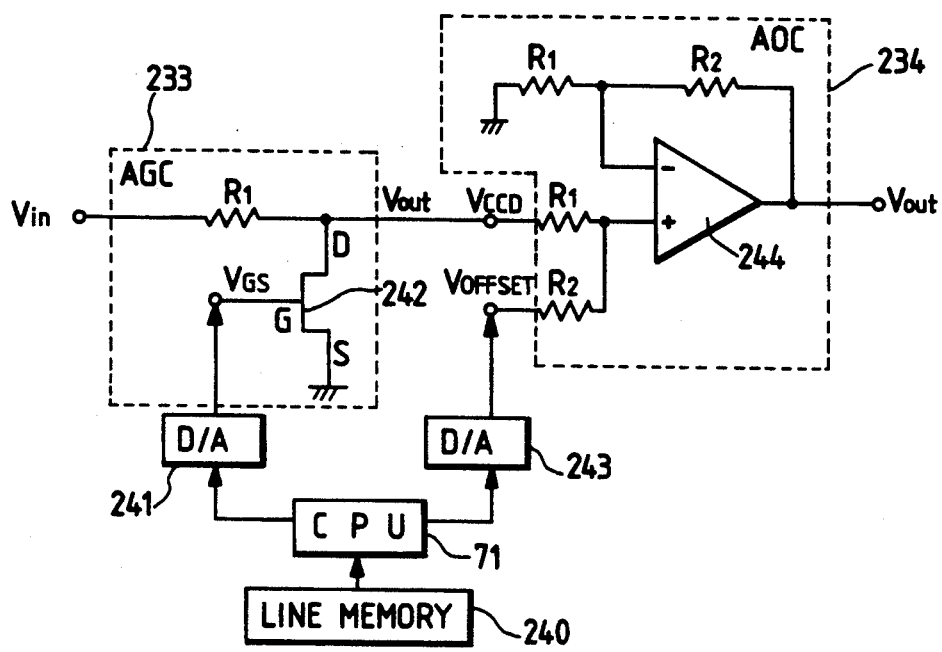
FIG. 43 shows a circuit diagram of an AGC/AOC circuit.
Figure 44:
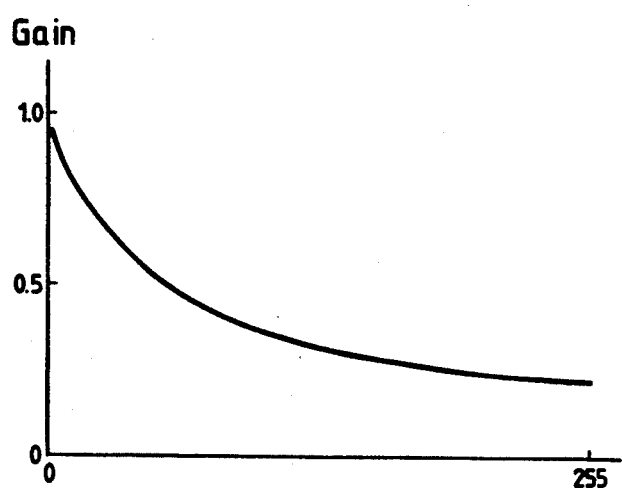
FIG. 44 shows a relationship between the digital gain set value and gain.
Figure 45:
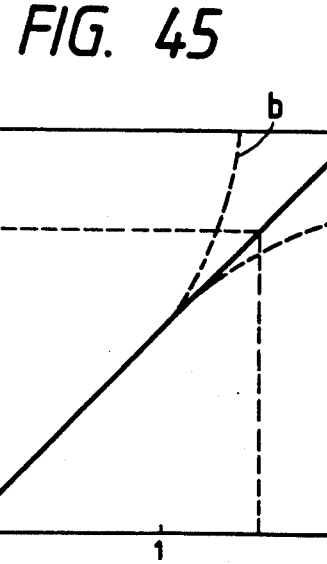
FIG. 45 shows a relationship between the original density and sensor output density.
Figure 46A:
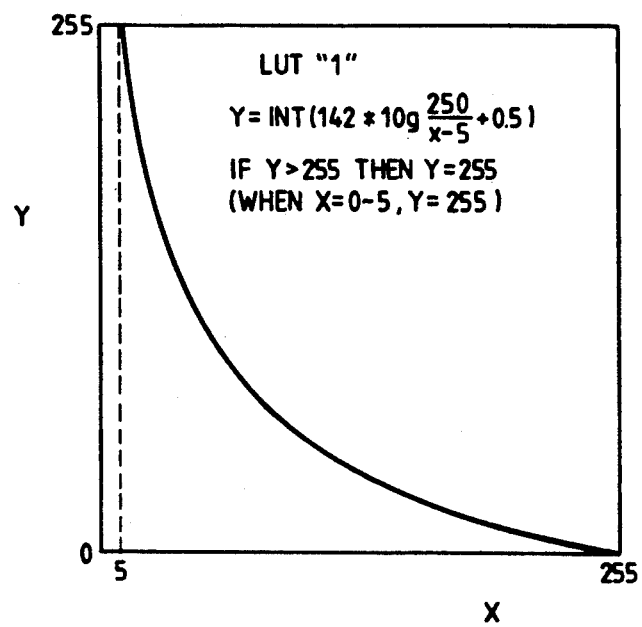
FIGS. 46(a) and 46(b) are conversion tables.
Figure 46B:
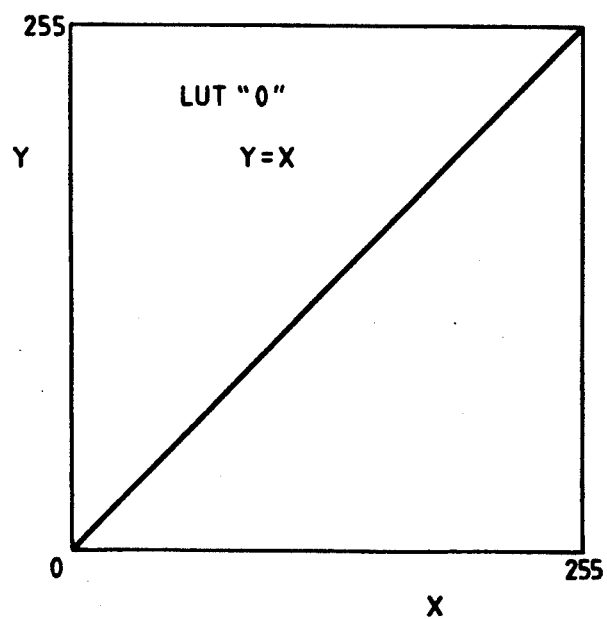
Figures 47A, 47B:
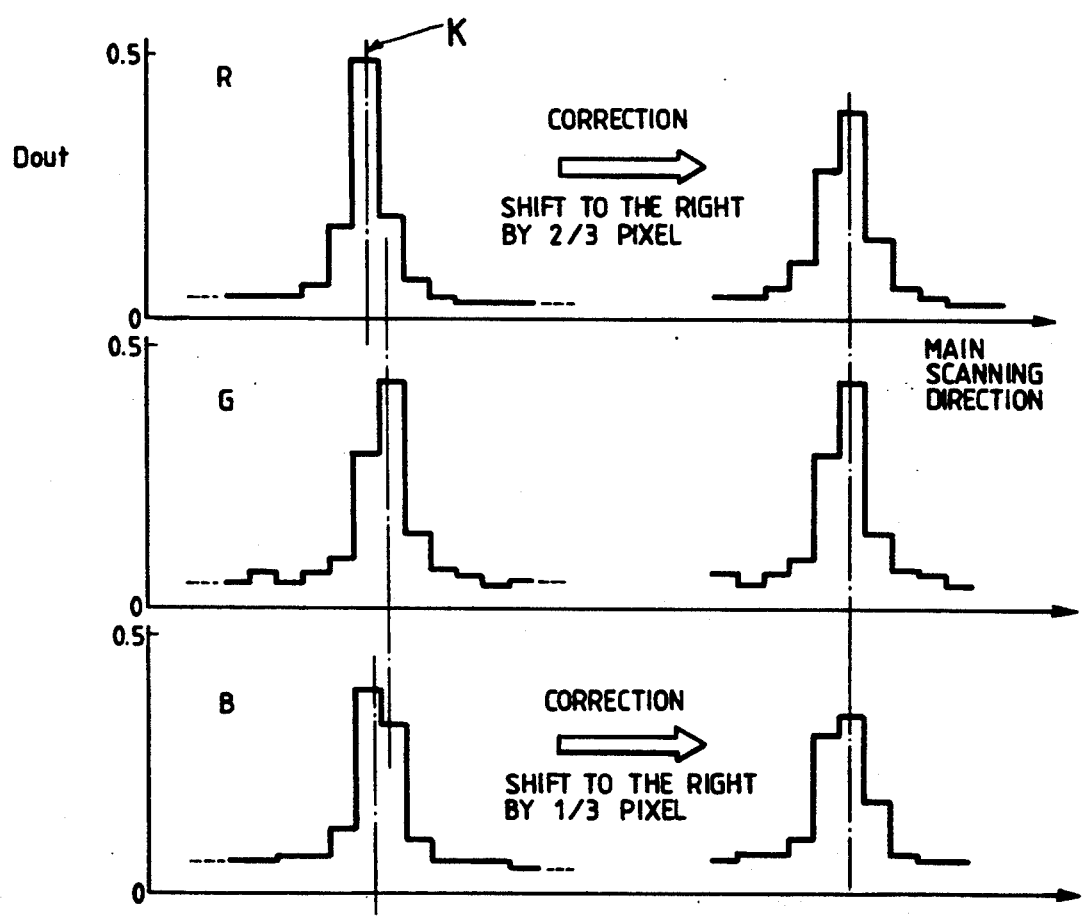
FIGS. 47(a) and 47(b) show the correction of color displacement.

An automatic gain control (AGC) circuit 233 controls the gain of the sensor output signals. This control is called a white level adjustment and is used for reducing errors in the A/D conversion in the circuit for amplifying the output signals of each sensor and applying them through an AOC (automatic affect control circuit) 234 and to an A/D converter 235. Reference data is collected by each sensor, digitized, and stored into a shading RAM 240. Each line of data is compared with respective preset reference data stored in the CPU71 (FIG. 43). A digital value providing a given gain is converted into an analog signal and is applied to the AGC 233 to vary its gain in 256 steps.

The AOC circuit 234 controls a dark voltage which is outputted from each sensor. This control is called a black level adjustment. During adjustment, the fluorescent light is off and the output voltage of each sensor is measured and then digitized and stored in the shading RAM 240. The data of one line, as read out, is compared with a predetermined reference value by the CPU 71 (FIG. 43). An off set value is converted into an analog signal, and applied to the AOC 234. In the AOC 234, the offset voltage is controlled in 256 steps. The AOC controls the original density as finally read so that its output density falls within a predetermined value.

The data thus digitized by the A/D converter 235 (FIG. 42, 235a) is outputted in the form of an 8 bit stream of GBRGBR .... A delay circuit 236 comprises FIFO-type memory capable of storing the data of a plurality of lines. The delay circuit 236 stores the data signals derived from the preceding scan, 1st row CCD line sensors 226b and 226d, and outputs the data in synchronism with the output of the data signals from the succeeding scan, 2nd row CCD line sensors 226a, 226c and 226e.

A separate/compose circuit 237 separates the R, G, and B data for each CCD line sensor, and composes the data into serial data for each color, R, G and B and for each line. A converter 238, e.g., a ROM, stores a logarithm converting table LUT"1". In the table, the received digital data is used as addresses to access corresponding table entries stored in the ROM. The table converts the R, G and B reflectivity data into density data.

A shading correction circuit 239 will be described. Shading stems from variances in the light distribution characteristics of the light source, a reduction in the amount of light at the end portion of the fluorescent light used as a light source, sensitivity variances of line sensor pixels smear on the reflecting mirror, and the like.

To correct for the shading, at the start of the shading correction, light reflected from a white plate, used as reference density data for shading correction, is applied to the CCD line sensor. The output signal from the line sensor is subjected to A/D conversion and logarithm conversion by the signal processing circuit. The reference density data log $(R_i)$ thus obtained is stored in the line memory 240. Then, the reference density data log $(R_i)$ is subtracted from the image data log $(D_i)$ which was read from the original through the scanning operation.

Thus, shading corrected logarithmic values of the pixel data can be obtained. When the shading correction follows the logarithm conversion, as described above, satisfactory logic operations can be realized by using common full adder IC, instead of an intricate, large scale circuit, hard logic divider used in conventional converters.

(III-6) Radiation Means for a Line Sensor Drive

A radiator system employed in the image recording apparatus of the present invention will be described, wherein the radiatory system is applied to the IIT by way of example.

Figure 48:
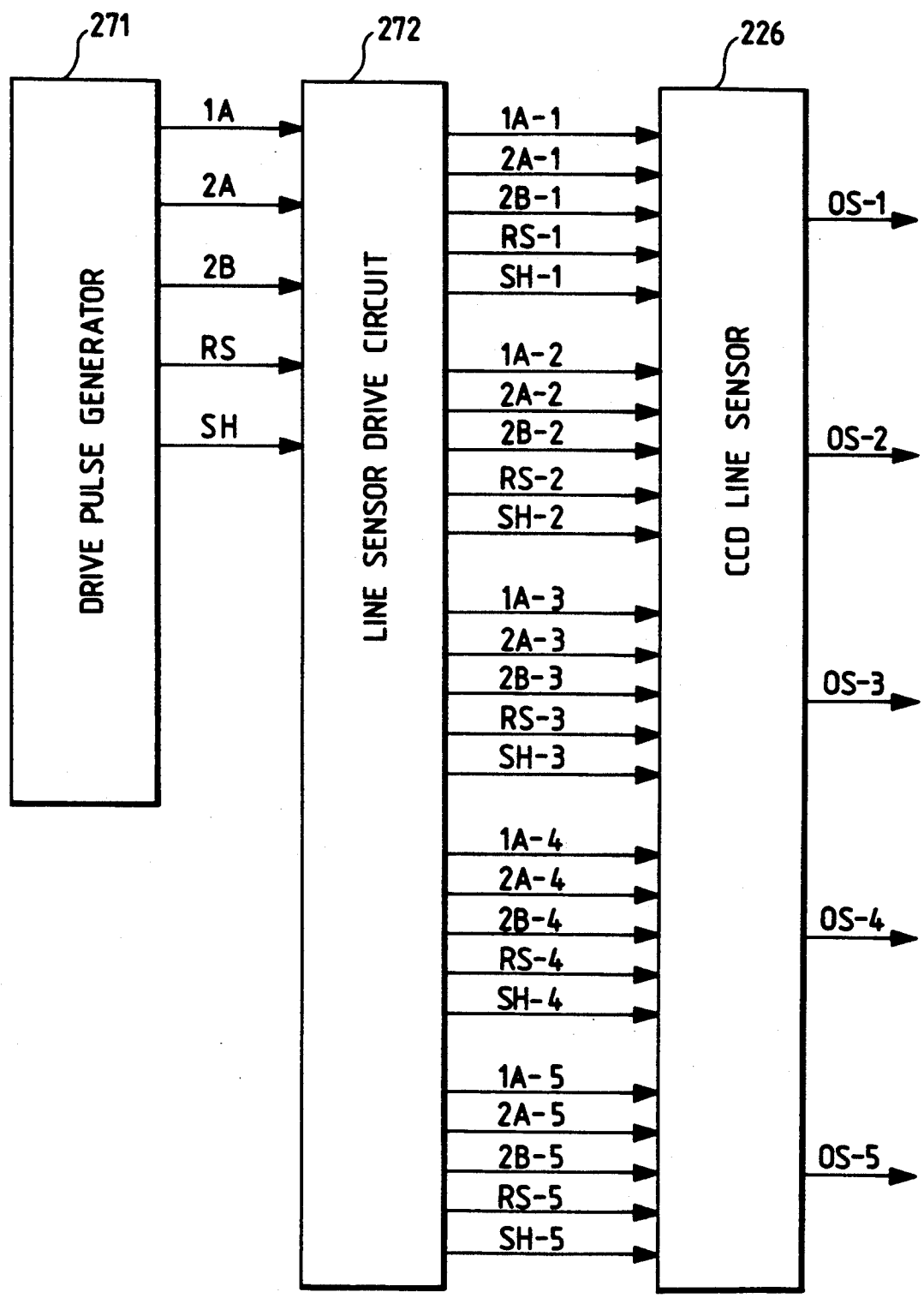
FIG. 48 is a diagram showing a drive circuit for the line sensor to which the present invention is applied.

FIG. 48 shows various drive pulses that are inputted to and outputted from the line sensor drive 272, wherein a drive pulse generator 271 generates transfer pulses 1A, 2A and 2B, a reset pulse RS, and a shift pulse SH. These pulses are synchronized with one another through the frequency division and delay of a master clock signal. The line sensor drive circuit 272 receives these pulses and distributes them to the five line sensors. In response to the shift pulse SH in the line sensor 226, the signal charge, which is converted and stored by the photo diode array, is transferred to the CCD analog shift register. The signal charge is then successively shifted through the shift register in response to the transfer pulses 1A, 2A and 2B, resulting in the successive output of signals OS-1 to OS-5.

Each line sensor comprising the line sensor driver 272 contains a total of four ICs, two for generating transfer pulses 1A and 2A, one for generating transfer pulse 2B and reset pulse RS, and one for generating shift pulse SH. Accordingly, a total of 20 ICs comprise the five line sensors of the present invention. Of the 20 ICs, ten are used for generating transfer pulses 1A and 2A. These ICs generate a large amount of heat and, therefore, require means for radiating the heat. Because the copying machine of the present invention is designed such that the frequency of the transfer pulses 1A and 2A is set to about 10 MHz, thereby increasing the read speed of the machine, a large number of charge/discharge operations are performed by the MOS capacitors comprising the CCD analog shift register. This results in the generation of a large amount of heat by the ICs comprising the shift register.

To actively radiate the heat generated in the present invention, a radiating member is provided for those ICs which generate a large amount of heat. However, there are many difficulties involved with coupling the radiating member with the IC. First, because the IC chip comprising the IC of the present invention is mounted at the bottom surface (lead terminal side) of the IC, the quantity of heat generated by the IC is more heavily concentrated at the bottom surface of the IC than at the upper surface. Therefore, to effectively radiate the generated heat, the radiating member must be provided between the bottom surface of the IC and the circuit board on which the IC is mounted. Second, because the IIT circuit board of the present invention contains many components, such as resistors, capacitors, transistors, and ICs, all disposed within a limited space, it is difficult to position the radiating member between the bottom surface of the IC and the circuit board so that the radiating member is not in electrical contact with any of the lead terminals of the many circuit board components.

Figure 1B:
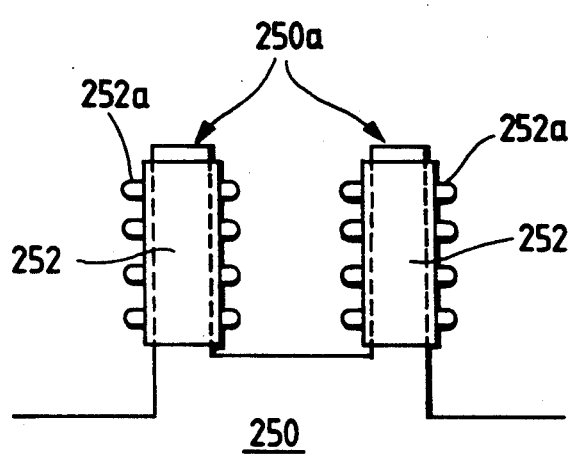
Figure 1C:
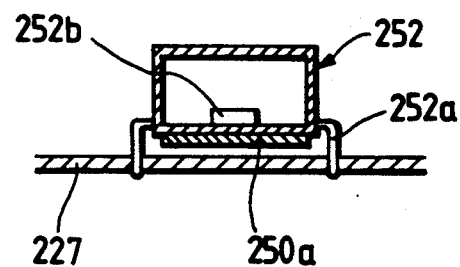

FIGS. 1(a) through 1(c) show an embodiment of the radiator system according to the present invention. FIG. 1(a) shows a plan view of the circuit board 227 and the radiating plate 250 (also shown in FIG. 37) as viewed from the bottom, FIG. 1(b) shows a plan view of a major portion of the structure of FIG. 1(a), and FIG. 1(c) is a sectional view of a major portion of FIG. 1(b).

Twenty (20) driver ICs 252, as shown in FIG. 1(a), are mounted on the circuit board 227 in a manner in accordance with FIG. 37. The radiating plate 250 is provided with ten radiating pieces 250a. These pieces are in contact with the bottom surfaces of ten of the ICs 252 and are arrayed vertically. As shown in FIGS. 1(b) and 1(c), each IC 252 straddles a respective radiating piece 250a so that its associated IC terminals 252a are not in contact with the radiating piece 250a. A resin having high thermal conductivity is used for mounting the ICs onto the respective radiating pieces. The radiating pieces 250a are positioned so as to contact the bottom surfaces of the ICs 252 because the IC chip 252b is mounted on the bottom surface of the IC 252 (FIG. 1(c)) where it generates a large amount of heat.

As shown in FIG. 37, a convex region 250b exists in the radiating plate 250 such that the radiating plate 250 is not in contact with the circuit board 227 at the portion where the convex region 250b is present. Therefore, the radiating plate 250 never comes in contact with the circuit components mounted on the circuit board 227 or their associated lead terminals.

To aid in the cooling process, the imaging unit 37 is equipped with a fan (not shown) for circulating the surrounding air. Additionally, the convex region 250b is provided with holes through which the air can flow. In addition, during the scan operation of the imaging unit 37, the convex region 250b moves through the air to further assist in the radiation of heat from the IC 252.

Figure 49A:
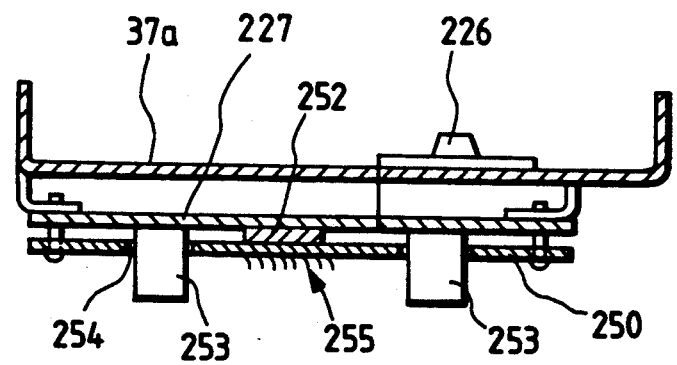
FIGS. 49(a) through 49(c) are sectional views of other embodiments of the present invention.
Figure 49B:
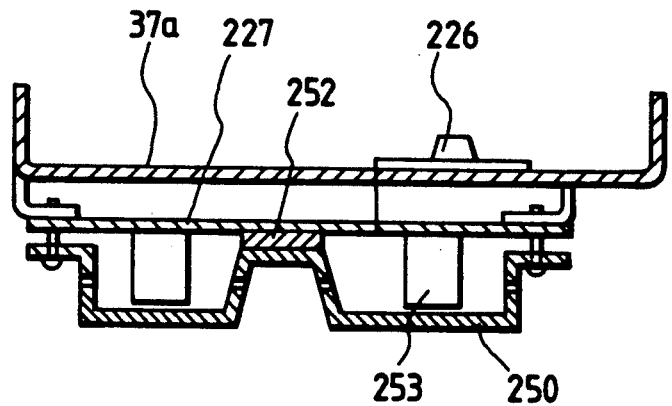
Figure 49C:
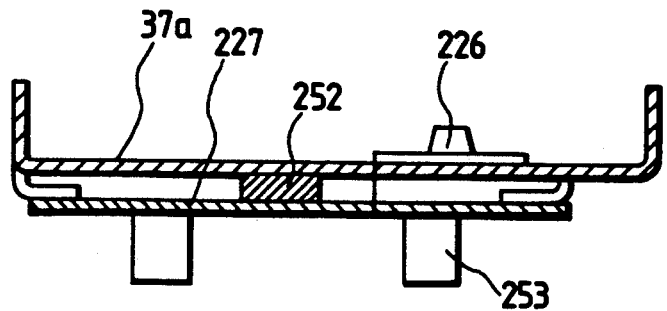

Other embodiments of the radiator system are illustrated in FIGS. 49(a) through 49(c).

In the embodiment of FIG. 49(a), a radiating plate 250 is in direct contact with the top surface of the IC 252 and is provide with holes 254 for preventing it from contacting the circuit components 253. A series of finlike pieces 255 vertically protrude from the radiating plate at the point where the radiating plate 250 is in contact with the IC 252 thus further improving the radiating efficiency of the system. The embodiment of FIG. 49(b) comprises a radiating plate 250 having a convex region for covering over the circuit component 253. In the embodiment of FIG. 49(c), the IC 252 is disposed on the circuit pattern side of the circuit board 227 and the top surface of the IC 252 is in direct contact with the base member 37a. In this embodiment, the base member 37a serves as the radiating plate, thus reducing the cost and weight of the radiator system.

As seen from the foregoing description, the heat generated from the line sensor driver of the present invention can be effectively radiated because the radiating plate is in direct contact with the IC. Further, the radiating pieces protruding from the radiating plate, which directly contact the bottom surface of the IC, in addition to the convex region of the radiating plate, which is in direct contact with the surrounding air, further enhance the radiation of heat generated by the IC of the present invention.

What is claimed is:

1. An image recording apparatus, comprising:
    a line sensor for reading image data;
    a driver, connected to said line sensor, for outputting said image data read by said line sensor, said driver including an integrated circuit and said driver being mounted on a circuit board; and
    a radiator system for dissipating heat generated by said driver, said radiator system physically contacting said driver and said radiator system including a radiating plate and a radiating piece protruding from said radiating plate, said radiating plate including a convex region physically disconnected from said circuit board.

2. The image recording apparatus of claim 1, wherein said radiating piece is physically connected between a bottom surface of said driver and said circuit board on which said driver is mounted, and wherein said circuit board includes components mounted thereon, said rotating piece being electrically insulated from said driver, said circuit board, and said components.

3. The image recording apparatus of claim 1, wherein said radiating plate is physically connected to a top surface of said driver, and wherein said radiating plate is electrically insulated from said driver, said circuit board, and components mounted on said circuit board other than said driver.

4. The image recording apparatus of claim 3, wherein said radiating plate comprises holes through which protrude said other components mounted on said circuit board.

5. The image recording apparatus of claim 3, wherein said radiating plate comprises vertically protruding finlike pieces.

6. The image recording apparatus of claim 1, wherein said radiating system further comprises a base member physically connected to the top surface of said driver.

7. An image recording apparatus, comprising:
    a line sensor for reading image data;
    a driver, connected to said line sensor, for outputting said image data read by said line sensor, said driver including an integrated circuit and said driver being mounted on a circuit board; and
    a radiator system for dissipating heat generated by said driver, said radiator system physically contacting said driver and said radiator system including a radiating plate and a radiating piece protruding from said radiating plate, said radiating plate including a convex region physically disconnected from said circuit board, and said convex region having holes through which air flows.

8. An image recording apparatus, comprising:
    a line sensor for reading image data;
    a driver, connected to said line sensor, for outputting said image data read by said line sensor, said driver including an integrated circuit and said driver being mounted on a circuit board; and
    a radiator system for dissipating heat generated by said driver, said radiator system physically contacting said driver and said radiator system moving during operation of said image recording apparatus.

9. An image recording apparatus, comprising:
a line sensor for reading image data;
a driver, connected to said line sensor, for outputting said image data read by said line sensor, said driver including an integrated circuit and said driver being mounted on a circuit board; and
a radiator system for dissipating heat generated by said driver, said radiator system physically contacting said driver and said radiator system including a radiating plate physically connected to a top surface of said driver, said radiating plate being electrically insulated from said driver, said circuit board, and components mounted on said circuit board other than said driver, and said radiating plate including a convex region physically disconnected from said circuit board and covering said components mounted on said circuit board other than said driver.

* * * * *